United States Patent
Parsons et al.

(10) Patent No.: US 10,232,235 B2
(45) Date of Patent: *Mar. 19, 2019

(54) GOLF CLUB HEADS AND METHODS TO MANUFACTURE GOLF CLUB HEADS

(71) Applicant: Parsons Xtreme Golf, LLC, Scottsdale, AZ (US)

(72) Inventors: Robert R. Parsons, Scottsdale, AZ (US); Michael R. Nicolette, Scottsdale, AZ (US); Bradley D. Schweigert, Anthem, AZ (US)

(73) Assignee: PARSONS XTREME GOLF, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/842,583

(22) Filed: Dec. 14, 2017

(65) Prior Publication Data

US 2018/0104550 A1   Apr. 19, 2018

Related U.S. Application Data

(63) Continuation of application No. 15/631,610, filed on Jun. 23, 2017, which is a continuation of application
(Continued)

(51) Int. Cl.
*A63B 53/04* (2015.01)
*A63B 60/02* (2015.01)
(Continued)

(52) U.S. Cl.
CPC .......... *A63B 53/0475* (2013.01); *A63B 60/02* (2015.10); *A63B 60/54* (2015.10);
(Continued)

(58) Field of Classification Search
CPC ......... B29L 2031/5227; A63B 53/0475; A63B 60/54; A63B 60/02; A63B 53/0466;
(Continued)

(56) References Cited

U.S. PATENT DOCUMENTS

| 1,133,129 A | 3/1915 | Govan |
| 1,534,600 A | 7/1921 | Mattern |

(Continued)

FOREIGN PATENT DOCUMENTS

| DE | 297 15 997 | 3/1998 |
| GB | 2 249 031 | 4/1992 |

(Continued)

OTHER PUBLICATIONS

Translated copy, dated Mar. 12, 2018, of Utility Model DE 29715997 U1, by LINPHONE, titled "Golf club head with good shocl absorption properties".*

(Continued)

*Primary Examiner* — Sebastiano Passaniti

(57) ABSTRACT

Embodiments of golf club heads and methods to manufacture golf club heads are generally described herein. In one example, a golf club head may include a body portion with a toe portion, a heel portion, a top portion, a sole portion, a back portion, and a front portion. The golf club head may include a first mass portion, a second mass portion, an interior cavity, and a port connected to the interior cavity and configured to receive the first mass portion. Other examples and embodiments may be described and claimed.

19 Claims, 23 Drawing Sheets

Related U.S. Application Data

No. 15/360,707, filed on Nov. 23, 2016, which is a continuation of application No. 15/043,106, filed on Feb. 12, 2016, now Pat. No. 9,533,201, which is a continuation-in-part of application No. 14/589,277, filed on Jan. 5, 2015, now Pat. No. 9,421,437, which is a continuation of application No. 14/513,073, filed on Oct. 13, 2014, now Pat. No. 8,961,336, which is a continuation of application No. 14/498,603, filed on Sep. 26, 2014, now Pat. No. 9,199,143, application No. 15/842,583, which is a continuation-in-part of application No. 15/841,022, filed on Dec. 13, 2017, which is a continuation of application No. 15/701,131, filed on Sep. 11, 2017, which is a continuation-in-part of application No. 15/685,986, filed on Aug. 24, 2017, which is a continuation of application No. 15/628,251, filed on Jun. 20, 2017, which is a continuation of application No. 15/209,364, filed on Jul. 13, 2016, which is a continuation of application No. PCT/US2015/016666, filed on Feb. 19, 2015, application No. 15/842,583, which is a continuation-in-part of application No. 15/683,564, filed on Aug. 22, 2017, which is a continuation of application No. 15/598,949, filed on May 18, 2017, which is a continuation of application No. 14/711,596, filed on May 13, 2015, now Pat. No. 9,675,853, application No. 15/842,583, which is a continuation-in-part of application No. 15/263,018, filed on Sep. 12, 2016, now Pat. No. 9,878,220, which is a continuation of application No. 15/043,090, filed on Feb. 12, 2016, now Pat. No. 9,468,821, application No. 15/842,583, which is a continuation-in-part of application No. 15/703,639, filed on Sep. 13, 2017, which is a continuation-in-part of application No. 15/484,794, filed on Apr. 11, 2017, now Pat. No. 9,814,952, application No. 15/842,583, which is a continuation-in-part of application No. PCT/US2016/042075, filed on Jul. 13, 2016, which is a continuation of application No. 15/188,718, filed on Jun. 21, 2016, now Pat. No. 9,610,481, application No. 15/842,583, which is a continuation-in-part of application No. 15/462,281, filed on Mar. 17, 2017, and a continuation-in-part of application No. 29/616,949, filed on Sep. 11, 2017, and a continuation-in-part of application No. 15/802,819, filed on Nov. 3, 2017, which is a continuation of application No. 15/793,648, filed on Oct. 25, 2017, which is a continuation-in-part of application No. 15/791,020, filed on Oct. 23, 2017, which is a continuation of application No. 15/785,001, filed on Oct. 16, 2017, application No. 15/842,583, which is a continuation-in-part of application No. 29/622,326, filed on Oct. 16, 2017.

(60) Provisional application No. 62/276,358, filed on Jan. 8, 2016, provisional application No. 62/275,443, filed on Jan. 6, 2016, provisional application No. 62/118,403, filed on Feb. 19, 2015, provisional application No. 62/159,856, filed on May 11, 2015, provisional application No. 62/209,780, filed on Aug. 25, 2015, provisional application No. 62/277,636, filed on Jan. 12, 2016, provisional application No. 62/041,538, filed on Aug. 25, 2014, provisional application No. 61/942,515, filed on Feb. 20, 2014, provisional application No. 61/945,560, filed on Feb. 27, 2014, provisional application No. 61/948,839, filed on Mar. 6, 2014, provisional application No. 61/952,470, filed on Mar. 13, 2014, provisional application No. 61/992,555, filed on May 13, 2014, provisional application No. 62/010,836, filed on Jun. 11, 2014, provisional application No. 62/011,859, filed on Jun. 13, 2014, provisional application No. 62/032,770, filed on Aug. 4, 2014, provisional application No. 62/118,403, filed on Feb. 19, 2015, provisional application No. 62/159,856, filed on May 11, 2015, provisional application No. 62/209,780, filed on Aug. 25, 2015, provisional application No. 62/277,636, filed on Jan. 12, 2016, provisional application No. 62/321,652, filed on Apr. 12, 2016, provisional application No. 62/343,739, filed on May 31, 2016, provisional application No. 62/433,661, filed on Dec. 13, 2016, provisional application No. 62/478,474, filed on Mar. 29, 2017, provisional application No. 62/502,442, filed on May 5, 2017, provisional application No. 62/508,794, filed on May 19, 2017, provisional application No. 62/512,033, filed on May 28, 2017, provisional application No. 62/570,493, filed on Oct. 10, 2017, provisional application No. 62/536,345, filed on Jul. 24, 2017, provisional application No. 62/543,786, filed on Aug. 10, 2017, provisional application No. 62/548,263, filed on Aug. 21, 2017, provisional application No. 62/549,142, filed on Aug. 23, 2017, provisional application No. 62/596,312, filed on Dec. 8, 2017.

(51) Int. Cl.
*A63B 60/54* (2015.01)
*B29C 45/14* (2006.01)
*B29K 75/00* (2006.01)
*B29L 31/52* (2006.01)
*B29K 705/02* (2006.01)

(52) U.S. Cl.
CPC ...... *B29C 45/14311* (2013.01); *A63B 53/0466* (2013.01); *A63B 53/0487* (2013.01); *A63B 2053/0408* (2013.01); *A63B 2053/0416* (2013.01); *A63B 2053/0445* (2013.01); *A63B 2053/0479* (2013.01); *A63B 2053/0491* (2013.01); *A63B 2209/00* (2013.01); *B29C 2045/14967* (2013.01); *B29K 2075/00* (2013.01); *B29K 2705/02* (2013.01); *B29L 2031/5227* (2013.01)

(58) Field of Classification Search
CPC ........ A63B 2209/00; A63B 2053/0445; A63B 2053/0491; A63B 2053/0408; A63B 2053/0416; A63B 2053/0479
USPC .......................... 473/324–350, 287–292, 256
See application file for complete search history.

(56) References Cited

U.S. PATENT DOCUMENTS

| | | |
|---|---|---|
| 1,538,312 A | 5/1925 | Beat |
| D138,438 S | 8/1944 | Link |
| 3,020,048 A | 2/1962 | Carroll |
| D215,101 S | 9/1969 | Sabat |
| D229,431 S | 11/1973 | Baker |
| D234,609 S | 3/1975 | Raymont |
| D239,550 S | 4/1976 | Timbrook |
| D240,748 S | 7/1976 | Bock |
| 4,085,934 A | 4/1978 | Churchward |
| D253,778 S | 12/1979 | Madison |
| 4,502,687 A | 3/1985 | Kochevar |
| 4,614,627 A | 9/1986 | Curtis et al. |

(56) References Cited

U.S. PATENT DOCUMENTS

| | | |
|---|---|---|
| D294,617 S | 3/1988 | Perkins |
| 4,754,977 A | 7/1988 | Sahm |
| 4,824,116 A | 4/1989 | Nagamoto et al. |
| 4,928,972 A | 5/1990 | Nakanishi et al. |
| 4,988,104 A | 1/1991 | Shiotani et al. |
| 5,158,296 A | 10/1992 | Lee |
| 5,176,384 A | 1/1993 | Sata et al. |
| 5,213,328 A | 5/1993 | Long et al. |
| D336,672 S | 6/1993 | Gorman |
| D351,883 S | 10/1994 | Solheim et al. |
| 5,351,958 A | 10/1994 | Helmstetter |
| 5,419,560 A | 5/1995 | Bamber |
| 5,425,535 A | 6/1995 | Gee |
| D361,358 S | 8/1995 | Simmons |
| 5,447,311 A | 9/1995 | Viollaz et al. |
| 5,451,056 A | 9/1995 | Manning |
| 5,485,998 A | 1/1996 | Kobayashi |
| 5,518,243 A | 5/1996 | Redman |
| 5,540,437 A | 7/1996 | Bamber |
| D378,111 S | 2/1997 | Parente et al. |
| 5,637,045 A | 6/1997 | Igarashi |
| 5,649,873 A | 7/1997 | Fuller |
| 5,669,830 A | 9/1997 | Bamber |
| 5,766,091 A | 6/1998 | Humphrey et al. |
| 5,766,092 A | 6/1998 | Mimeur et al. |
| 5,769,735 A | 6/1998 | Hosokawa |
| 5,772,527 A | 6/1998 | Liu |
| 5,788,584 A | 8/1998 | Parente et al. |
| 5,797,807 A | 8/1998 | Moore |
| 5,827,132 A | 10/1998 | Bamber |
| D408,485 S | 4/1999 | Takahashi et al. |
| 5,899,821 A | 5/1999 | Hsu et al. |
| 5,935,016 A | 8/1999 | Antonious |
| 4,883,623 A | 11/1999 | Nagatomo et al. |
| D421,080 S | 2/2000 | Chen |
| D426,276 S | 6/2000 | Besnard et al. |
| 6,077,171 A | 6/2000 | Yoneyama |
| 6,162,133 A | 12/2000 | Peterson |
| 6,165,081 A | 12/2000 | Chou |
| 6,180,722 B1 | 1/2001 | Dalton et al. |
| D442,659 S | 5/2001 | Kubica et al. |
| 6,231,458 B1 | 5/2001 | Cameron et al. |
| 6,238,302 B1 | 5/2001 | Helmstetter et al. |
| D445,862 S | 7/2001 | Ford |
| 6,290,609 B1 | 9/2001 | Takeda |
| 6,306,048 B1 * | 10/2001 | McCabe ............... A63B 53/04 473/333 |
| D469,833 S | 2/2003 | Roberts et al. |
| D475,107 S | 5/2003 | Madore |
| D478,140 S | 8/2003 | Burrows |
| 6,638,162 B2 | 10/2003 | Kosmatka |
| 6,695,714 B1 | 2/2004 | Bliss et al. |
| 6,702,693 B2 | 3/2004 | Bamber |
| 6,780,123 B2 | 8/2004 | Hasebe |
| 6,811,496 B2 | 11/2004 | Wahl et al. |
| 6,830,519 B2 | 12/2004 | Reed et al. |
| D502,975 S | 3/2005 | Schweigert et al. |
| D503,204 S | 3/2005 | Nicolette et al. |
| D508,545 S | 8/2005 | Roberts et al. |
| D508,969 S | 8/2005 | Hasebe |
| 6,923,733 B2 | 8/2005 | Chen |
| D514,183 S | 1/2006 | Schweigert et al. |
| D523,501 S | 6/2006 | Nicolette et al. |
| 7,121,956 B2 | 10/2006 | Lo |
| 7,128,663 B2 | 10/2006 | Bamber |
| 7,153,222 B2 | 12/2006 | Gilbert et al. |
| D534,595 S | 1/2007 | Hasebe |
| 7,156,751 B2 | 1/2007 | Wahl et al. |
| 7,182,698 B2 | 2/2007 | Tseng |
| 7,207,900 B2 | 4/2007 | Nicolette et al. |
| D543,601 S | 5/2007 | Kawami |
| 7,281,991 B2 | 10/2007 | Gilbert et al. |
| D555,219 S | 11/2007 | Lin |
| 7,303,486 B2 | 12/2007 | Imamoto |
| 7,351,164 B2 | 4/2008 | Schweigert et al. |
| 7,396,299 B2 | 7/2008 | Nicolette et al. |
| 7,582,024 B2 | 9/2009 | Shear |
| 7,588,502 B2 | 9/2009 | Nishino |
| 7,611,424 B2 | 11/2009 | Nagai et al. |
| 7,658,686 B2 | 2/2010 | Soracco |
| D618,293 S | 6/2010 | Foster et al. |
| 7,744,484 B2 | 6/2010 | Chao |
| 7,744,487 B2 | 6/2010 | Tavares et al. |
| 7,794,333 B2 | 9/2010 | Wallans et al. |
| 7,798,917 B2 | 9/2010 | Nguyen et al. |
| 7,803,068 B2 | 9/2010 | Clausen et al. |
| 7,815,521 B2 | 10/2010 | Ban et al. |
| 7,846,040 B2 | 12/2010 | Ban |
| 7,938,738 B2 | 5/2011 | Roach |
| 8,062,150 B2 | 11/2011 | Gilbert et al. |
| 8,088,025 B2 | 1/2012 | Wahl et al. |
| 8,092,319 B1 | 1/2012 | Cackett et al. |
| 8,105,180 B1 | 1/2012 | Cackett et al. |
| 8,221,262 B1 | 7/2012 | Cackett et al. |
| 8,246,487 B1 | 8/2012 | Cackett et al. |
| 8,257,196 B1 | 9/2012 | Abbott et al. |
| 8,262,506 B2 | 9/2012 | Watson et al. |
| 8,328,662 B2 | 12/2012 | Nakamura et al. |
| 8,376,878 B2 | 2/2013 | Bennett et al. |
| 8,393,976 B2 | 3/2013 | Soracco et al. |
| D681,142 S | 4/2013 | Fossum et al. |
| 8,414,422 B2 | 4/2013 | Peralta et al. |
| 8,449,406 B1 | 5/2013 | Frame et al. |
| 8,506,420 B2 | 8/2013 | Hocknell et al. |
| 8,545,343 B2 | 10/2013 | Boyd et al. |
| 8,574,094 B2 | 11/2013 | Nicolette et al. |
| 8,657,700 B2 | 2/2014 | Nicolette et al. |
| 8,663,026 B2 | 3/2014 | Blowers et al. |
| 8,690,710 B2 | 4/2014 | Nicolette et al. |
| 8,753,230 B2 | 6/2014 | Stokke et al. |
| 8,790,196 B2 | 7/2014 | Solheim et al. |
| 8,827,832 B2 | 9/2014 | Breier et al. |
| 8,827,833 B2 | 9/2014 | Amano et al. |
| 8,845,455 B2 | 9/2014 | Ban et al. |
| 8,858,362 B1 | 10/2014 | Leposky et al. |
| D722,351 S | 2/2015 | Parsons et al. |
| D722,352 S | 2/2015 | Nicolette et al. |
| D723,120 S | 2/2015 | Nicolette et al. |
| 8,961,336 B1 | 2/2015 | Parsons et al. |
| D724,164 S | 3/2015 | Schweigert et al. |
| D725,208 S | 3/2015 | Schweigert |
| D726,265 S | 4/2015 | Nicolette |
| D726,846 S | 4/2015 | Schweigert |
| 9,005,056 B2 | 4/2015 | Pegnatori |
| D729,892 S | 5/2015 | Nicolette et al. |
| D733,234 S | 6/2015 | Nicolette |
| 9,044,653 B2 | 6/2015 | Wahl et al. |
| D738,449 S | 9/2015 | Schweigert |
| D739,487 S | 9/2015 | Schweigert |
| 9,199,143 B1 | 12/2015 | Parsons et al. |
| D746,927 S | 1/2016 | Parsons et al. |
| D748,214 S | 1/2016 | Nicolette et al. |
| D748,215 S | 1/2016 | Parsons et al. |
| D748,749 S | 2/2016 | Nicolette et al. |
| D753,251 S | 4/2016 | Schweigert et al. |
| D753,252 S | 4/2016 | Schweigert |
| D755,319 S | 5/2016 | Nicolette et al. |
| D756,471 S | 5/2016 | Nicolette et al. |
| 9,345,938 B2 | 5/2016 | Parsons et al. |
| 9,346,203 B2 | 5/2016 | Parsons et al. |
| D759,178 S | 6/2016 | Nicolette |
| D760,334 S | 6/2016 | Schweigert et al. |
| 9,364,727 B2 | 6/2016 | Parsons et al. |
| 9,421,437 B2 | 8/2016 | Parsons et al. |
| 9,427,634 B2 | 8/2016 | Parsons et al. |
| 9,468,821 B2 | 10/2016 | Parsons et al. |
| 9,517,393 B2 | 12/2016 | Cardani et al. |
| 9,533,201 B2 | 1/2017 | Parsons et al. |
| 9,610,481 B2 | 4/2017 | Parsons et al. |
| 9,675,853 B2 | 6/2017 | Parsons et al. |
| 9,878,220 B2 * | 1/2018 | Parsons ............... A63B 53/0475 |
| 2002/0107087 A1 | 8/2002 | Fagot |
| 2003/0139226 A1 | 7/2003 | Cheng et al. |
| 2003/0176231 A1 | 9/2003 | Hasebe |

(56) References Cited

U.S. PATENT DOCUMENTS

| | | |
|---|---|---|
| 2003/0194548 A1 | 10/2003 | McLeod |
| 2004/0092331 A1 | 5/2004 | Best |
| 2004/0204263 A1 | 10/2004 | Fagot et al. |
| 2004/0266550 A1 | 12/2004 | Gilbert et al. |
| 2005/0009632 A1 | 1/2005 | Schweigert et al. |
| 2005/0014573 A1 | 1/2005 | Lee |
| 2005/0043117 A1 | 2/2005 | Gilbert et al. |
| 2005/0119066 A1 | 6/2005 | Stites et al. |
| 2005/0239569 A1 | 10/2005 | Best et al. |
| 2005/0277485 A1 | 12/2005 | Hou et al. |
| 2006/0111200 A1 | 5/2006 | Poynor |
| 2006/0240909 A1 | 10/2006 | Breier |
| 2007/0032308 A1 | 2/2007 | Fagot et al. |
| 2007/0225084 A1 | 9/2007 | Schweigert et al. |
| 2008/0022502 A1* | 1/2008 | Tseng ............... A63B 53/0475 29/428 |
| 2008/0058113 A1 | 3/2008 | Nicolette et al. |
| 2008/0188322 A1 | 8/2008 | Anderson et al. |
| 2008/0300065 A1 | 12/2008 | Schweigert |
| 2008/0318705 A1 | 12/2008 | Clausen et al. |
| 2008/0318706 A1 | 12/2008 | Larson |
| 2009/0029790 A1 | 1/2009 | Nicolette et al. |
| 2009/0191979 A1 | 7/2009 | Hou et al. |
| 2010/0130306 A1 | 5/2010 | Schweigert |
| 2010/0178999 A1 | 7/2010 | Nicolette et al. |
| 2010/0304887 A1 | 12/2010 | Bennett |
| 2011/0111883 A1 | 5/2011 | Cackett |
| 2011/0165963 A1 | 7/2011 | Cackett et al. |
| 2011/0269567 A1 | 11/2011 | Ban et al. |
| 2011/0281665 A1 | 11/2011 | Kawaguchi et al. |
| 2011/0294596 A1 | 12/2011 | Ban |
| 2013/0137532 A1 | 5/2013 | Deshmukh et al. |
| 2013/0225319 A1 | 8/2013 | Kato |
| 2013/0281226 A1 | 10/2013 | Ban |
| 2013/0288823 A1 | 10/2013 | Hebreo |
| 2013/0303303 A1 | 11/2013 | Ban |
| 2013/0310192 A1 | 11/2013 | Wahl et al. |
| 2014/0045605 A1 | 2/2014 | Fujiwara |
| 2014/0080621 A1 | 3/2014 | Nicolette et al. |
| 2014/0128175 A1 | 5/2014 | Jertson et al. |
| 2014/0274441 A1 | 5/2014 | Greer |
| 2014/0274442 A1 | 9/2014 | Honea et al. |
| 2014/0274451 A1 | 9/2014 | Knight et al. |
| 2015/0231454 A1 | 8/2015 | Parsons et al. |
| 2015/0231806 A1 | 8/2015 | Parsons et al. |

FOREIGN PATENT DOCUMENTS

| | | |
|---|---|---|
| JP | H10-127832 | 5/1998 |
| JP | H10-277187 | 10/1998 |
| JP | 2001-346924 | 12/2001 |
| JP | 2004-313777 | 11/2004 |
| WO | 92/15374 | 9/1992 |

OTHER PUBLICATIONS

Translated copy, dated Nov. 21, 2017, of Utility Model JP_H10-277187, by Takahashi, titled "Golf club head with freely adjustable weight distribution", with a publication date of Oct. 20, 1998. (Year: 1998).*

International Search Report and Written Opinion received in connection with corresponding application No. PCT/US2015/016666, dated May 14, 2015 (8 pages).

U.S. Appl. No. 29/512,313, Nicolette, "Golf Club Head," filed Dec. 18, 2014.

Kozuchowski, Zak, "Callaway Mack Daddy 2 PM Grind Wedges" (http://www.golfwrz.com/276203/callaway-mack-daddy-2-pm-grind-wedges/), www.golfwrx.com, GolfWRX Holdings, LLC, published Jan. 21, 2015.

Wall, Jonathan, "Details: Phil's Prototype Mack Daddy PM-Grind Wedge," (http://www.pgatour.com/equipmentreport/2015/01/21/callaway-wedge.html), www.pgatour.com, PGA Tour, Inc., published Jan. 21, 2015.

International Search Report and Written Opinion received in connection with corresponding PCT Application serial No. PCT/US16/42075 dated Sep. 22, 2016 (13 pages).

Taylor Made Golf Company, Inc., https://taylormadegolf.com/on/demandware.static/-/Sites-TMaG-Library/default/v1459859109590/docs/productspecs/TM_S2013_Catalog18.pdf., published Jan. 2013.

RocketBladez Press Release, "GolfBalled", http://golfballed.com/index.php?option=com_content&view=article&id=724:taylormade- . . . Oct. 13, 2017, published Jan. 3, 2013.

International Search Report and Written Opinion Received in Connection With Corresponding PCT Application Serial No. PCT/US16/17652, dated Oct. 24, 2016 (7 pages).

* cited by examiner

GOLF CLUB HEADS AND METHODS TO MANUFACTURE GOLF CLUB HEADS

COPYRIGHT AUTHORIZATION

The present disclosure may be subject to copyright protection. The copyright owner has no objection to the facsimile reproduction by anyone of the present disclosure and its related documents, as they appear in the Patent and Trademark Office patent files or records, but otherwise reserves all applicable copyrights.

CROSS REFERENCE

This application is a continuation of U.S. Non-Provisional application Ser. No. 15/631,610, filed on Jun. 23, 2017, which is a continuation application of U.S. Non-Provisional application Ser. No. 15/360,707, filed Nov. 23, 2016, which is a continuation application of U.S. Non-Provisional application Ser. No. 15/043,106, filed Feb. 12, 2016, now U.S. Pat. No. 9,533,201, which claims the benefit of U.S. Provisional Application No. 62/276,358, filed on Jan. 8, 2016, U.S. Provisional Application No. 62/275,443, filed on Jan. 6, 2016, U.S. Provisional Application No. 62/118,403, filed on Feb. 19, 2015, U.S. Provisional Application No. 62/159,856, filed on May 11, 2015, U.S. Provisional Application No. 62/209,780, filed on Aug. 25, 2015, and U.S. Provisional Application No. 62/277,636, filed on Jan. 12, 2016. U.S. Non-Provisional application Ser. No. 15/043,106 is also a continuation-in-part application of U.S. Non-Provisional application Ser. No. 14/589,277, filed on Jan. 5, 2015, now U.S. Pat. No. 9,421,437, which is a continuation application of U.S. Non-Provisional application Ser. No. 14/498,603, filed on Sep. 26, 2014, now U.S. Pat. No. 9,199,143, which claims the benefit of U.S. Provisional Application No. 62/041,538, filed Aug. 25, 2014. The disclosures of the referenced applications are incorporated herein by reference.

FIELD

The present disclosure generally relates to golf equipment, and more particularly, to golf club heads and methods to manufacturing golf club heads.

BACKGROUND

Various materials (e.g., steel-based materials, titanium-based materials, tungsten-based materials, etc.) may be used to manufacture golf club heads. By using multiple materials to manufacture golf club heads, the position of the center of gravity (CG) and/or the moment of inertia (MOI) of the golf club heads may be optimized to produce certain trajectory and spin rate of a golf ball.

Figure 1:
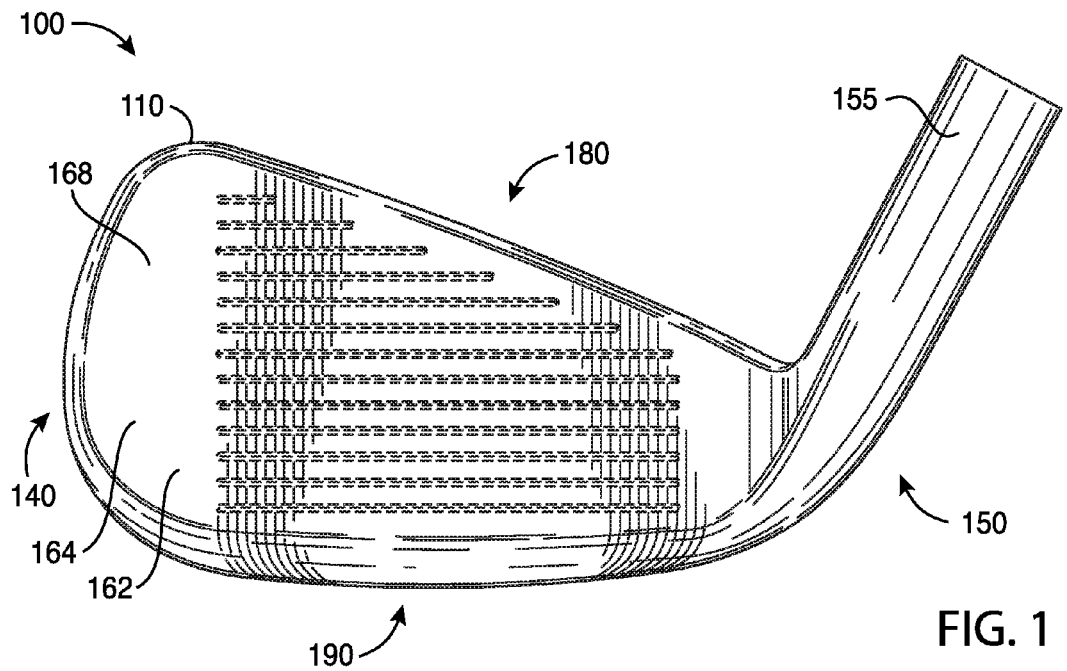
FIG. 1 depicts a front view of a golf club head according to an embodiment of the apparatus, methods, and articles of manufacture described herein.
Figure 2:
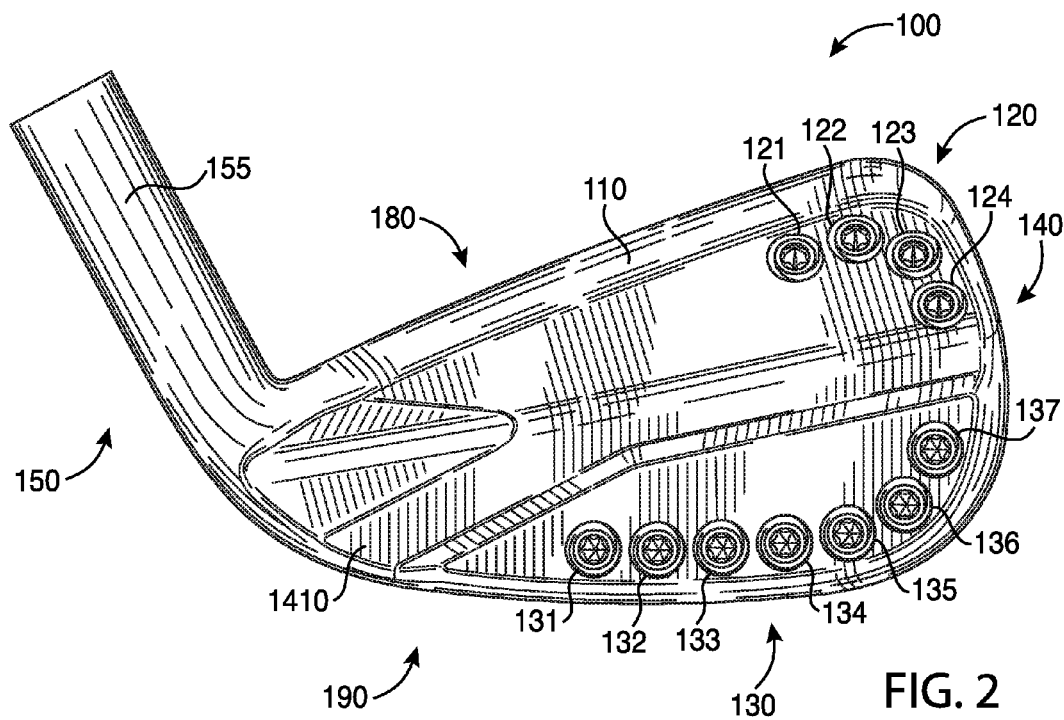
FIG. 2 depicts a rear view of the example golf club head of FIG. 1.
Figure 3:
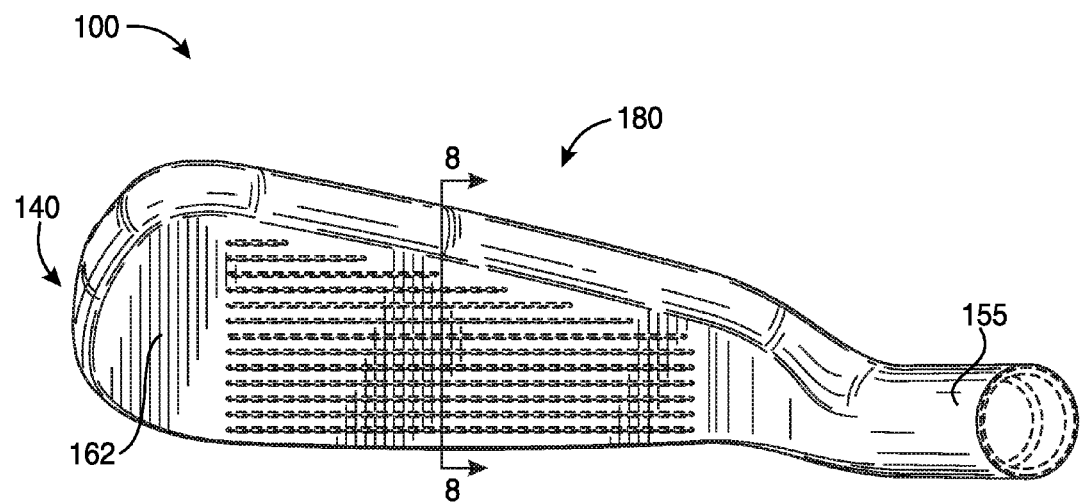
FIG. 3 depicts a top view of the example golf club head of FIG. 1.
Figure 4:
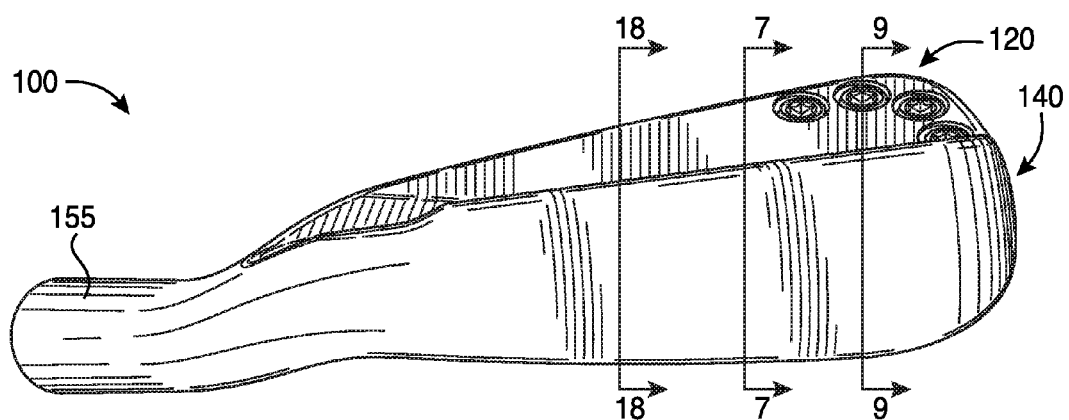
FIG. 4 depicts a bottom view of the example golf club head of FIG. 1.
Figure 5:
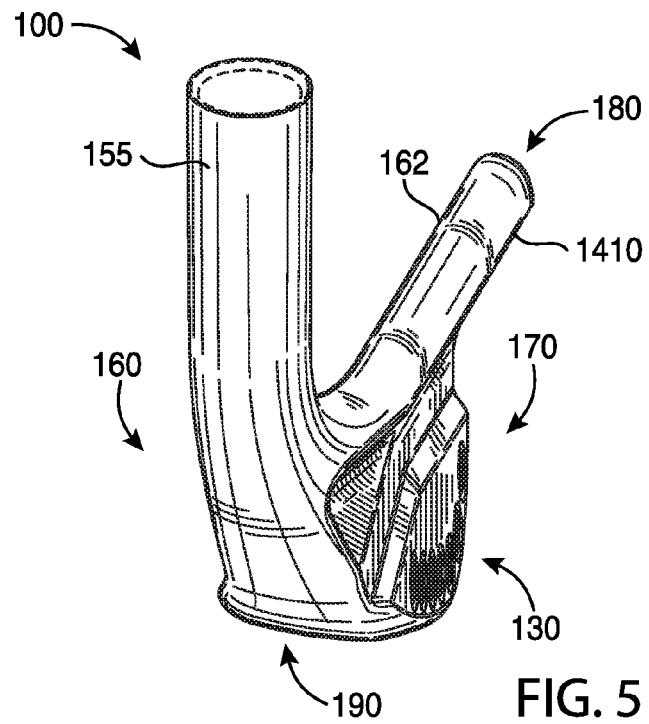
FIG. 5 depicts a left view of the example golf club head of FIG. 1.
Figure 6:
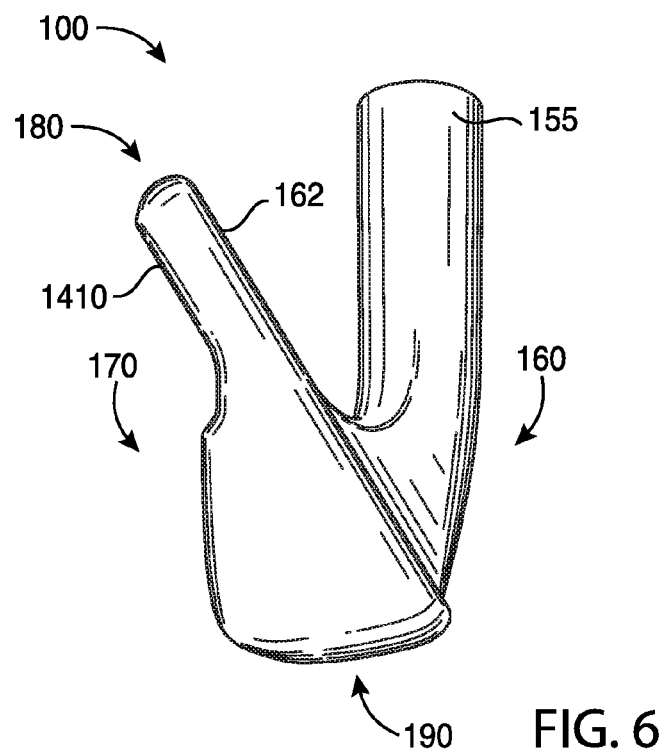
FIG. 6 depicts a right view of the example golf club head of FIG. 1.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures may not be depicted to scale. For example, the dimensions of some of the elements in the figures may be exaggerated relative to other elements to help improve understanding of embodiments of the present disclosure.

DESCRIPTION

In general, golf club heads and methods to manufacture golf club heads are described herein. The apparatus, methods, and articles of manufacture described herein are not limited in this regard.

In the example of FIGS. 1-14, a golf club head 100 may include a body portion 110 (FIG. 14), and two or more weight portions, generally shown as a first set of weight portions 120 (e.g., shown as weight portions 121, 122, 123, and 124) and a second set of weight portions 130 (e.g., shown as weight portions 131, 132, 133, 134, 135, 136, and 137). The body portion 110 may include a toe portion 140, a heel portion 150, a front portion 160, a back portion 170, a top portion 180, and a sole portion 190. The body portion 110 may be made of a first material whereas the first and second sets of weight portions 120 and 130, respectively, may be made of a second material. The first and second materials may be similar or different materials. For example, the body portion 110 may be partially or entirely made of a steel-based material (e.g., 17-4 PH stainless steel, Nitronic® 50 stainless steel, maraging steel or other types of stainless steel), a titanium-based material, an aluminum-based material (e.g., a high-strength aluminum alloy or a composite aluminum alloy coated with a high-strength alloy), any combination thereof, and/or other suitable types of materials. The first and second sets of weight portions 120 and 130, respectively, may be partially or entirely made of a high-density material such as a tungsten-based material or other suitable types of materials. Alternatively, the body portion 110 and/or the first and second sets of weight portions 120 and 130, respectively, may be partially or entirely made of a non-metal material (e.g., composite, plastic, etc.). The apparatus, methods, and articles of manufacture are not limited in this regard.

The golf club head 100 may be an iron-type golf club head (e.g., a 1-iron, a 2-iron, a 3-iron, a 4-iron, a 5-iron, a 6-iron, a 7-iron, an 8-iron, a 9-iron, etc.) or a wedge-type golf club head (e.g., a pitching wedge, a lob wedge, a sand wedge, an n-degree wedge such as 44 degrees (°), 48°, 52°, 56°, 60°, etc.). Although FIGS. 1-10 may depict a particular type of club head, the apparatus, methods, and articles of manufacture described herein may be applicable to other types of club heads (e.g., a driver-type club head, a fairway wood-type club head, a hybrid-type club head, a putter-type club head, etc.). The apparatus, methods, and articles of manufacture described herein are not limited in this regard.

The toe portion 140 and the heel portion 150 may be on opposite ends of the body portion 110. The heel portion 150 may include a hosel portion 155 configured to receive a shaft (not shown) with a grip (not shown) on one end and the golf club head 100 on the opposite end of the shaft to form a golf club.

The front portion 160 may include a face portion 162 (e.g., a strike face). The face portion 162 may include a front surface 164 and a back surface 166. The front surface 164 may include one or more grooves 168 extending between the toe portion 140 and the heel portion 150. While the figures may depict a particular number of grooves, the apparatus, methods, and articles of manufacture described herein may include more or less grooves. The face portion 162 may be used to impact a golf ball (not shown). The face portion 162 may be an integral portion of the body portion 110. Alternatively, the face portion 162 may be a separate piece or an insert coupled to the body portion 110 via various manufacturing methods and/or processes (e.g., a bonding process such as adhesive, a welding process such as laser welding, a brazing process, a soldering process, a fusing process, a mechanical locking or connecting method, any combination thereof, or other suitable types of manufacturing methods and/or processes). The face portion 162 may be associated with a loft plane that defines the loft angle of the golf club head 100. The loft angle may vary based on the type of golf club (e.g., a long iron, a middle iron, a short iron, a wedge, etc.). In one example, the loft angle may be between five degrees and seventy-five degrees. In another example, the loft angle may be between twenty degrees and sixty degrees. The apparatus, methods, and articles of manufacture described herein are not limited in this regard.

Figure 14:
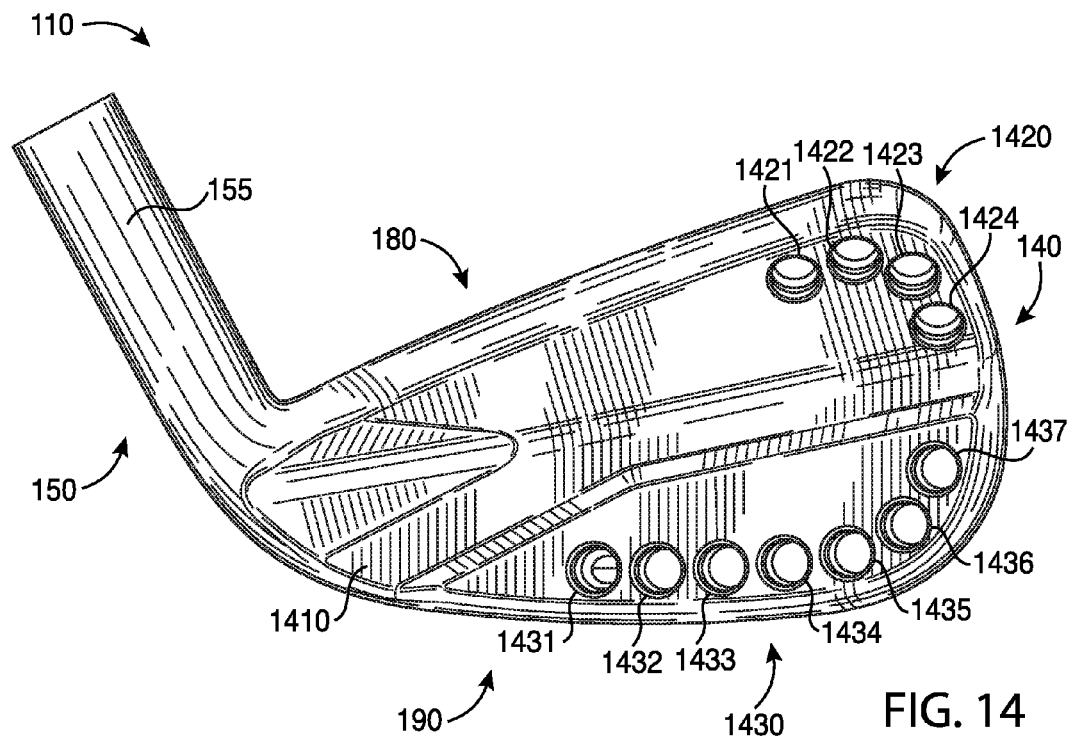
FIG. 14 depicts a rear view of a body portion of the example golf club head of FIG. 1.

As illustrated in FIG. 14, the back portion 170 may include a back wall portion 1410 with one or more exterior weight ports along a periphery of the back portion 170, generally shown as a first set of exterior weight ports 1420 (e.g., shown as weight ports 1421, 1422, 1423, and 1424) and a second set of exterior weight ports 1430 (e.g., shown as weight ports 1431, 1432, 1433, 1434, 1435, 1436, and 1437). Each exterior weight port may be associated with a port diameter. In one example, the port diameter may be about 0.25 inch (6.35 millimeters). Any two adjacent exterior weight ports of the first set of exterior weight ports 1420 may be separated by less than the port diameter. In a similar manner, any two adjacent exterior weight ports of the second set of exterior weight ports 1430 may be separated by less than the port diameter. The first and second exterior weight ports 1420 and 1430 may be exterior weight ports configured to receive one or more weight portions. In particular, each weight portion of the first set 120 (e.g., shown as weight portions 121, 122, 123, and 124) may be disposed in a weight port located at or proximate to the toe portion 140 and/or the top portion 180 on the back portion 170. For example, the weight portion 121 may be partially or entirely disposed in the weight port 1421. In another example, the weight portion 122 may be disposed in a weight port 1422 located in a transition region between the top portion 180 and the toe portion 140 (e.g., a top-and-toe transition region). Each weight portion of the second set 130 (e.g., shown as weight portions 131, 132, 133, 134, 135, 136, and 137) may be disposed in a weight port located at or proximate to the toe portion 140 and/or the sole portion 190 on the back portion 170. For example, the weight portion 135 may be partially or entirely disposed in the weight port 1435. In another example, the weight portion 136 may be disposed in a weight port 1436 located in a transition region between the sole portion 190 and the toe portion 140 (e.g., a sole-and-toe transition region). As described in detail below, the first and second sets of weight portions 120 and 130, respectively, may be coupled to the back portion 170 of the body portion 110 with various manufacturing methods and/or processes (e.g., a bonding process, a welding process, a brazing process, a mechanical locking method, any combination thereof, or other suitable manufacturing methods and/or processes).

Alternatively, the golf club head 100 may not include (i) the first set of weight portions 120, (ii) the second set of weight portions 130, or (iii) both the first and second sets of weight portions 120 and 130. In particular, the back portion 170 of the body portion 110 may not include weight ports at or proximate to the top portion 180 and/or the sole portion 190. For example, the mass of the first set of weight portions 120 (e.g., 3 grams) and/or the mass of the second set of weight portions 130 (e.g., 16.8 grams) may be integral part(s) the body portion 110 instead of separate weight portion(s). The apparatus, methods, and articles of manufacture described herein are not limited in this regard.

Figure 11:
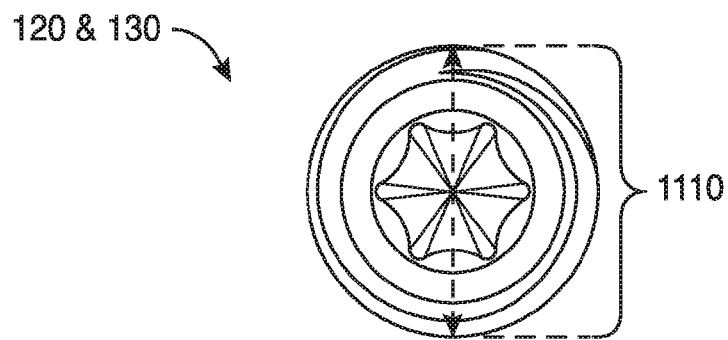
FIG. 11 depicts a top view of a weight portion associated with the example golf club head of FIG. 1.

The first and second sets of weight portions 120 and 130, respectively, may have similar or different physical properties (e.g., color, shape, size, density, mass, volume, etc.). As a result, the first and second sets of weight portions 120 and 130, respectively, may contribute to the ornamental design of the golf club head 100. In the illustrated example as shown in FIG. 11, each of the weight portions of the first and second sets 120 and 130, respectively, may have a cylindrical shape (e.g., a circular cross section). Alternatively, each of the weight portions of the first set 120 may have a first shape (e.g., a cylindrical shape) whereas each of the weight portions of the second set 130 may have a second shape (e.g., a cubical shape). In another example, the first set of weight portions 120 may include two or more weight portions with different shapes (e.g., the weight portion 121 may be a first shape whereas the weight portion 122 may be a second shape different from the first shape). Likewise, the second set of weight portions 130 may also include two or more weight portions with different shapes (e.g., the weight portion 131 may be a first shape whereas the weight portion 132 may be a second shape different from the first shape). Although the above examples may describe weight portions having a particular shape, the apparatus, methods, and articles of manufacture described herein may include weight portions of other suitable shapes (e.g., a portion of or a whole sphere, cube, cone, cylinder, pyramid, cuboidal, prism, frustum, or other suitable geometric shape). While the above examples and figures may depict multiple weight portions as a set of weight portions, each set of the first and second sets of weight portions 120 and 130, respectively, may be a single piece of weight portion. In one example, the first set of weight portions 120 may be a single piece of weight portion instead of a series of four separate weight portions. In another example, the second set of weight portions 130 may be a single piece of weight portion instead of a series of seven separate weight portions. The apparatus, methods, and articles of manufacture described herein are not limited in this regard.

Figure 12:
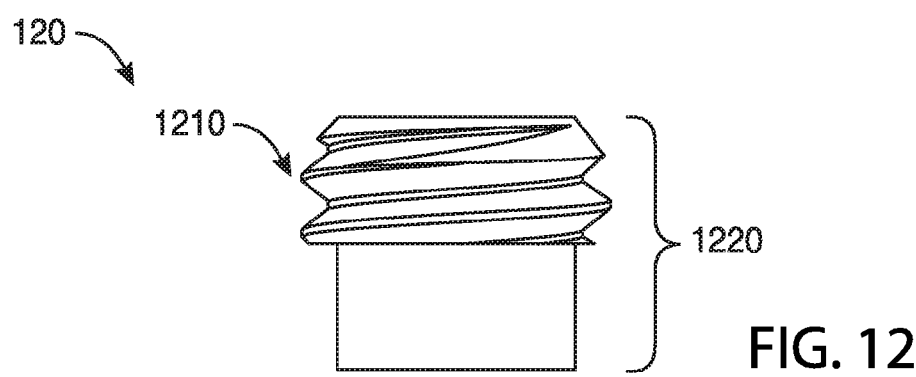
FIG. 12 depicts a side view of a weight portion associated with the example golf club head of FIG. 1.
Figure 13:
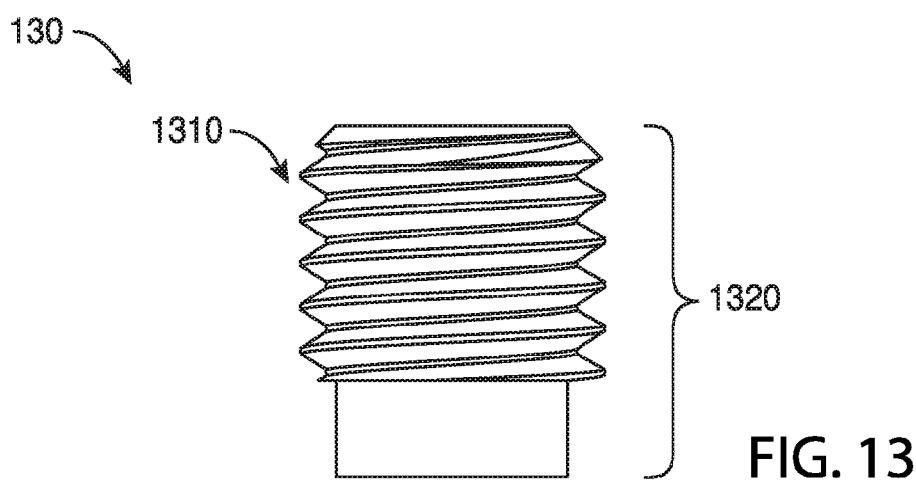
FIG. 13 depicts a side view of another weight portion associated with the example golf club head of FIG. 1.

Referring to FIGS. 12 and 13, for example, the first and second sets of weight portions 120 and 130, respectively, may include threads, generally shown as 1210 and 1310, respectively, to engage with correspondingly configured threads in the weight ports to secure in the weight ports of the back portion 170 (generally shown as 1420 and 1430 in FIG. 14). For example, each weight portion of the first and second sets of weight portions 120 and 130, respectively, may be a screw. The first and second sets of weight portions 120 and 130, respectively, may not be readily removable from the body portion 110 with or without a tool. Alternatively, the first and second sets of weight portions 120 and 130, respectively, may be readily removable (e.g., with a tool) so that a relatively heavier or lighter weight portion may replace one or more of the weight portions of the first and second sets 120 and 130, respectively. In another example, the first and second sets of weight portions 120 and 130, respectively, may be secured in the weight ports of the back portion 170 with epoxy or adhesive so that the first and second sets of weight portions 120 and 130, respectively, may not be readily removable. In yet another example, the first and second sets of weight portions 120 and 130, respectively, may be secured in the weight ports of the back portion 170 with both epoxy and threads so that the first and second sets of weight portions 120 and 130, respectively, may not be readily removable. The apparatus, methods, and articles of manufacture described herein are not limited in this regard.

As mentioned above, the first and second sets of weight portions 120 and 130, respectively, may be similar in some physical properties but different in other physical properties. As illustrated in FIGS. 11-13, for example, each of the weight portions of the first and second sets 120 and 130, respectively, may have a diameter 1110 of about 0.25 inch (6.35 millimeters) but the first and second sets of weight portions 120 and 130, respectively, may be different in height. In particular, each of the weight portions of the first set 120 may be associated with a first height 1220 (FIG. 12), and each of the weight portion of the second set 130 may be associated with a second height 1320 (FIG. 13). The first height 1220 may be relatively shorter than the second height 1320. In one example, the first height 1220 may be about 0.125 inch (3.175 millimeters) whereas the second height 1320 may be about 0.3 inch (7.62 millimeters). In another example, the first height 1220 may be about 0.16 inch (4.064 millimeters) whereas the second height 1320 may be about 0.4 inch (10.16 millimeters). Alternatively, the first height 1220 may be equal to or greater than the second height 1320. The apparatus, methods, and articles of manufacture described herein are not limited in this regard.

Referring back to FIG. 10, for example, the golf club head 100 may be associated with a ground plane 1010, a horizontal midplane 1020, and a top plane 1030. In particular, the ground plane 1010 may be a tangential plane to the sole portion 190 of the golf club head 100 when the golf club head 100 is at an address position (e.g., the golf club head 100 is aligned to strike a golf ball). A top plane 1030 may be a tangential plane to the top portion of the 180 of the golf club head 100 when the golf club head 100 is at the address position. The ground and top planes 1010 and 1030, respectively, may be substantially parallel to each other. The horizontal midplane 1020 may be vertically halfway between the ground and top planes 1010 and 1030, respectively.

Figure 10:
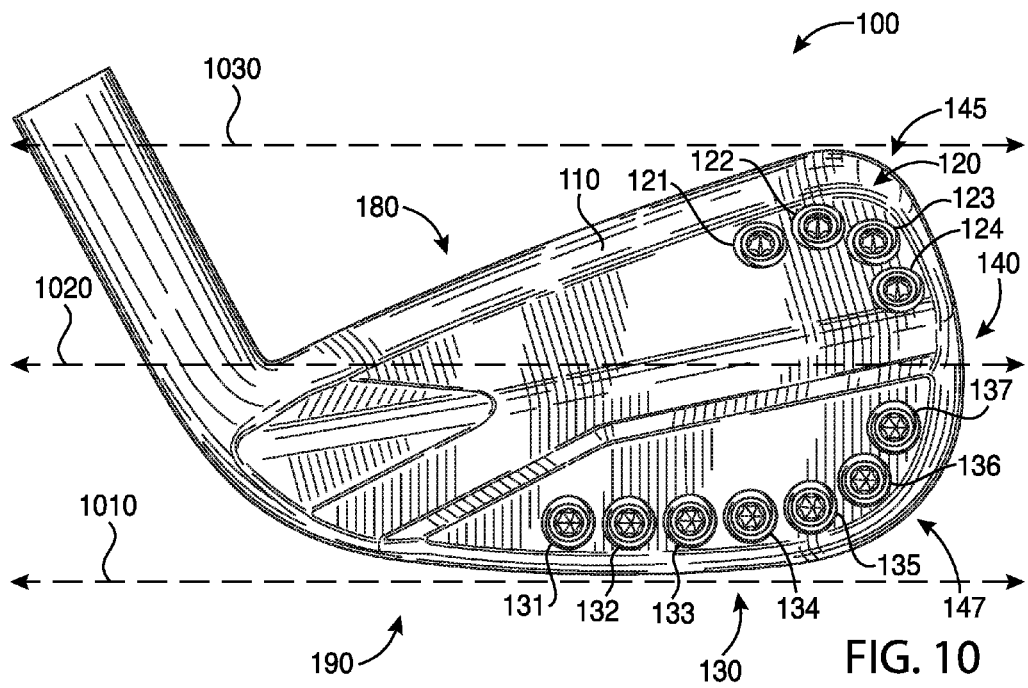
FIG. 10 depicts another rear view of the example golf club head of FIG. 1.

To provide optimal perimeter weighting for the golf club head 100, the first set of weight portions 120 (e.g., weight portions 121, 122, 123, and 124) may be configured to counter-balance the weight of the hosel 155. For example, as shown in FIG. 10, the first set of weight portions 120 (e.g., weight portions 121, 122, 123 and 124) may be located near the periphery of the body portion 110 and extend from the top portion to a transition region 145 between the top portion 180 and the toe portion 140, and from the transition region 145 to the toe portion 140. In other words, the first set of weight portions 120 may be located on the golf club head 100 at a generally opposite location relative to the hosel 155. According to one example, at least a portion of the first set of weight portions 120 may be located near the periphery of the body portion 110 and extend through the transition region 145. According to another example, at least a portion of the first set of weight portions 120 may extend near the periphery of the body portion 110 and extend along a portion of the top portion 180. According to another example, at least a portion of the first set of weight portions 120 may extend near the periphery of the body portion 110 and extend along a portion of the toe portion 140. The first set of weight portions 120 may be above the horizontal midplane 1020 of the golf club head 100. At least a portion of the first set of weight portions 120 may be near the toe portion 140 to increase the moment of inertia of the golf club head 100 about a vertical axis of the golf club head 100 that extends through the center of gravity of the golf club head 100. Accordingly, the first set of weight portions 120 may be near the periphery of the body portion 110 and extend through the top portion 180, the toe portion 140 and/or the transition region 145 to counter-balance the weight of the hosel 155 and/or increase the moment of inertia of the golf club head 100. The locations of the first set of weight portions 120 (i.e., the locations of the first set of exterior weight ports 1420) and the physical properties and materials of construction of the weight portions of the first set of weight portions 120 may be determined to optimally affect the weight, weight distribution, center of gravity, moment of inertia characteristics, structural integrity and/or or other static and/or dynamic characteristics of the golf club head 100. The apparatus, methods, and articles of manufacture described herein are not limited in this regard.

The second set of weight portions 130 (e.g., weight portions 131, 132, 133, 134, 135, 136, and 137) may be configured to place the center of gravity of the golf club head 100 at an optimal location and optimize the moment of inertia of the golf club head about a vertical axis that extends through the center of gravity of the golf club head 100. Referring to FIG. 10, all or a substantial portion of the second set of weight portions 130 may be generally near the sole portion 190. For example, the second set of weight portions 130 (e.g., weight portions 131, 132, 133, 134, 135, 136, and 137) may be near the periphery of the body portion 110 and extend from the sole portion 190 to the toe portion 140. As shown in the example of FIG. 10, the weight portions 131, 132, 133, and 134 may be located near the periphery of the body portion 110 and extend along the sole portion 190 to lower the center of gravity of the golf club head 100. The weight portions 135, 136 and 137 may be located near the periphery of the body portion 110 and extend from the sole portion 190 to the toe portion 140 through a transition region 147 between the sole portion 190 and the toe portion 140 to lower the center of gravity and increase the moment of inertia of the golf club head 100 about a vertical axis that extends through the center of gravity. To lower the center of gravity of the golf club head 100, all or a portion of the second set of weight portions 130 may be located closer to the sole portion 190 than to the horizontal midplane 1020. For example, the weight portions 131, 132, 133, 134, 135, and 136 may be closer to the sole portion 190 than to the horizontal midplane 1020. The locations of the second set of weight portions 130 (i.e., the locations of the second set of exterior weight ports 1430) and the physical properties and materials of construction of the weight portions of the second set of weight portions 130 may be determined to optimally affect the weight, weight distribution, center of gravity, moment of inertia characteristics, structural integrity and/or or other static and/or dynamic characteristics of the golf club head 100. The apparatus, methods, and articles of manufacture described herein are not limited in this regard.

Figure 7:
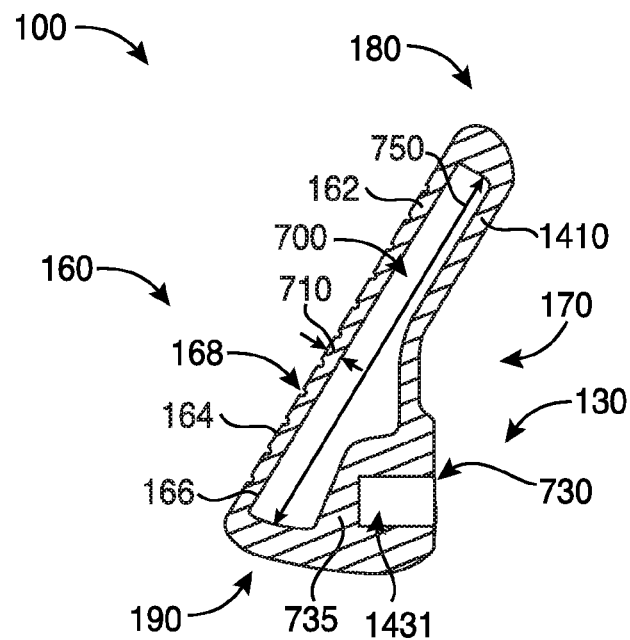
FIG. 7 depicts a cross-sectional view of the example golf club head of FIG. 1 along line 7-7.
Figure 8:
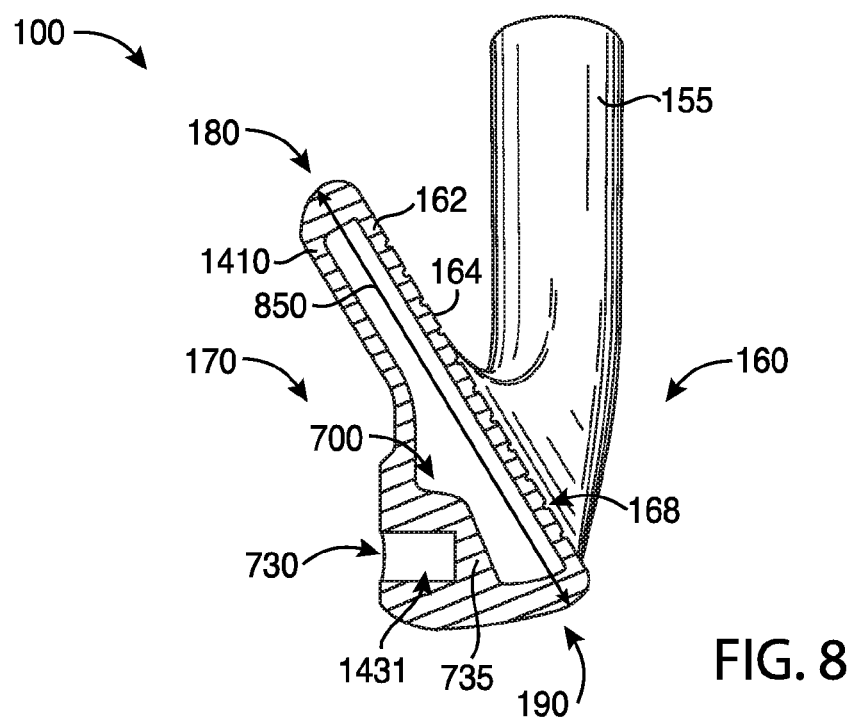
FIG. 8 depicts a cross-sectional view of the example golf club head of FIG. 1 along line 8-8.
Figure 9:
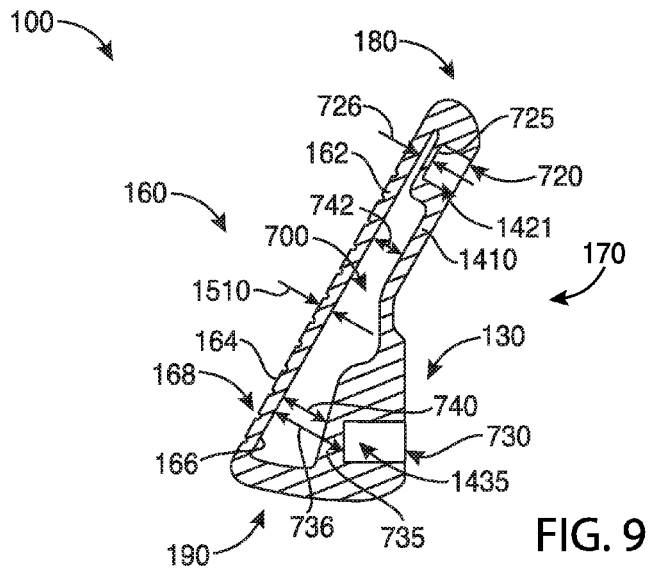
FIG. 9 depicts a cross-sectional view of the example golf club head of FIG. 1 along line 9-9.

Turning to FIGS. 7-9, for example, the first and second sets of weight portions 120 and 130, respectively, may be located away from the back surface 166 of the face portion 162 (e.g., not directly coupled to each other). That is, the first and second sets of weight portions 120 and 130, respectively, and the back surface 166 may be partially or entirely separated by an interior cavity 700 of the body portion 110. As shown in FIG. 14, for example, each exterior weight port of the first and second sets of exterior weight ports 1420 and 1430 may include an opening (e.g., generally shown as 720 and 730) and a port wall (e.g., generally shown as 725 and 735). The port walls 725 and 735 may be integral portions of the back wall portion 1410 (e.g., a section of the back wall portion 1410). Each of the openings 720 and 730 may be configured to receive a weight portion such as weight portions 121 and 135, respectively. The opening 720 may be located at one end of the weight port 1421, and the port wall 725 may be located or proximate to at an opposite end of the weight port 1421. In a similar manner, the opening 730 may be located at one end of the weight port 1435, and the port wall 735 may be located at or proximate to an opposite end of the weight port 1435. The port walls 725 and 735 may be separated from the face portion 162 (e.g., separated by the interior cavity 700). The port wall 725 may have a distance 726 from the back surface 166 of the face portion 162 as shown in FIG. 9. The port wall 735 may have a distance 736 from the back surface 166 of the face portion 162. The distances 726 and 736 may be determined to optimize the location of the center of gravity of the golf club head 100 when the first and second sets of weight ports 1420 and 1430, respectively, receive weight portions as described herein. According to one example, the distance 736 may be greater than the distance 726 so that the center of gravity of the golf club head 100 is moved toward the back portion 170. As a result, a width 740 of a portion of the interior cavity 700 below the horizontal midplane 1020 may be greater than a width 742 of the interior cavity 700 above the horizontal midplane 1020. The apparatus, methods, and articles of manufacture described herein are not limited in this regard.

As discussed herein, the center of gravity (CG) of the golf club head 100 may be relatively farther back away from the face portion 162 and relatively lower towards a ground plane (e.g., one shown as 1010 in FIG. 10) with all or a substantial portion of the second set of weight portions 130 being closer to the sole portion 190 than to the horizontal midplane 1020 and the first and second sets of weight portions 120 and 130, respectively being away from the back surface 166 than if the second set of weight portions 130 were directly coupled to the back surface 166. The locations of the first and second sets of weight ports 1420 and 1430 and the physical properties and materials of construction of the weight portions of the first and second sets of weight portions 120 and 130, respectively, may be determined to optimally affect the weight, weight distribution, center of gravity, moment of inertia characteristics, structural integrity and/or or other static and/or dynamic characteristics of the golf club head 100. The apparatus, methods, and articles of manufacture described herein are not limited in this regard.

While the figures may depict weight ports with a particular cross-section shape, the apparatus, methods, and articles of manufacture described herein may include weight ports with other suitable cross-section shapes. In one example, the weight ports of the first and/or second sets of weight ports 1420 and 1430 may have U-like cross-section shape. In another example, the weight ports of the first and/or second set of weight ports 1420 and 1430 may have V-like cross-section shape. One or more of the weight ports associated with the first set of weight portions 120 may have a different cross-section shape than one or more weight ports associated with the second set of weight portions 130. For example, the weight port 1421 may have a U-like cross-section shape whereas the weight port 1435 may have a V-like cross-section shape. Further, two or more weight ports associated with the first set of weight portions 120 may have different cross-section shapes. In a similar manner, two or more weight ports associated with the second set of weight portions 130 may have different cross-section shapes. The apparatus, methods, and articles of manufacture described herein are not limited in this regard.

The first and second sets of weight portions 120 and 130, respectively, may be similar in mass (e.g., all of the weight portions of the first and second sets 120 and 130, respectively, weigh about the same). Alternatively, the first and second sets of weight portions 120 and 130, respectively, may be different in mass individually or as an entire set. In particular, each of the weight portions of the first set 120 (e.g., shown as 121, 122, 123, and 124) may have relatively less mass than any of the weight portions of the second set 130 (e.g., shown as 131, 132, 133, 134, 135, 136, and 137). For example, the second set of weight portions 130 may account for more than 50% of the total mass from exterior weight portions of the golf club head 100. As a result, the golf club head 100 may be configured to have at least 50% of the total mass from exterior weight portions disposed below the horizontal midplane 1020. The apparatus, methods, and articles of manufacture described herein are not limited in this regard.

In one example, the golf club head 100 may have a mass in the range of about 220 grams to about 330 grams based on the type of golf club (e.g., a 4-iron versus a lob wedge). The body portion 110 may have a mass in the range of about 200 grams to about 310 grams with the first and second sets of weight portions 120 and 130, respectively, having a mass of about 20 grams (e.g., a total mass from exterior weight portions). Each of the weight portions of the first set 120 may have a mass of about one gram (1.0 g) whereas each of the weight portions of the second set 130 may have a mass of about 2.4 grams. The sum of the mass of the first set of weight portions 120 may be about 3 grams whereas the sum of the mass of the first set of weight portions 130 may be about 16.8 grams. The total mass of the second set of weight portions 130 may weigh more than five times as much as the total mass of the first set of weight portions 120 (e.g., a total mass of the second set of weight portions 130 of about 16.8 grams versus a total mass of the first set of weight portions 120 of about 3 grams). The golf club head 100 may have a total mass of 19.8 grams from the first and second sets of weight portions 120 and 130, respectively (e.g., sum of 3 grams from the first set of weight portions 120 and 16.8 grams from the second set of weight portions 130). Accordingly, the first set of weight portions 120 may account for about 15% of the total mass from exterior weight portions of the golf club head 100 whereas the second set of weight portions 130 may be account for about 85% of the total mass from exterior weight portions of the golf club head 100. The apparatus, methods, and articles of manufacture described herein are not limited in this regard.

By coupling the first and second sets of weight portions 120 and 130, respectively, to the body portion 110 (e.g., securing the first and second sets of weight portions 120 and 130 in the weight ports on the back portion 170), the location of the center of gravity (CG) and the moment of inertia (MOI) of the golf club head 100 may be optimized. In particular, as described herein, the first and second sets of weight portions 120 and 130, respectively, may lower the location of the CG towards the sole portion 190 and further back away from the face portion 162. Further, the MOI may be higher as measured about a vertical axis extending through the CG (e.g., perpendicular to the ground plane 1010). The MOI may also be higher as measured about a horizontal axis extending through the CG (e.g., extending towards the toe and heel portions 150 and 160, respectively, of the golf club head 100). As a result, the club head 100 may provide a relatively higher launch angle and a relatively lower spin rate than a golf club head without the first and second sets of weight portions 120 and 130, respectively. The apparatus, methods, and articles of manufacture described herein are not limited in this regard.

Alternatively, two or more weight portions in the same set may be different in mass. In one example, the weight portion 121 of the first set 120 may have a relatively lower mass than the weight portion 122 of the first set 120. In another example, the weight portion 131 of the second set 130 may have a relatively lower mass than the weight portion 135 of the second set 130. With relatively greater mass at the top-and-toe transition region and/or the sole-and-toe transition region, more weight may be distributed away from the center of gravity (CG) of the golf club head 100 to increase the moment of inertia (MOI) about the vertical axis through the CG.

Although the figures may depict the weight portions as separate and individual parts, each set of the first and second sets of weight portions 120 and 130, respectively, may be a single piece of weight portion. In one example, all of the weight portions of the first set 120 (e.g., shown as 121, 122, 123, and 124) may be combined into a single piece of weight portion (e.g., a first weight portion). In a similar manner, all of the weight portions of the second set 130 (e.g., 131, 132, 133, 134, 135, 136, and 137) may be combined into a single piece of weight portion as well (e.g., a second weight portion). In this example, the golf club head 100 may have only two weight portions. While the figures may depict a particular number of weight portions, the apparatus, methods, and articles of manufacture described herein may include more or less number of weight portions. In one example, the first set of weight portions 120 may include two separate weight portions instead of three separate weight portions as shown in the figures. In another example, the second set of weight portions 130 may include five separate weight portions instead of seven separate weight portions a shown in the figures. Alternatively as mentioned above, the apparatus, methods, and articles of manufacture described herein may not include any separate weight portions (e.g., the body portion 110 may be manufactured to include the mass of the separate weight portions as integral part(s) of the body portion 110). The apparatus, methods, and articles of manufacture described herein are not limited in this regard.

Referring back to FIGS. 7-9, for example, the body portion 110 may be a hollow body including the interior cavity 700 extending between the front portion 160 and the back portion 170. Further, the interior cavity 700 may extend between the top portion 180 and the sole portion 190. The interior cavity 700 may be associated with a cavity height 750 ($H_C$), and the body portion 110 may be associated with a body height 850 ($H_B$). While the cavity height 750 and the body height 850 may vary between the toe and heel portions 140 and 150, the cavity height 750 may be at least 50% of a body height 850 ($H_C > 0.5*H_B$). For example, the cavity height 750 may vary between 70-85% of the body height 850. With the cavity height 750 of the interior cavity 700 being greater than 50% of the body height 850, the golf club head 100 may produce relatively more consistent feel, sound, and/or result when the golf club head 100 strikes a golf ball via the face portion 162 than a golf club head with a cavity height of less than 50% of the body height. The apparatus, methods, and articles of manufacture described herein are not limited in this regard.

In one example, the interior cavity 700 may be unfilled (i.e., empty space). The body portion 110 with the interior cavity 700 may weight about 100 grams less than the body portion 110 without the interior cavity 700. Alternatively, the interior cavity 700 may be partially or entirely filled with an elastic polymer or elastomer material (e.g., a viscoelastic urethane polymer material such as Sorbothane® material manufactured by Sorbothane, Inc., Kent, Ohio), a thermoplastic elastomer material (TPE), a thermoplastic polyurethane material (TPU), and/or other suitable types of materials to absorb shock, isolate vibration, and/or dampen noise. For example, at least 50% of the interior cavity 700 may be filled with a TPE material to absorb shock, isolate vibration, and/or dampen noise when the golf club head 100 strikes a golf ball via the face portion 162.

In another example, the interior cavity 700 may be partially or entirely filled with a polymer material such as an ethylene copolymer material to absorb shock, isolate vibration, and/or dampen noise when the golf club head 100 strikes a golf ball via the face portion 162. In particular, at least 50% of the interior cavity 700 may be filled with a high density ethylene copolymer ionomer, a fatty acid modified ethylene copolymer ionomer, a highly amorphous ethylene copolymer ionomer, an ionomer of ethylene acid acrylate terpolymer, an ethylene copolymer comprising a magnesium ionomer, an injection moldable ethylene copolymer that may be used in conventional injection molding equipment to create various shapes, an ethylene copolymer that can be used in conventional extrusion equipment to create various shapes, and/or an ethylene copolymer having high compression and low resilience similar to thermoset polybutadiene rubbers. For example, the ethylene copolymer may include any of the ethylene copolymers associated with DuPont™ High-Performance Resin (HPF) family of materials (e.g., DuPont™ HPF AD1172, DuPont™ HPF AD1035, DuPont® HPF 1000 and DuPont™ HPF 2000), which are manufactured by E.I. du Pont de Nemours and Company of Wilmington, Del. The DuPont™ HPF family of ethylene copolymers are injection moldable and may be used with conventional injection molding equipment and molds, provide low compression, and provide high resilience. The apparatus, methods, and articles of manufacture described herein are not limited in this regard.

Figure 15:
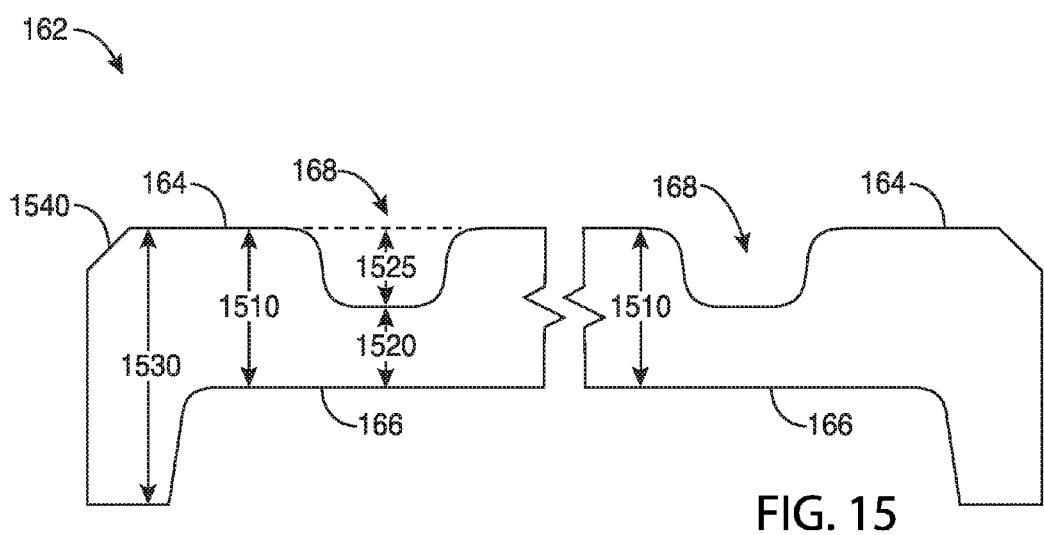
FIG. 15 depicts a cross-sectional view of a face portion of the example golf club head of FIG. 1.

Turning to FIG. 15, for example, the face portion 162 may include a first thickness 1510 ($T_1$), and a second thickness 1520 ($T_2$). The first thickness 1510 may be a thickness of a section of the face portion 162 adjacent to a groove 168 whereas the second thickness 1520 may be a thickness of a section of the face portion 162 below the groove 168. For example, the first thickness 1510 may be a maximum distance between the front surface 164 and the back surface 166. The second thickness 1520 may be based on the groove 168. In particular, the groove 168 may have a groove depth 1525 ($D_{groove}$). The second thickness 1520 may be a maximum distance between the bottom of the groove 168 and the back surface 166. The sum of the second thickness 1520 and the groove depth 1525 may be substantially equal to the first thickness 1510 (e.g., $T_2 + D_{groove} = T_1$). Accordingly, the second thickness 1520 may be less than the first thickness 1510 (e.g., $T_2 < T_1$).

To lower and/or move the CG of the golf club head 100 further back, weight from the front portion 160 of the golf club head 100 may be removed by using a relatively thinner face portion 162. For example, the first thickness 1510 may be about 0.075 inch (1.905 millimeters) (e.g., $T_1 = 0.075$ inch). With the support of the back wall portion 1410 to form the interior cavity 700 and filling at least a portion of the interior cavity 700 with an elastic polymer material, the face portion 162 may be relatively thinner (e.g., $T_1 < 0.075$ inch) without degrading the structural integrity, sound, and/or feel of the golf club head 100. In one example, the first thickness 1510 may be less than or equal to 0.060 inch (1.524 millimeters) (e.g., $T_1 \leq 0.060$ inch). In another example, the first thickness 1510 may be less than or equal to 0.040 inch (1.016 millimeters) (e.g., $T_1 \leq 0.040$ inch). Based on the type of material(s) used to form the face portion 162 and/or the body portion 110, the face portion 162 may be even thinner with the first thickness 1510 being less than or equal to 0.030 inch (0.762 millimeters) (e.g., $T_1 \leq 0.030$ inch). The groove depth 1525 may be greater than or equal to the second thickness 1520 (e.g., $D_{groove} \geq T_2$). In one example, the groove depth 1525 may be about 0.020 inch (0.508 millimeters) (e.g., $D_{groove} = 0.020$ inch). Accordingly, the second thickness 1520 may be about 0.010 inch (0.254 millimeters) (e.g., $T_2 = 0.010$ inch). In another example, the groove depth 1525 may be about 0.015 inch (0.381 millimeters), and the second thickness 1520 may be about 0.015 inch (e.g., $D_{groove} = T_2 = 0.015$ inch). Alternatively, the groove depth 1525 may be less than the second thickness 1520 (e.g., $D_{groove} < T_2$). Without the support of the back wall portion 1410 and the elastic polymer material to fill in the interior cavity 700, a golf club head may not be able to withstand multiple impacts by a golf ball on a face portion. In contrast to the golf club head 100 as described herein, a golf club head with a relatively thin face portion but without the support of the back wall portion 1410 and the elastic polymer material to fill in the interior cavity 700 (e.g., a cavity-back golf club head) may produce unpleasant sound (e.g., a tinny sound) and/or feel during impact with a golf ball. The apparatus, methods, and articles of manufacture described herein are not limited in this regard.

Based on manufacturing processes and methods used to form the golf club head 100, the face portion 162 may include additional material at or proximate to a periphery of the face portion 162. Accordingly, the face portion 162 may also include a third thickness 1530, and a chamfer portion 1540. The third thickness 1530 may be greater than either the first thickness 1510 or the second thickness 1520 (e.g., $T_3 > T_1 > T_2$). In particular, the face portion 162 may be coupled to the body portion 110 by a welding process. For example, the first thickness 1510 may be about 0.030 inch (0.762 millimeters), the second thickness 1520 may be about 0.015 inch (0.381 millimeters), and the third thickness 1530 may be about 0.050 inch (1.27 millimeters). Accordingly, the chamfer portion 1540 may accommodate some of the additional material when the face portion 162 is welded to the body portion 110.

Figure 16:
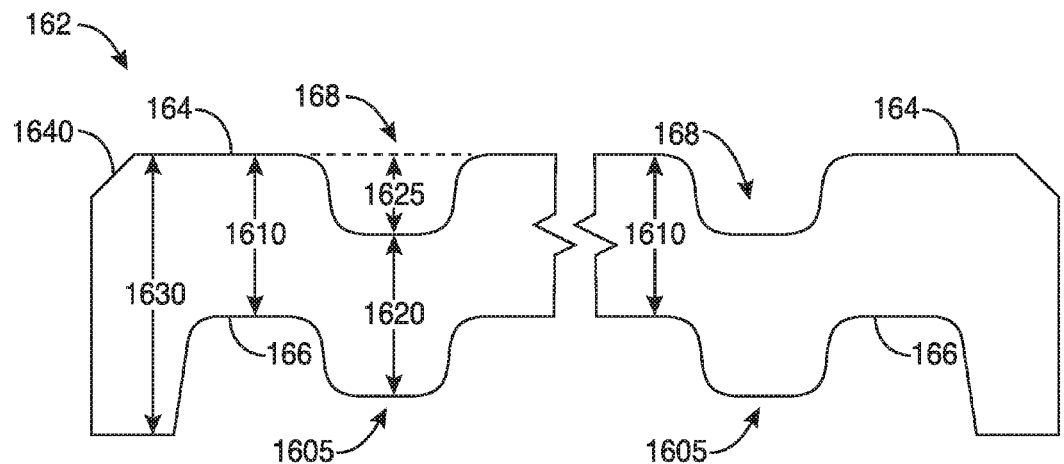
FIG. 16 depicts a cross-sectional view of another face portion of the example golf club head of FIG. 1.

As illustrated in FIG. 16, for example, the face portion 162 may include a reinforcement section, generally shown as 1605, below one or more grooves 168. In one example, the face portion 162 may include a reinforcement section 1605 below each groove. Alternatively, face portion 162 may include the reinforcement section 1605 below some grooves (e.g., every other groove) or below only one groove. The face portion 162 may include a first thickness 1610, a second thickness 1620, a third thickness 1630, and a chamfer portion 1640. The groove 168 may have a groove depth 1625. The reinforcement section 1605 may define the second thickness 1620. The first and second thicknesses 1610 and 1620, respectively, may be substantially equal to each other (e.g., $T_1=T_2$). In one example, the first and second thicknesses 1610 and 1620, respectively, may be about 0.030 inch (0.762 millimeters) (e.g., $T_1=T_2=0.030$ inch). The groove depth 1625 may be about 0.015 inch (0.381 millimeters), and the third thickness 1630 may be about 0.050 inch (1.27 millimeters). The groove 168 may also have a groove width. The width of the reinforcement section 1605 may be greater than or equal to the groove width. The apparatus, methods, and articles of manufacture described herein are not limited in this regard.

Alternatively, the face portion 162 may vary in thickness at and/or between the top portion 180 and the sole portion 190. In one example, the face portion 162 may be relatively thicker at or proximate to the top portion 180 than at or proximate to the sole portion 190 (e.g., thickness of the face portion 162 may taper from the top portion 180 towards the sole portion 190). In another example, the face portion 162 may be relatively thicker at or proximate to the sole portion 190 than at or proximate to the top portion 180 (e.g., thickness of the face portion 162 may taper from the sole portion 190 towards the top portion 180). In yet another example, the face portion 162 may be relatively thicker between the top portion 180 and the sole portion 190 than at or proximate to the top portion 180 and the sole portion 190 (e.g., thickness of the face portion 162 may have a bell-shaped contour). The apparatus, methods, and articles of manufacture described herein are not limited in this regard.

Different from other golf club head designs, the interior cavity 700 of the body portion 110 and the location of the first and second sets of weight portions 120 and 130, respectively, along the perimeter of the golf club head 100 may result in a golf ball traveling away from the face portion 162 at a relatively higher ball launch angle and a relatively lower spin rate. As a result, the golf ball may travel farther (i.e., greater total distance, which includes carry and roll distances).

Figure 17:
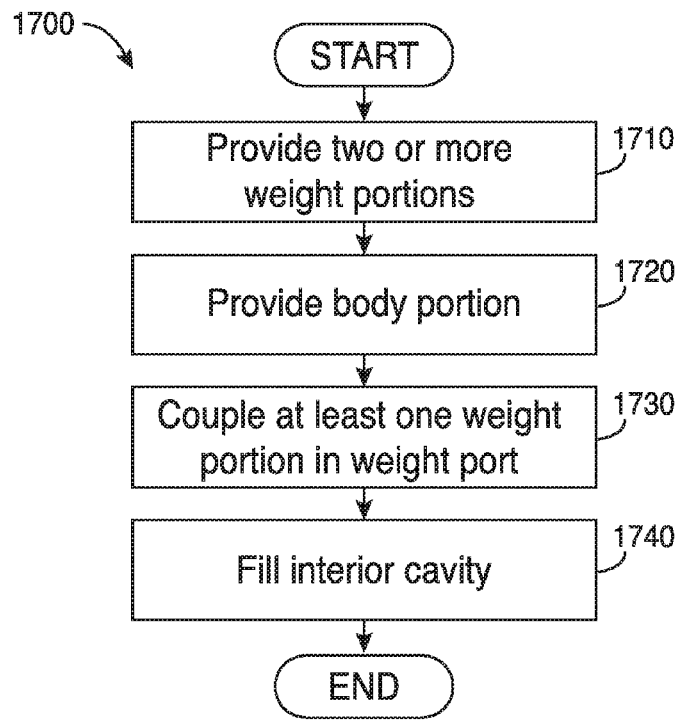
FIG. 17 depicts one manner in which the example golf club head described herein may be manufactured.

FIG. 17 depicts one manner in which the example golf club head described herein may be manufactured. In the example of FIG. 17, the process 1700 may begin with providing two or more weight portions, generally shown as the first and second sets of weight portions 120 and 130, respectively (block 1710). The first and second sets of weight portions 120 and 130, respectively, may be made of a first material such as a tungsten-based material. In one example, the weight portions of the first and second sets 120 and 130, respectively, may be tungsten-alloy screws.

The process 1700 may provide a body portion 110 having the face portion 162, the interior cavity 700, and the back portion 170 with two or more exterior weight ports, generally shown as 1420 and 1430 (block 1720). The body portion 110 may be made of a second material, which is different than the first material. The body portion 110 may be manufacture using an investment casting process, a billet forging process, a stamping process, a computer numerically controlled (CNC) machining process, a die casting process, any combination thereof, or other suitable manufacturing processes. In one example, the body portion 110 may be made of 17-4 PH stainless steel using a casting process. In another example, the body portion 110 may be made of other suitable type of stainless steel (e.g., Nitronic® 50 stainless steel manufactured by AK Steel Corporation, West Chester, Ohio) using a forging process. By using Nitronic® 50 stainless steel to manufacture the body portion 110, the golf club head 100 may be relatively stronger and/or more resistant to corrosion than golf club heads made from other types of steel. Each weight port of the body portion 110 may include an opening and a port wall. For example, the weight port 1421 may include the opening 720 and the port wall 725 with the opening 720 and the port wall 725 being on opposite ends of each other. The interior cavity 700 may separate the port wall 725 of the weight port 1421 and the back surface 166 of the face portion 162. In a similar manner, the weight port 1835 may include the opening 730 and the port wall 735 with the opening 730 and the port wall 735 being on opposite ends of each other. The interior cavity 700 may separate the port wall 735 of the weight port 1435 and the back surface 166 of the face portion 162.

The process 1700 may couple each of the first and second sets of weight portions 120 and 130 into one of the two or more exterior weight ports (blocks 1730). In one example, the process 1700 may insert and secure the weight portion 121 in the exterior weight port 1421, and the weight portion 135 in the exterior weight portion 1435. The process 1700 may use various manufacturing methods and/or processes to secure the first and second sets of weight portions 120 and 130, respectively, in the exterior weight ports such as the weight ports 1421 and 1435 (e.g., epoxy, welding, brazing, mechanical lock(s), any combination thereof, etc.).

Figure 18:
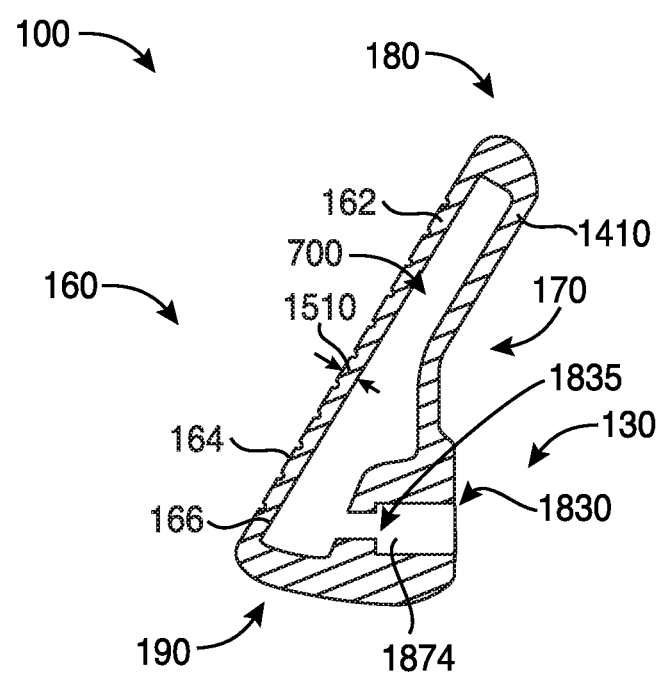
FIG. 18 depicts another cross-sectional view of the example golf club head of FIG. 4 along line 18-18.

The process 1700 may partially or entirely fill the interior cavity 700 with an elastic polymer material (e.g., Sorbothane® material) or a polymer material (e.g., an ethylene copolymer material such as DuPont™ HPF family of materials) (block 1740). In one example, at least 50% of the interior cavity 700 may be filled with the elastic polymer material. As mentioned above, the elastic polymer material may absorb shock, isolate vibration, and/or dampen noise in response to the golf club head 100 striking a golf ball. In addition or alternatively, the interior cavity 700 may be filled with a thermoplastic elastomer material and/or a thermoplastic polyurethane material. As illustrated in FIG. 18, for example, the golf club head 100 may include one or more weight ports (e.g., one shown as 1431 in FIG. 14) with a first opening 1830 and a second opening 1835. The second opening 1835 may be used to access the interior cavity 700. In one example, the process 1700 (FIG. 17) may fill the interior cavity 700 with an elastic polymer material by injecting the elastic polymer material into the interior cavity 700 from the first opening 1830 via the second opening 1835. The first and second openings 1830 and 1835, respectively, may be same or different in size and/or shape. While the above example may describe and depict a particular weight port with a second opening, any other weight ports of the golf club head 100 may include a second opening (e.g., the weight port 720). The apparatus, methods, and articles of manufacture described herein are not limited in this regard.

Referring back to FIG. 17, the example process 1700 is merely provided and described in conjunction with other figures as an example of one way to manufacture the golf club head 100. While a particular order of actions is illustrated in FIG. 17, these actions may be performed in other temporal sequences. For example, two or more actions depicted in FIG. 17 may be performed sequentially, concurrently, or simultaneously. In one example, blocks 1710, 1720, 1730, and/or 1740 may be performed simultaneously or concurrently. Although FIG. 17 depicts a particular number of blocks, the process may not perform one or more blocks. In one example, the interior cavity 700 may not be filled (i.e., block 1740 may not be performed). The apparatus, methods, and articles of manufacture described herein are not limited in this regard.

Referring back to FIGS. 1-14, the face portion 162 may include a non-smooth back surface to improve adhesion and/or mitigate delamination between the face portion 162 and the elastic polymer material used to fill the interior cavity 700 (e.g., FIG. 7). Various methods and/or processes such as an abrasive blasting process (e.g., a bead blasting process, a sand blasting process, other suitable blasting process, or any combination thereof) and/or a milling (machining) process may be used to form the back surface 166 into a non-smooth surface. For example, the back surface 166 may have with a surface roughness (Ra) ranging from 0.5 to 250 μin (0.012 to 6.3 μm). The apparatus, methods, and articles of manufacture are not limited in this regard.

Figure 19:
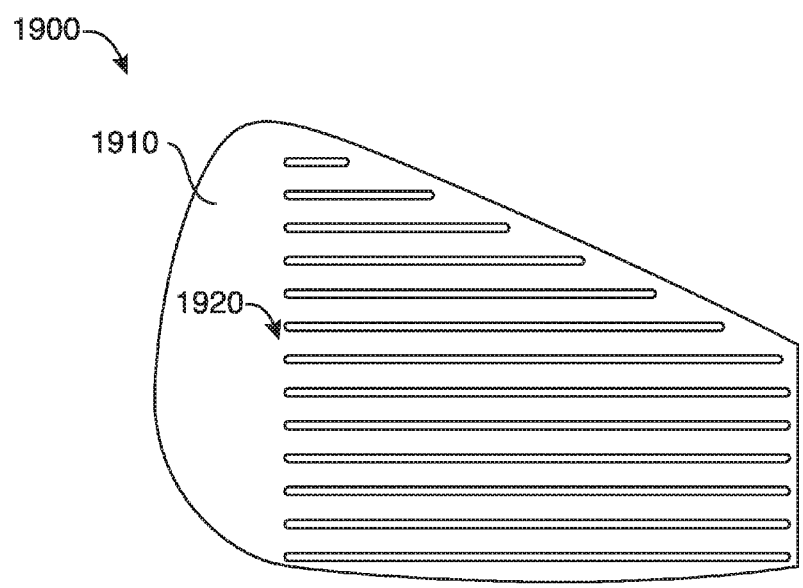
FIG. 19 depicts a front view of a face portion of the example golf club head of FIG. 1.
Figure 20:
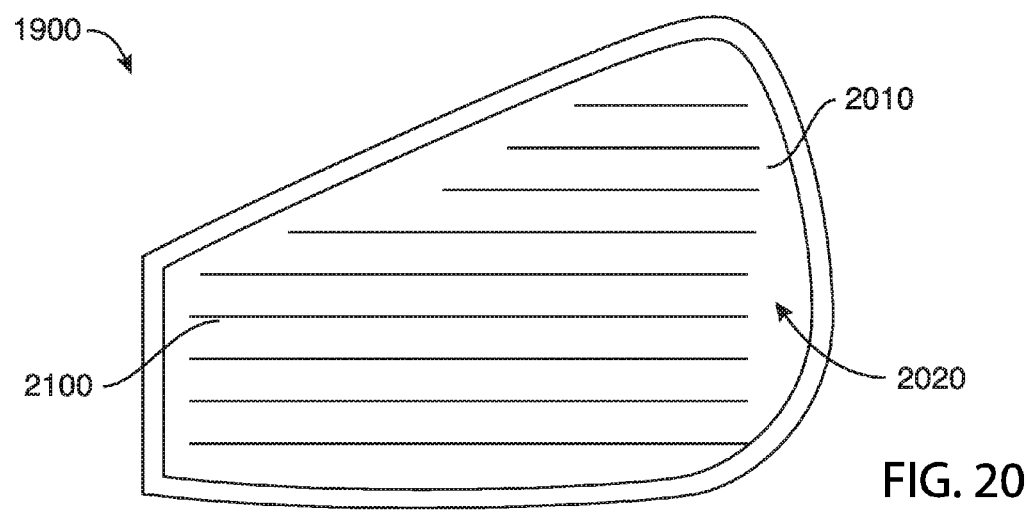
FIG. 20 depicts a back view of the face portion of FIG. 19.
Figure 21:
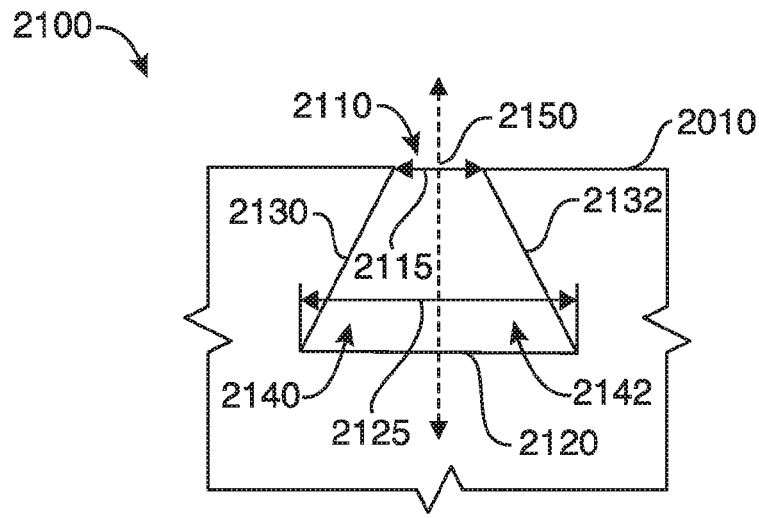
FIG. 21 depicts a cross-sectional view of an example channel of the face portion of FIG. 19.

As illustrated in FIGS. 19-21, for example, a face portion 1900 may include the front surface 1910, and the back surface 2010. The front surface 1910 may include one or more grooves, generally shown as 1920, extending longitudinally across the front surface 1910 (e.g., extending between the toe portion 140 and the heel portion 150 of FIG. 1). The front surface 1910 may be used to impact a golf ball (not shown).

The back surface 2010 may also include one or more channels, generally shown as 2020. The channels 2020 may extend longitudinally across the back surface 2010. The channels 2020 may be parallel or substantially parallel to each other. The channels 2020 may engage with the elastic polymer material used to fill the interior cavity 700, and serve as a mechanical locking mechanism between the face portion 1900 and the elastic polymer material. In particular, a channel 2100 may include an opening 2110, a bottom section 2120, and two sidewalls, generally shown as 2130 and 2132. The bottom section 2120 may be parallel or substantially parallel to the back surface 2010. The two sidewalls 2130 and 2132 may be converging sidewalls (i.e., the two sidewalls 2130 and 2132 may not be parallel to each other). The bottom section 2120 and the sidewalls 2130 and 2132 may form two undercut portions, generally shown as 2140 and 2142. That is, a width 2115 at the opening 2110 may be less than a width 2125 of the bottom section 2120. A cross section of the channel 2100 may be symmetrical about an axis 2150. While FIG. 21 may depict flat or substantially flat sidewalls, the two sidewalls 2130 and 2132 may be curved (e.g., convex relative to each other).

Figure 22:
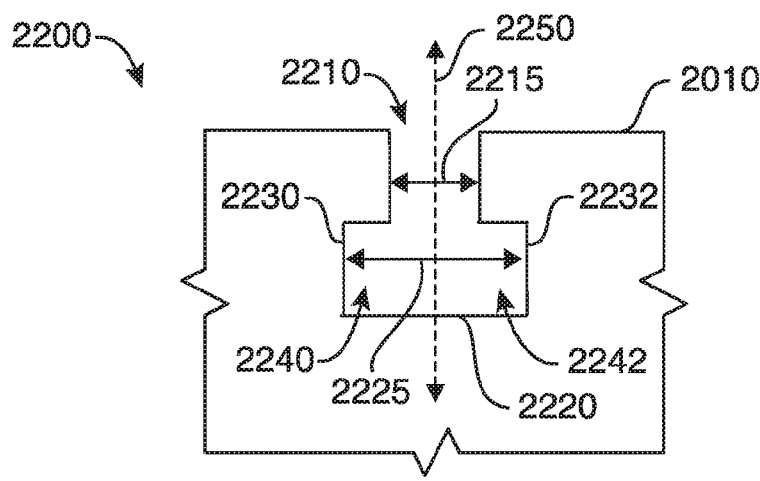
FIG. 22 depicts a cross-sectional view of another example channel of the face portion of FIG. 19.

Instead of flat or substantially flat sidewalls as shown in FIG. 21, a channel may include other types of sidewalls. As illustrated in FIG. 22, for example, a channel 2200 may include an opening 2210, a bottom section 2220, and two sidewalls, generally shown as 2230 and 2232. The bottom section 2220 may be parallel or substantially parallel to the back surface 2010. The two sidewalls 2230 and 2232 may be stepped sidewalls. The bottom section 2220 and the sidewalls 2230 and 2232 may form two undercut portions, generally shown as 2240 and 2242. That is, a width 2215 at the opening 2210 may be less than a width 2225 of the bottom section 2220. A cross section of the channel 2200 may be symmetrical about an axis 2250.

Figure 23:
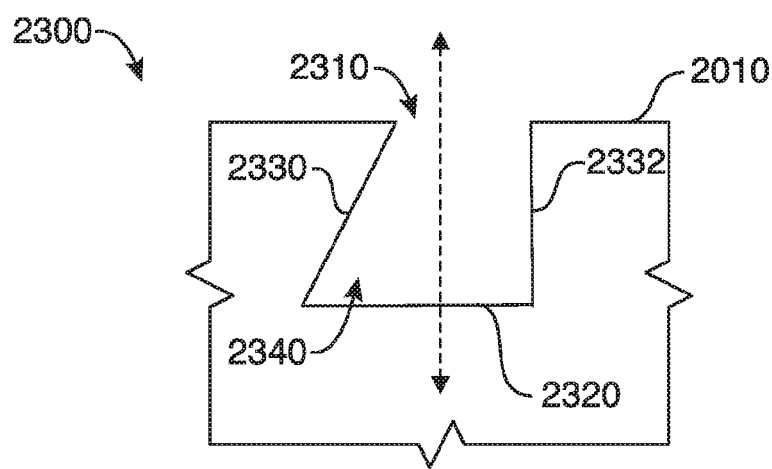
FIG. 23 depicts a cross-sectional view of yet another example channel of the face portion of FIG. 19.

Instead of being symmetrical as shown in FIGS. 21 and 22, a channel may be asymmetrical. As illustrated in FIG. 23, for another example, a channel 2300 may include an opening 2310, a bottom section 2320, and two sidewalls, generally shown as 2330 and 2332. The bottom section 2320 may be parallel or substantially parallel to the back surface 2010. The bottom section 2320 and the sidewall 2330 may form an undercut portion 2340.

Figure 24:
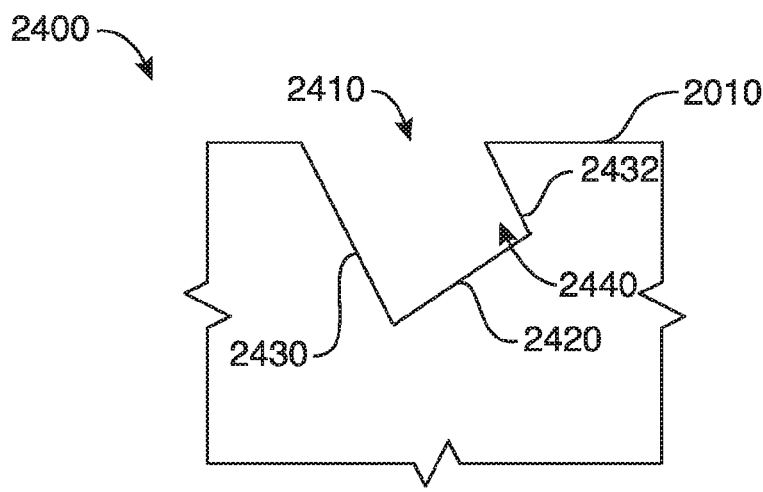
FIG. 24 depicts a cross-sectional view of yet another example channel of the face portion of FIG. 19.

Referring to FIG. 24, for example, a channel 2400 may include an opening 2410, a bottom section 2420, and two sidewalls, generally shown as 2430 and 2432. The bottom section 2420 may not be parallel or substantially parallel to the back surface 2010. The two sidewalls 2430 and 2432 may be parallel or substantially parallel to each other but one sidewall may be longer than the other sidewall. The bottom section 2420 and the sidewall 2432 may form an undercut portion 2440.

Figure 25:
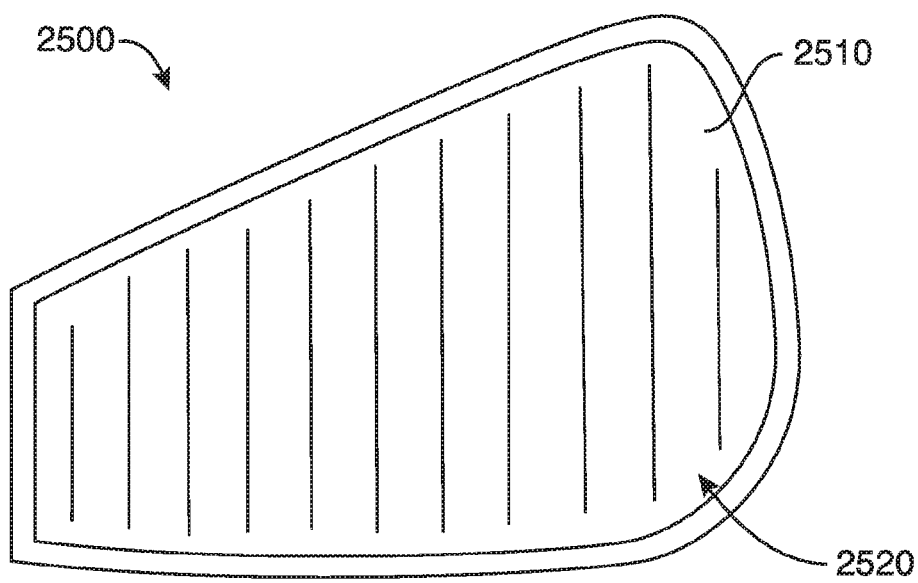
FIG. 25 depicts a back view of another example face portion of the example golf club head of FIG. 1.
Figure 26:
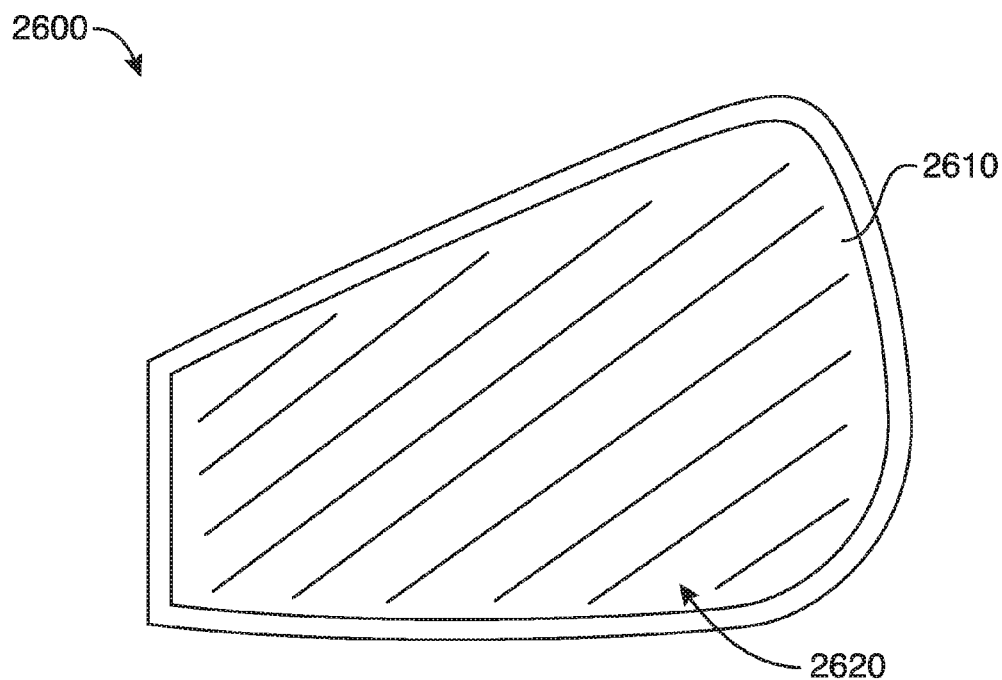
FIG. 26 depicts a back view of yet another example face portion of the example golf club head of FIG. 1.
Figure 27:
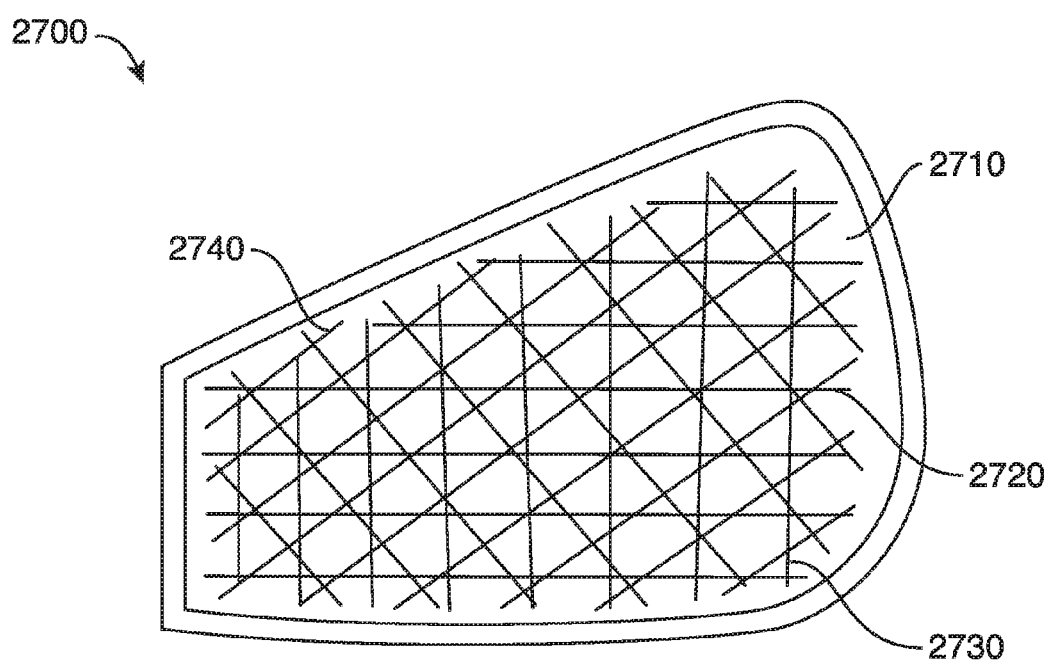
FIG. 27 depicts a back view of yet another example face portion of the example golf club head of FIG. 1.

In the example as shown in FIG. 25, a face portion 2500 may include a back surface 2510 with one or more channels, generally shown as 2520, extending laterally across the back surface 2510 (e.g., extending between the top portion 180 and the sole portion 190 of FIG. 1). In another example as depicted in FIG. 26, a face portion 2600 may include a back surface 2610 with one or more channels, generally shown as 2620, extending diagonally across the back surface 2610. Alternatively, a face portion may include a combination of channels extending in different directions across a back surface of the face portion (e.g., extending longitudinally, laterally, and/or diagonally). Turning to FIG. 27, for yet another example, a face portion 2700 may include a back surface 2710 with one or more channels, generally shown as 2720, 2730, and 2740, extending in different directions across the back surface 2710. In particular, the face portion 2700 may include a plurality of channels 2720 extending longitudinally across the back surface 2710, a plurality of channels 2730 extending laterally across the back surface 2710, and a plurality of channels 2740 extending diagonally across the back surface 2710.

Figure 28:
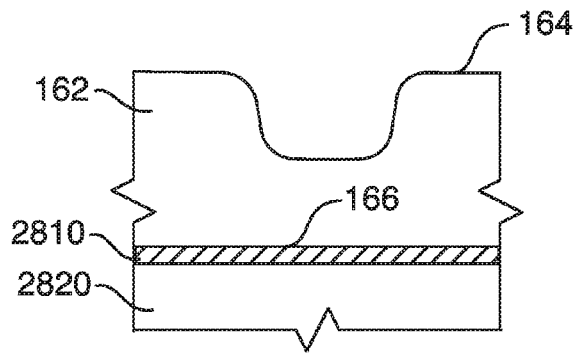
FIG. 28 depicts a cross-sectional view of the example golf club head of FIG. 1.

Referring to FIG. 28, for example, the golf club head 100 may include the face portion 162, a bonding portion 2810, and an elastic polymer material 2820. The bonding portion 2810 may provide connection, attachment and/or bonding of the elastic polymer material 2820 to the face portion 162. The bonding portion 2810 may be a bonding agent, a combination of bonding agents, a bonding structure or attachment device, a combination of bonding structures and/or attachment devices, and/or a combination of one or more bonding agents, one or more bonding structures and/or one or more attachment devices. For example, the golf club head 100 may include a bonding agent to improve adhesion and/or mitigate delamination between the face portion 162 and the elastic polymer material used to fill the interior cavity 700 of the golf club head 100 (e.g., FIG. 7). In one example, the bonding portion 2810 may be low-viscosity, organic, solvent-based solutions and/or dispersions of polymers and other reactive chemicals such as MEGUM™, ROBOND™, and/or THIXON™ materials manufactured by the Dow Chemical Company, Auburn Hills, Mich. In another example, the bonding portion 2810 may be LOCTITE® materials manufactured by Henkel Corporation, Rocky Hill, Conn. The bonding portion 2810 may be applied to the back surface 166 to bond the elastic polymer material 2820 to the face portion 162 (e.g., extending between the back surface 166 and the elastic polymer material 2820). For example, the bonding portion 2810 may be applied when the interior cavity 700 is filled with the elastic polymer material 2820 via an injection-molding process. The apparatus, methods, and articles of manufacture are not limited in this regard.

Figure 29:
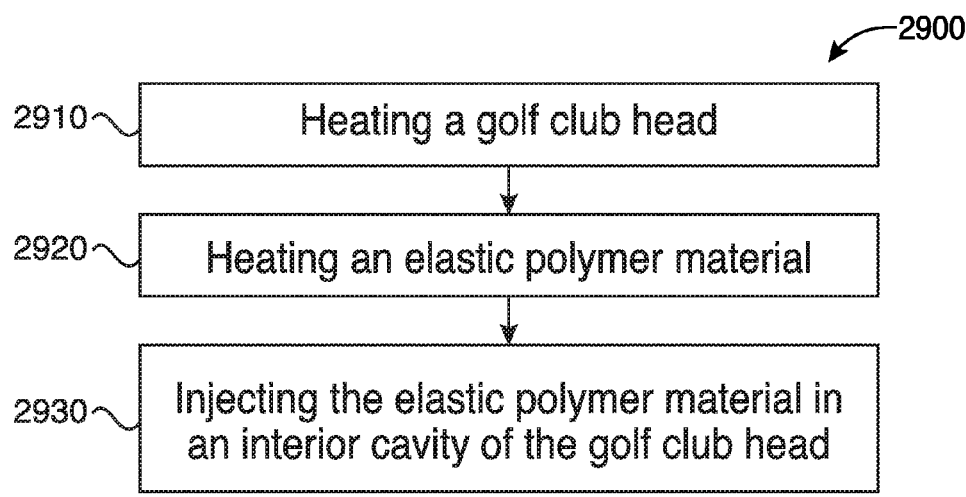
FIG. 29 depicts another manner in which an example golf club head described herein may be manufactured.

FIG. 29 depicts one manner in which the interior cavity 700 of the golf club head 100 or any of the golf club heads described herein is partially or entirely filled with an elastic polymer material or an elastomer material. The process 2900 may begin with heating the golf club head 100 to a certain temperature (block 2910). In one example, the golf club head 100 may be heated to a temperature ranging between 150° C. to 250° C., which may depend on factors such as the vaporization temperature of the elastic polymer material to be injected in the interior cavity 700. The elastic polymer material may then be heated to a certain temperature (block 2920). The elastic polymer material may be a non-foaming and injection-moldable thermoplastic elastomer (TPE) material. Accordingly, the elastic polymer material may be heated to reach a liquid or a flowing state prior to being injected into the interior cavity 700. The temperature to which the elastic polymer material may be heated may depend on the type of elastic polymer material used to partially or fully fill the interior cavity 700. The heated elastic polymer material may be injected into the interior cavity 700 to partially or fully fill the interior cavity 700 (block 2930). The elastic polymer material may be injected into the interior cavity 700 from one or more of the weight ports described herein (e.g., one or more weight ports of the first and second sets of weight ports 1420 and 1430, respectively, shown in FIG. 14). One or more other weight ports may allow the air inside the interior cavity 700 displaced by the elastic polymer material to vent from the interior cavity 700. In one example, the golf club head 100 may be oriented horizontally as shown in FIG. 14 during the injection molding process. The elastic polymer material may be injected into the interior cavity 700 from weight ports 1431 and 1432. The weight ports 1421, 1422 and/or 1423 may serve as air ports for venting the displaced air from the interior cavity 700. Thus, regardless of the orientation of the golf club head 100 during the injection molding process, the elastic polymer material may be injected into the interior cavity 700 from one or more lower positioned weight ports while one or more upper positioned weight ports may serve as air vents. The mold (i.e., the golf club head 100) may then be cooled passively (e.g., at room temperature) or actively so that the elastic polymer material reaches a solid state and adheres to the back surface 166 of the face portion 162. The elastic polymer material may directly adhere to the back surface 166 of the face portion 162. Alternatively, the elastic polymer material may adhere to the back surface 166 of the face portion 162 with the aid of the one or more structures on the back surface 166 and/or a bonding agent described herein (e.g., the bonding portion 2810 shown in FIG. 28). The apparatus, methods, and articles of manufacture described herein are not limited in this regard.

As discussed above, the elastic polymer material may be heated to a liquid state (i.e., non-foaming) and solidifies after being injection molded in the interior cavity 700. An elastic polymer material with a low modulus of elasticity may provide vibration and noise dampening for the face portion 162 when the face portion 162 impacts a golf ball. For example, an elastic polymer material that foams when heated may provide vibration and noise dampening. However, such a foaming elastic polymer material may not have sufficient rigidity to provide structural support to a relatively thin face portion because of possible excessive deflection and/or compression of the elastic polymer material when absorbing the impact of a golf ball. In one example, the elastic polymer material that is injection molded in the interior cavity 700 may have a relatively high modulus of elasticity to provide structural support to the face portion 162 and yet elastically deflect to absorb the impact forces experienced by the face portion 162 when striking a golf ball. Thus, a non-foaming and injection moldable elastic polymer material with a relatively high modulus of elasticity may be used for partially or fully filling the interior cavity 700 to provide structural support and reinforcement for the face portion 162 in addition to providing vibration and noise dampening. That is, the non-foaming and injection moldable elastic polymer material may be a structural support portion for the face portion 162. The apparatus, methods, and articles of manufacture are not limited in this regard.

Figure 30:
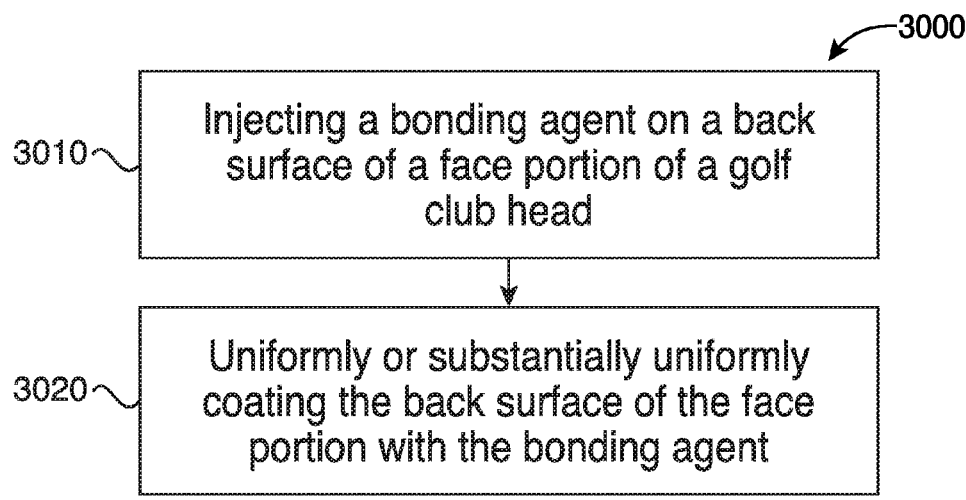
FIG. 30 depicts yet another manner in which an example golf club head described herein may be manufactured.

FIG. 30 depicts one manner in which a bonding agent as described herein may be applied to a golf club head prior to partially of fully injecting an elastic polymer in the interior cavity 700. In the example of FIG. 30, the process 3000 may begin with injecting a bonding agent on the back surface 166 of the face portion 162 (block 3010). The bonding agent may be injected on the back surface 166 prior to or after heating the golf club head as described above depending on the properties of the bonding agent. The bonding agent may be injected through one or more of the first set of weight ports 1420 and/or the second set of weight ports 1430. The bonding agent may be injected on the back surface 166 through several or all of the first set of weight ports 1420 and the second set of weight ports 1430. For example, an injection instrument such as a nozzle or a needle may be inserted into each weight port until the tip or outlet of the instrument is near the back surface 166. The bonding agent may then be injected on the back surface 166 from the outlet of the instrument. Additionally, the instrument may be moved, rotated and/or swiveled while inside the interior cavity 700 so that the bonding agent is injected onto an area of the back surface 166 surrounding the instrument. For example, the outlet of the injection instrument may be moved in a circular pattern while inside a weight port to inject the bonding agent in a corresponding circular pattern on the back surface 166. Each of the first set of weight ports 1420 and the second set of weight ports 1430 may be utilized to inject a bonding agent on the back surface 166. However, utilizing all of first weight ports 1420 and/or the second set of weight ports 1430 may not be necessary. For example, using every other adjacent weight port may be sufficient to inject a bonding agent on the entire back surface 166. In another example, weight ports 1421, 1422 1431, 1433 and 1436 may be used to inject the bonding agent on the back surface 166. The apparatus, methods, and articles of manufacture are not limited in this regard.

The process 3000 may also include spreading the bonding agent on the back surface 166 (block 3020) after injection of the bonding agent onto the back surface 166 so that a generally uniform coating of the bonding agent is provided on the back surface 166. According to one example, the bonding agent may be spread on the back surface 166 by injecting air into the interior cavity 700 through one or more of the first set of weight ports 1420 and the second set of weight ports 1430. The air may be injected into the interior cavity 700 and on the back surface 166 by inserting an air nozzle into one or more of the first set of weight ports 1420 and the second set of weight ports 1430. According to one example, the air nozzle may be moved, rotated and/or swiveled at a certain distance from the back surface 166 so as to uniformly blow air onto the bonding agent to spread the bonding agent on the back surface 166 for a uniform coating or a substantially uniform coating of the bonding agent on the back surface 166. The apparatus, methods, and articles of manufacture are not limited in this regard.

The example process 3000 is merely provided and described in conjunction with other figures as an example of one way to manufacture the golf club head 100. While a particular order of actions is illustrated in FIG. 30, these actions may be performed in other temporal sequences. Further, two or more actions depicted in FIG. 30 may be performed sequentially, concurrently, or simultaneously. The process 3000 may include a single action of injecting and uniformly or substantially uniformly coating the back surface 166 with the bonding agent. In one example, the bonding agent may be injected on the back surface 166 by being converted into fine particles or droplets (i.e., atomized) and sprayed on the back surface 166. Accordingly, the back surface 166 may be uniformly or substantially uniformly coated with the bonding agent in one action. A substantially uniform coating of the back surface 166 with the bonding agent may be defined as a coating having slight non-uniformities due to the injection process or the manufacturing process. However, such slight non-uniformities may not affect the bonding of the elastic polymer material or the elastomer material to the back surface 166 with the bonding agent as described herein. For example, spraying the bonding agent on the back surface 166 may result in overlapping regions of the bonding agent having a slightly greater coating thickness than other regions of the bonding agent on the back surface 166. The apparatus, methods, and articles of manufacture are not limited in this regard.

Figure 31:
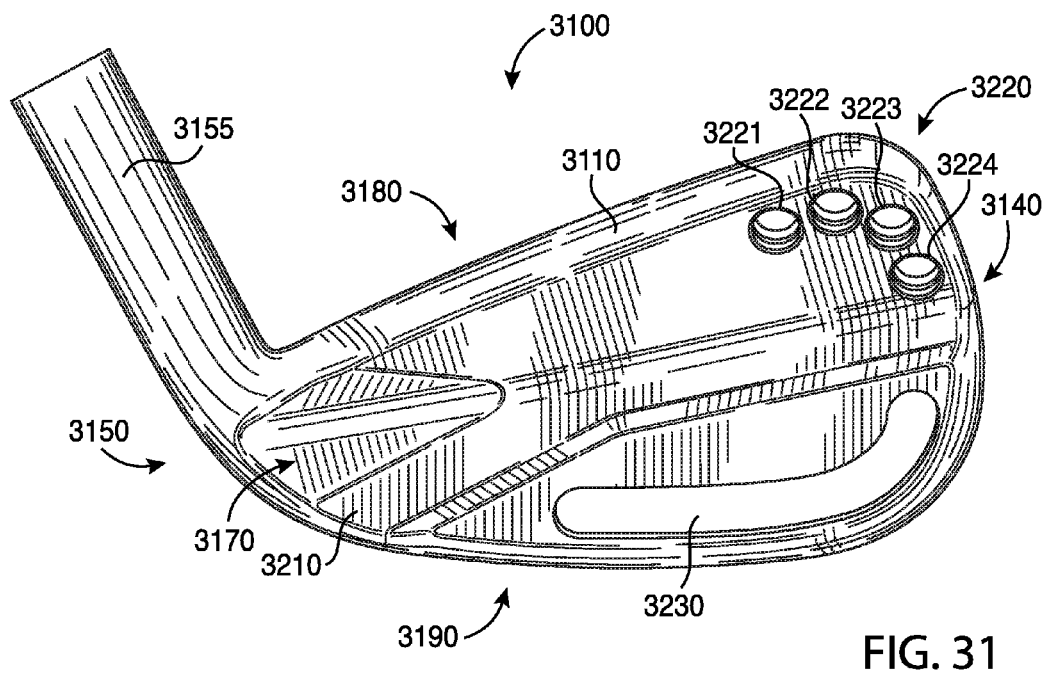
FIG. 31 depicts a rear view of a golf club head according to an embodiment of the apparatus, methods, and articles of manufacture described herein.
Figure 32:
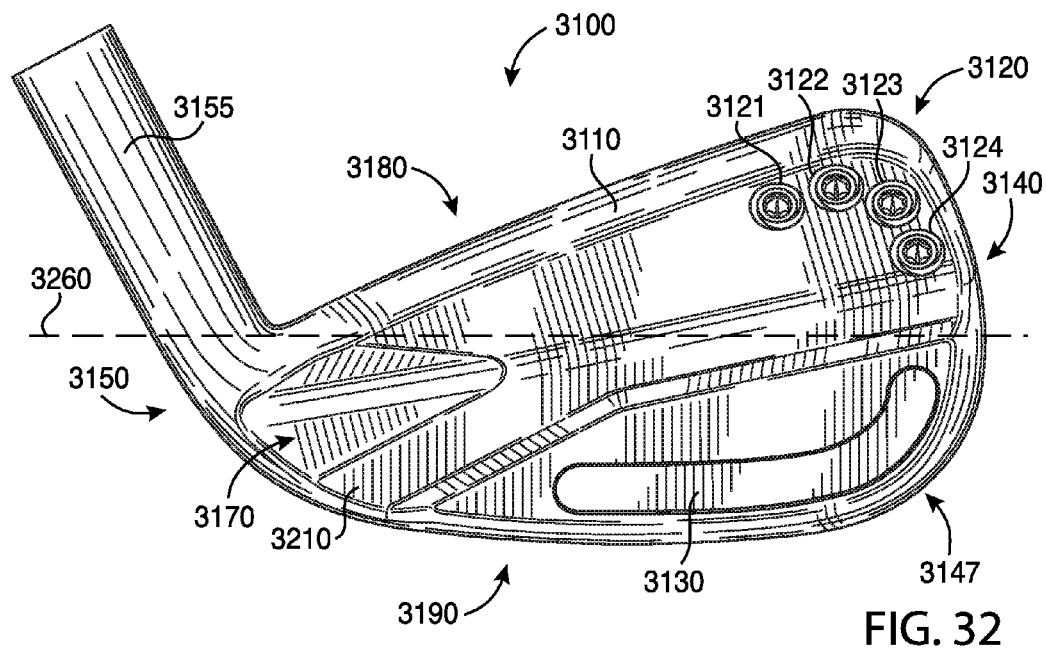
FIG. 32 depicts a rear view of the golf club head of FIG. 31.
Figure 33:
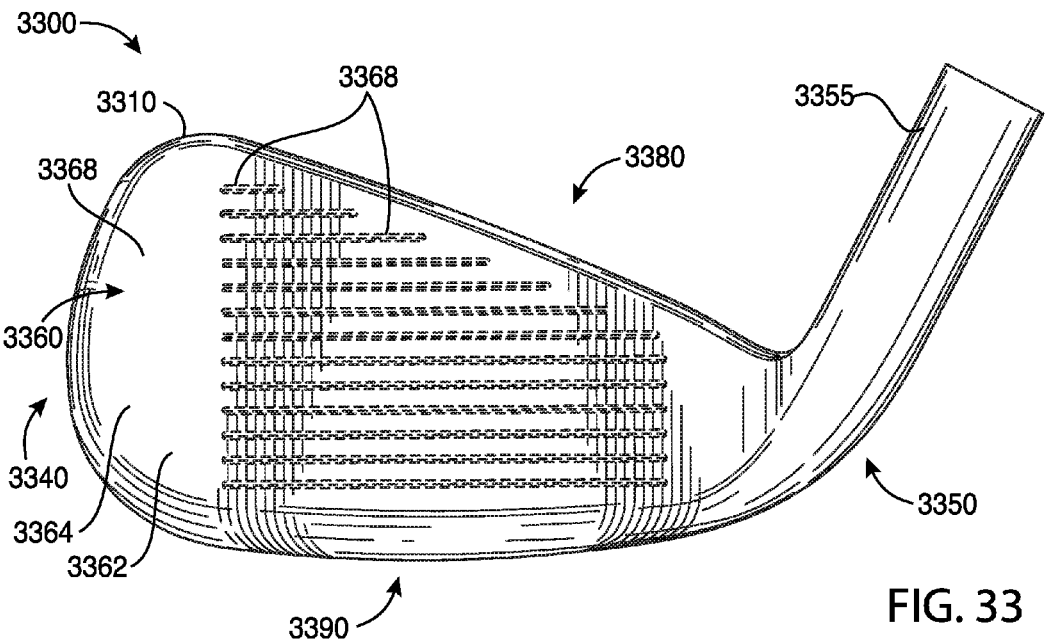
FIG. 33 depicts a front view of a golf club head according to an embodiment of the apparatus, methods, and articles of manufacture described herein.

As described herein, any two or more of the weight portions may be configured as a single weight portion. In the example of FIGS. 31 and 32, a golf club head 3100 may include a body portion 3110 and two or more weight portions, generally shown as a first set of weight portions 3120 (e.g., shown as weight portions 3121, 3122, 3123, and 3124) and a second weight portion 3130. The body portion 3110 may include a toe portion 3140, a heel portion 3150, a front portion (not shown), a back portion 3170, a top portion 3180, and a sole portion 3190. The front portion may be similar in many respects to the front portion 160 of the golf club head 100. Accordingly, details of the front portion of the golf club head 3100 are not provided.

The body portion 3110 may be made of a first material whereas the first set of weight portions 3120 and the second weight portion 3130 may be made of a second material. The first and second materials may be similar or different materials. For example, the body portion 3110 may be partially or entirely made of a steel-based material (e.g., 17-4 PH stainless steel, Nitronic® 50 stainless steel, maraging steel or other types of stainless steel), a titanium-based material, an aluminum-based material (e.g., a high-strength aluminum alloy or a composite aluminum alloy coated with a high-strength alloy), any combination thereof, and/or other suitable types of materials. The first set of weight portions 3120 and the second weight portion 3130 may be partially or entirely made of a high-density material such as a tungsten-based material or other suitable types of materials. Alternatively, the body portion 3110 and/or the first set of weight portions 3120 and the second weight portion 3130 may be partially or entirely made of a non-metal material (e.g., composite, plastic, etc.). The apparatus, methods, and articles of manufacture are not limited in this regard.

The golf club head 3100 may be an iron-type golf club head (e.g., a 1-iron, a 2-iron, a 3-iron, a 4-iron, a 5-iron, a 6-iron, a 7-iron, an 8-iron, a 9-iron, etc.) or a wedge-type golf club head (e.g., a pitching wedge, a lob wedge, a sand wedge, an n-degree wedge such as 44 degrees (°), 48°, 52°, 56°, 60°, etc.). Although FIGS. 31 and 32 may depict a particular type of club head, the apparatus, methods, and articles of manufacture described herein may be applicable to other types of club heads (e.g., a driver-type club head, a fairway wood-type club head, a hybrid-type club head, a putter-type club head, etc.). The apparatus, methods, and articles of manufacture described herein are not limited in this regard.

The toe portion 3140 and the heel portion 3150 may be on opposite ends of the body portion 3110. The heel portion 3150 may include a hosel portion 3155 configured to receive a shaft (not shown) with a grip (not shown) on one end and the golf club head 3100 on the opposite end of the shaft to form a golf club.

The back portion 3170 may include a back wall portion 3210 with one or more exterior weight ports along a periphery of the back portion 3170, generally shown as a first set of exterior weight ports 3220 (e.g., shown as weight ports 3221, 3222, 3223, and 3224) and a second weight port 3230. Each exterior weight port of the first set of weight ports 3220 may be associated with a port diameter. In one example, the port diameter may be about 0.25 inch (6.35 millimeters). Any two adjacent exterior weight ports of the first set of exterior weight ports 3220 may be separated by less than the port diameter. The first set of weight ports 3220 and the second weight port 3230 may be exterior weight ports configured to receive one or more weight portions.

Each weight portion of the first set of weight portions 3120 (e.g., shown as weight portions 3121, 3122, 3123, and 3124) may be disposed in a weight port of the first set of weight ports 3220 (e.g., shown as weight ports 3221, 3222, 3223, and 3224) located at or proximate to the toe portion 3140 and/or the top portion 3180 on the back portion 3170. For example, the weight portion 3121 may be partially or entirely disposed in the weight port 3221. In another example, the weight portion 3122 may be disposed in a weight port 3222 located in a transition region between the top portion 3180 and the toe portion 3140 (e.g., a top-and-toe transition region). The configuration of the first set of weight ports 3220 and the first set of weight portions 3120 is similar to many respects to the golf club head 100. Accordingly, a detailed description of the configuration of the first set of weight ports 3220 and the first set of weight portions 3120 is not provided.

The second weight port 3230 may be a recess extending from the toe portion 3140 or a location proximate to the toe portion 3140 to the sole portion or a location proximate to the sole portion 3190 and through the transition region between the toe portion 3140 and the sole portion 3190. Accordingly, as shown in FIG. 31, the second weight port 3230 may resemble an L-shaped recess. The second weight portion 3130 may resemble the shape of the second weight port 3230 and may be configured to be disposed in the second weight port 3230. The second weight portion 3130 may be partially or fully disposed in the weight port 3230. The second weight portion 3130 may have any shape such as oval, rectangular, triangular, or any geometric or non-geometric shape. The second weight port 3230 may be shaped similar to the second weight portion 3130. However, portions of the second weight portion 3130 that are inserted in the second weight port 3230 may have similar shapes as the weight port 3230. As described in detail herein, any of the weight portions described herein, including the weight portions 3120 and the second weight portion 3130 may be coupled to the back portion 3170 of the body portion 3110 with various manufacturing methods and/or processes (e.g., a bonding process, a welding process, a brazing process, a mechanical locking method, any combination thereof, or other suitable manufacturing methods and/or processes).

The second weight portion 3130 may be configured to place the center of gravity of the golf club head 100 at an optimal location and optimize the moment of inertia of the golf club head about a vertical axis that extends through the center of gravity of the golf club head 3100. All or a substantial portion of the second weight portion 3130 may be generally near the sole portion 3190. For example, the second weight portion 3130 may be near the periphery of the body portion 3110 and extend from the sole portion 3190 to the toe portion 3140. As shown in the example of FIG. 32, the second weight portion 3130 may be located near the periphery of the body portion 3110 and partially or substantially extend along the sole portion 3190 to lower the center of gravity of the golf club head 3100. A portion of the second weight portion 3130 may be located near the periphery of the body portion 3110 and extend from the sole portion 3190 to the toe portion 3140 through a transition region 3147 between the sole portion 3190 and the toe portion 3140 to lower the center of gravity and increase the moment of inertia of the golf club head 3100 about a vertical axis that extends through the center of gravity. To lower the center of gravity of the golf club head 3100, all or a portion of the second weight portion 3130 may be located closer to the sole portion 3190 than to a horizontal midplane 3260 of the golf club head 3100. The location of the second weight portion 3130 (i.e., the location of the weight port 3230) and the physical properties and materials of construction of the weight portions of the second weight port 3230 may be determined to optimally affect the weight, weight distribution, center of gravity, moment of inertia characteristics, structural integrity and/or or other static and/or dynamic characteristics of the golf club head 3100. The apparatus, methods, and articles of manufacture described herein are not limited in this regard.

The weight portions of the first set of weight portions 3120 may have similar or different physical properties (e.g., color, shape, size, density, mass, volume, etc.). In the illustrated example as shown in FIG. 32, each of the weight portions of the first set of weight portions 3120 may have a cylindrical shape (e.g., a circular cross section). Alternatively, each of the weight portions of the first set of weight portions 3120 may have different shapes. Although the above examples may describe weight portions having a particular shape, the apparatus, methods, and articles of manufacture described herein may include weight portions of other suitable shapes (e.g., a portion of or a whole sphere, cube, cone, cylinder, pyramid, cuboidal, prism, frustum, or other suitable geometric shape). The apparatus, methods, and articles of manufacture described herein are not limited in this regard.

In the example of FIGS. 33-42, a golf club head 3300 may include a body portion 3310, and two or more weight portions, generally shown as a first set of weight portions 3320 (e.g., shown as weight portions 3321 and 3322) and a second set of weight portions 3330 (e.g., shown as weight portions 3331, 3332, 3333, 3334 and 3335). The body portion 3310 may include a toe portion 3340, a heel portion 3350, a front portion 3360, a back portion 3370, a top portion 3380, and a sole portion 3390. The heel portion 3350 may include a hosel portion 3355 configured to receive a shaft (not shown) with a grip (not shown) on one end and the golf club head 3300 on the opposite end of the shaft to form a golf club.

The body portion 3310 may be made of a first material whereas the first and second sets of weight portions 3320 and 3330, respectively, may be made of a second material. The first and second materials may be similar or different materials. The materials from which the golf club head 3300, weight portions 3320 and/or weight portions 3330 are constructed may be similar in many respects to any of the golf club heads and the weight portions described herein such as the golf club head 100. Accordingly, a detailed description of the materials of construction of the golf club head 3300, weight portions 3320 and/or weight 3330 are not described in detail. The apparatus, methods, and articles of manufacture are not limited in this regard.

The golf club head 3300 may be an iron-type golf club head (e.g., a 1-iron, a 2-iron, a 3-iron, a 4-iron, a 5-iron, a 6-iron, a 7-iron, an 8-iron, a 9-iron, etc.) or a wedge-type golf club head (e.g., a pitching wedge, a lob wedge, a sand wedge, an n-degree wedge such as 44 degrees (°), 48°, 52°, 56°, 60°, etc.). Although FIGS. 33-42 may depict a particular type of club head, the apparatus, methods, and articles of manufacture described herein may be applicable to other types of club heads (e.g., a driver-type club head, a fairway wood-type club head, a hybrid-type club head, a putter-type club head, etc.). The apparatus, methods, and articles of manufacture described herein are not limited in this regard.

The front portion 3360 may include a face portion 3362 (e.g., a strike face). The face portion 3362 may include a front surface 3364 and a back surface 3366 (shown in FIG. 37). The front surface 3364 may include one or more grooves 3368 extending between the toe portion 3340 and the heel portion 3350. While the figures may depict a particular number of grooves, the apparatus, methods, and articles of manufacture described herein may include more or less grooves. The face portion 3362 may be used to impact a golf ball (not shown). The face portion 3362 may be an integral portion of the body portion 3310. Alternatively, the face portion 3362 may be a separate piece or an insert coupled to the body portion 3310 via various manufacturing methods and/or processes (e.g., a bonding process such as adhesive, a welding process such as laser welding, a brazing process, a soldering process, a fusing process, a mechanical locking or connecting method, any combination thereof, or other suitable types of manufacturing methods and/or processes). The face portion 3362 may be associated with a loft plane that defines the loft angle of the golf club head 3300. The loft angle may vary based on the type of golf club (e.g., a long iron, a middle iron, a short iron, a wedge, etc.). In one example, the loft angle may be between five degrees and seventy-five degrees. In another example, the loft angle may be between twenty degrees and sixty degrees. The apparatus, methods, and articles of manufacture described herein are not limited in this regard.

Figure 36:
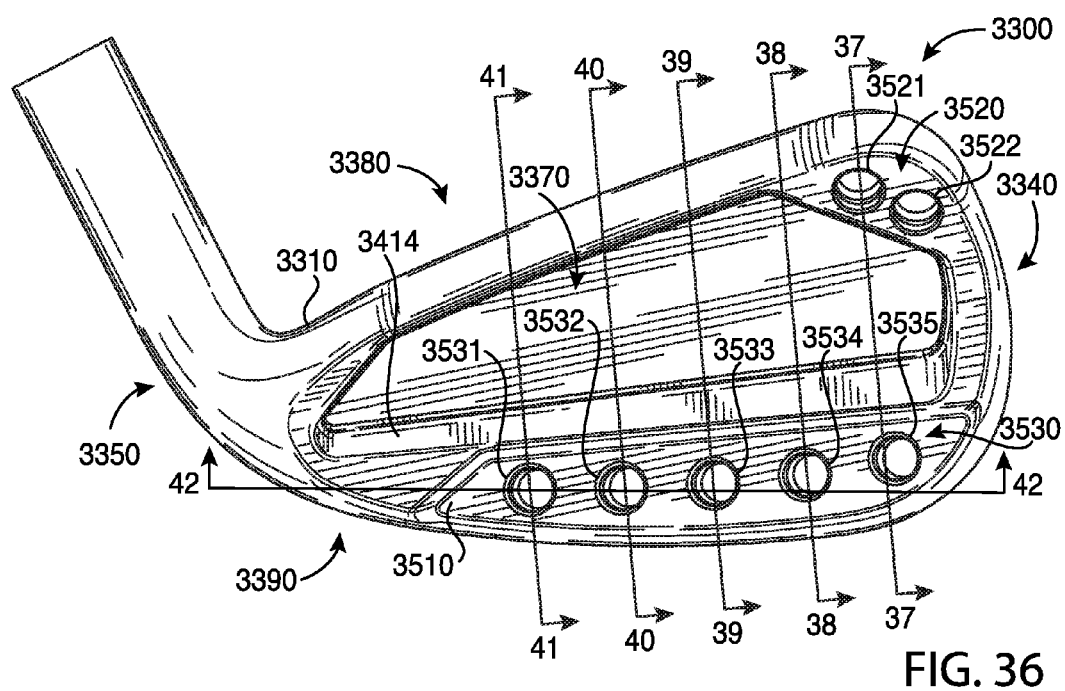
FIG. 36 depicts a rear view of the example golf club head of FIG. 33.

As illustrated in FIG. 36, the back portion 3370 may include a back wall portion 3510 with one or more exterior weight ports along a periphery of the back portion 3370, generally shown as a first set of exterior weight ports 3520 (e.g., shown as weight ports 3521 and 3522) and a second set of exterior weight ports 3530 (e.g., shown as weight ports 3531, 3532, 3533, 3534 and 3535). Each exterior weight port may be defined by an opening in the back wall portion 3510. Each exterior weight port may be associated with a port diameter. In one example, the port diameter may be about 0.25 inch (6.35 millimeters). The weight ports of the first set of exterior weight ports 3520 may be separated by less than the port diameter or the port diameter of any of the two adjacent weight ports of the first set of exterior weight ports 3520. In a similar manner, any two adjacent exterior weight ports of the second set of exterior weight ports 3530 may be separated by less than the port diameter or the port diameter of any of the two adjacent weight ports of the second set of exterior weight ports 3530. The first and second exterior weight ports 3520 and 3530, respectively, may be exterior weight ports configured to receive one or more weight portions. In particular, each weight portion of the first set of weight portions 3320 (e.g., shown as weight portions 3321 and 3322) may be disposed in a weight port located at or proximate to the toe portion 3340 and/or the top portion 3380 on the back portion 3370. For example, the weight portion 3321 may be partially or entirely disposed in the weight port 3521. In another example, the weight portion 3322 may be disposed in the weight port 3522 located in a transition region between the top portion 3380 and the toe portion 3340 (e.g., a top-and-toe transition region). Each weight portion of the second set of weight portions 3330 (e.g., shown as weight portions 3331, 3332, 3333, 3334 and 3335) may be disposed in a weight port located at or proximate to the toe portion 3340 and/or the sole portion 3390 on the back portion 3370. For example, the weight portion 3333 may be partially or entirely disposed in the weight port 3533. In another example, the weight portion 3335 may be disposed in a weight port 3535 located in a transition region between the sole portion 3390 and the toe portion 3340 (e.g., a sole-and-toe transition region). In another example, any of the weight portions of the first set of weight portions 3320 and the second set of weight portions 3330 may disposed in any of the weight ports of the first set of weight ports 3520 and the second set of weight ports 3530. As described in detail herein, the first and second sets of weight portions 3320 and 3330, respectively, may be coupled to the back portion 3370 of the body portion 3310 with various manufacturing methods and/or processes (e.g., a bonding process, a welding process, a brazing process, a mechanical locking method, any combination thereof, or other suitable manufacturing methods and/or processes).

Alternatively, the golf club head 3300 may not include (i) the first set of weight portions 3320, (ii) the second set of weight portions 3330, or (iii) both the first and second sets of weight portions 3320 and 3330. In particular, the back portion 3370 of the body portion 3310 may not include weight ports at or proximate to the top portion 3380 and/or the sole portion 3390. For example, the mass of the first set of weight portions 3320 (e.g., 3 grams) and/or the mass of the second set of weight portions 3330 (e.g., 16.8 grams) may be integral part(s) the body portion 3310 instead of separate weight portion(s). The apparatus, methods, and articles of manufacture described herein are not limited in this regard.

The first and second sets of weight portions 3320 and 3330, respectively, may have similar or different physical properties (e.g., color, shape, size, density, mass, volume, etc.). As a result, the first and second sets of weight portions 3320 and 3330, respectively, may contribute to the ornamental design of the golf club head 3300. The physical properties of the first and second sets of weight portions 3320 and 3330 may be similar in many respect to any of the weight portions described herein, such as the weight portions shown in the example of FIG. 11. Furthermore, the devices and/or methods by which the first and second set of weight portions 3320 and 3330 are coupled to the golf club head 3300 may be similar in many respect to any of the weight portions described herein, such as the weight portions shown in the example of FIGS. 12 and 13. Accordingly, a detailed description of the physical properties of the first and second sets of weight portions 3320 and 3330, and the devices and/or methods by which the first and second sets of weight portions 3320 and 3330 are coupled to the golf club head 3300 are not described in detail herein. The apparatus, methods, and articles of manufacture described herein are not limited in this regard.

Figure 34:
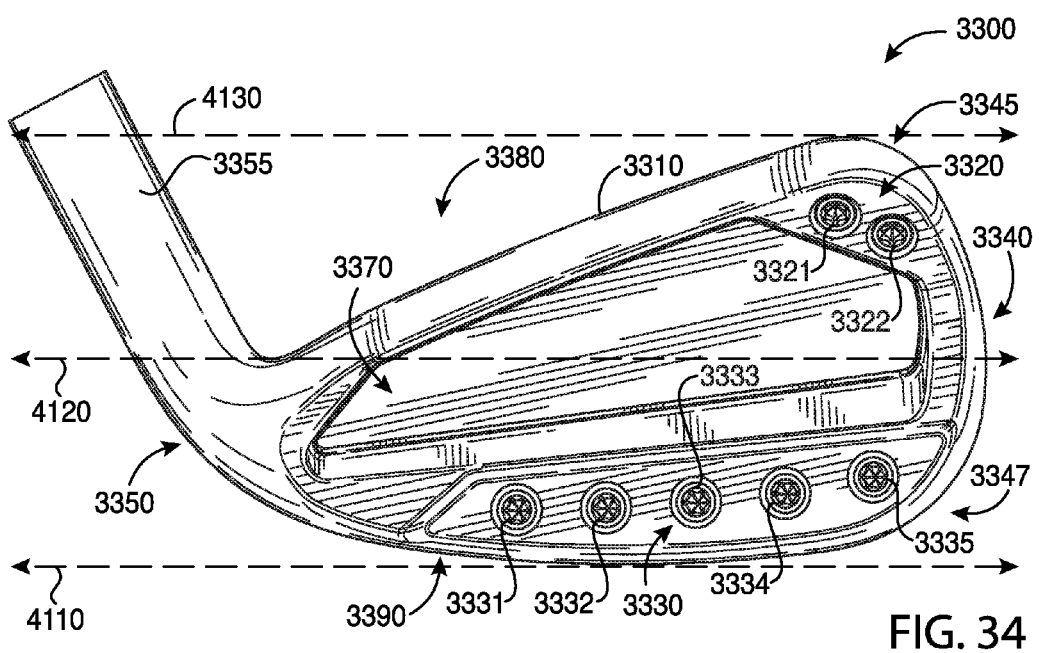
FIG. 34 depicts a rear view of the example golf club head of FIG. 33.
Figure 35:
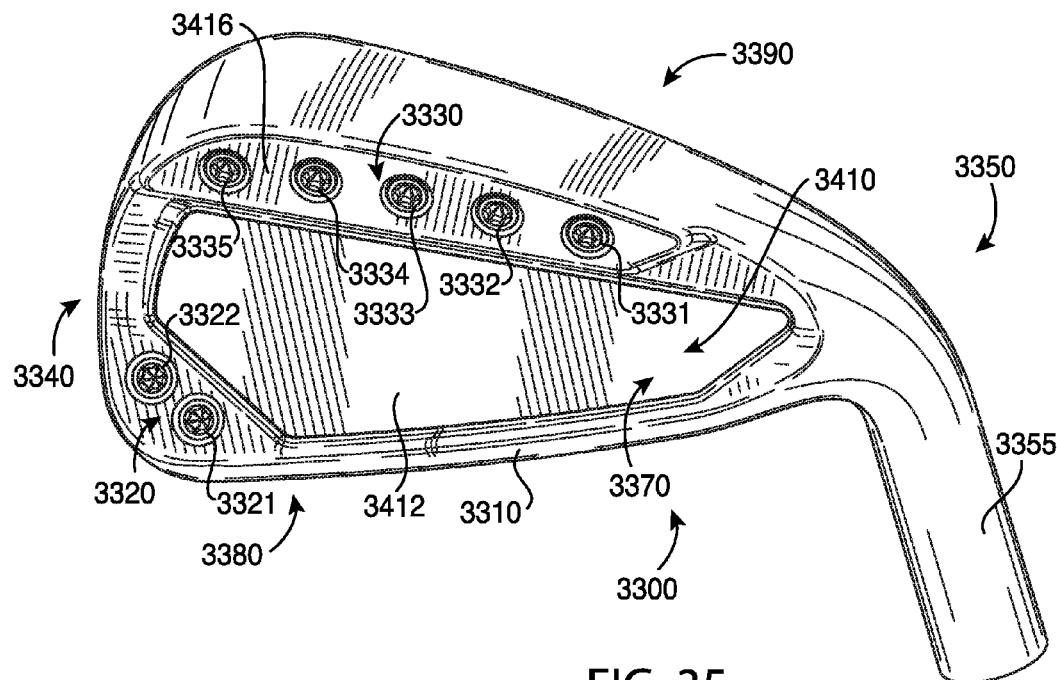
FIG. 35 depicts a rear perspective view of the example golf club head of FIG. 33.

As illustrated in FIG. 34, golf club head 3300 may be associated with a ground plane 4110, a horizontal midplane 4120, and a top plane 4130. In particular, the ground plane 4110 may be a plane that may be substantially parallel with the ground and be tangential to the sole portion 3390 of the golf club head 3300 when the golf club head 3300 is at an address position (e.g., the golf club head 3300 is aligned to strike a golf ball). A top plane 4130 may be a tangential plane to the top portion of the 3380 of the golf club head 3300 when the golf club head 3300 is at the address position. The ground and top planes 4110 and 4130, respectively, may be substantially parallel to each other. The horizontal midplane 4120 may be located at half the vertical distance between the ground and top planes 4110 and 4130, respectively.

To provide optimal perimeter weighting for the golf club head 3300, the first set of weight portions 3320 (e.g., weight portions 3321 and 3322) may be configured to counterbalance the weight of the hosel 3355 and/or increase the moment of inertia of the golf club head 3300 about a vertical axis of the golf club head 3300 that extends through the center of gravity of the golf club head 3300. For example, as shown in FIG. 34, the first set of weight portions 3320 (e.g., weight portions 3321 and 3322) may be located near the periphery of the body portion 3310 and extend in a transition region 3345 between the top portion 3380 and the toe portion 3340. In another example, the first set of weight portions 3320 (e.g., weight portions 3321 and 3322) may be located near the periphery of the body portion 3310 and extend proximate to the toe portion 3340. The locations of the first set of weight portions 3320 (i.e., the locations of the first set of weight ports 3520) and the physical properties and materials of construction of the weight portions of the first set of weight portions 3320 may be determined to optimally affect the weight, weight distribution, center of gravity, moment of inertia characteristics, structural integrity and/or or other static and/or dynamic characteristics of the golf club head 3300. The apparatus, methods, and articles of manufacture described herein are not limited in this regard.

The second set of weight portions 3330 (e.g., weight portions 3331, 3332, 3333, 3334 and 3335) may be configured to place the center of gravity of the golf club head 3300 at an optimal location and/or optimize the moment of inertia of the golf club head about a vertical axis that extends through the center of gravity of the golf club head 3300. Referring to FIG. 34, all or a substantial portion of the second set of weight portions 3330 may be near the sole portion 3390. For example, the second set of weight portions 3330 (e.g., weight portions 3331, 3332, 3333, 3334 and 3335) may extend at or near the sole portion 3390 between the toe portion 3340 and the heel portion 3350 to lower the center of gravity of the golf club head 100. The weight portions 3334 and 3335 may be located closer to the toe portion 3340 than to the heel portion 3350 and/or at or near a transition region 3347 between the sole portion 3390 and the toe portion 3340 to increase the moment of inertia of the golf club head 3300 about a vertical axis that extends through the center of gravity. Some of the weight portions of the second set of weight portions 3330 may be located at the toe portion. To lower the center of gravity of the golf club head 3300, all or a portion of the second set of weight portions 3330 may be located closer to the sole portion 3390 than to the horizontal midplane 4120. The locations of the second set of weight portions 3330 (i.e., the locations of the second set of weight ports 3530) and the physical properties and materials of construction of the weight portions of the second set of weight portions 3330 may be determined to optimally affect the weight, weight distribution, center of gravity, moment of inertia characteristics, structural integrity and/or or other static and/or dynamic characteristics of the golf club head 3300. The apparatus, methods, and articles of manufacture described herein are not limited in this regard.

Figure 37:
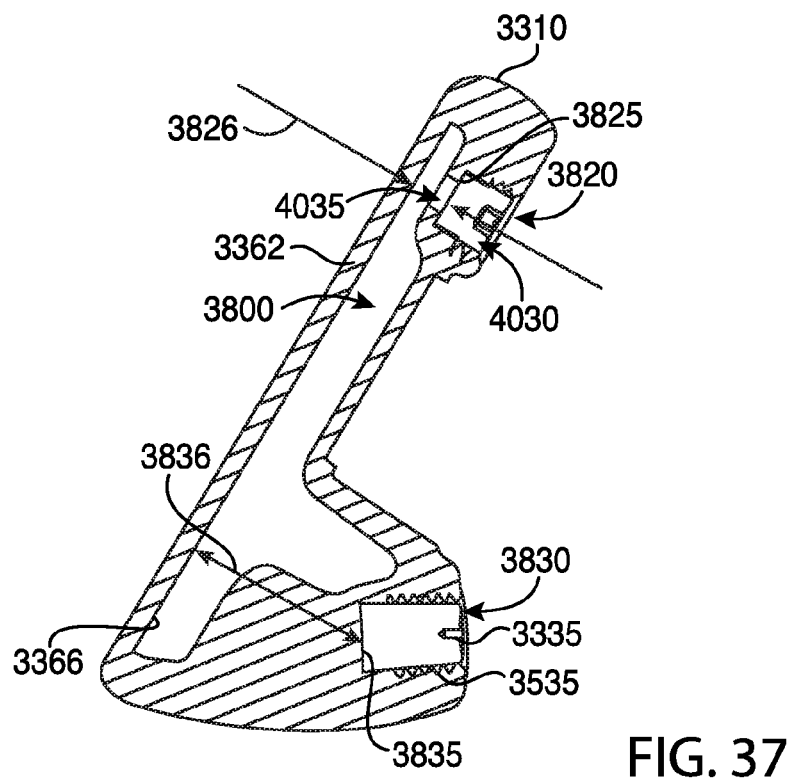
FIG. 37 depicts a cross-sectional view of the example golf club head of FIG. 33 along line 37-37 of FIG. 36.
Figure 38:
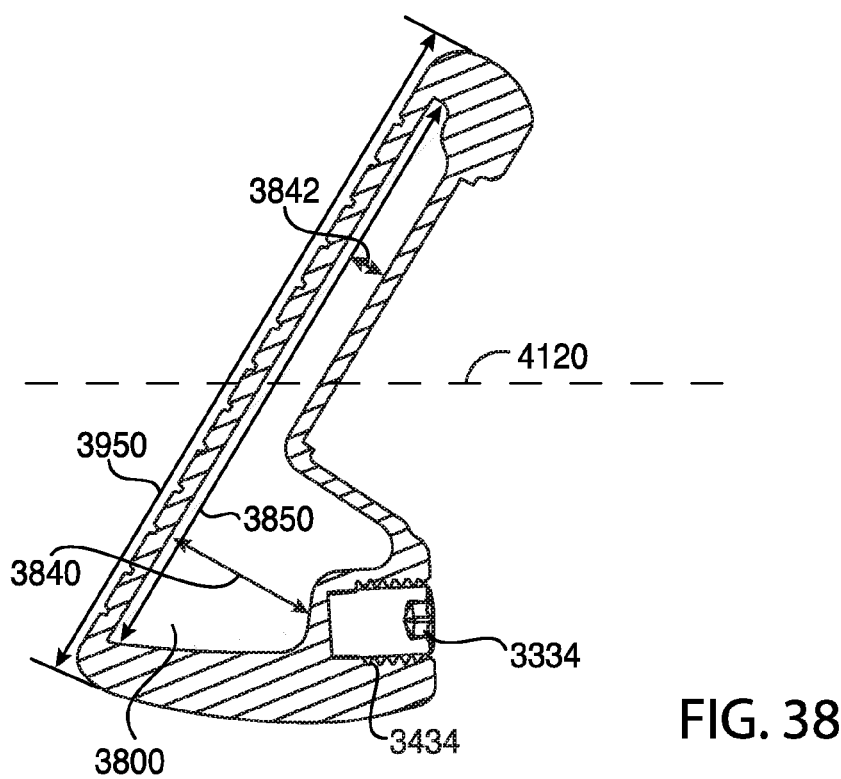
FIG. 38 depicts a cross-sectional view of the example golf club head of FIG. 33 along line 38-38 of FIG. 36.
Figure 39:
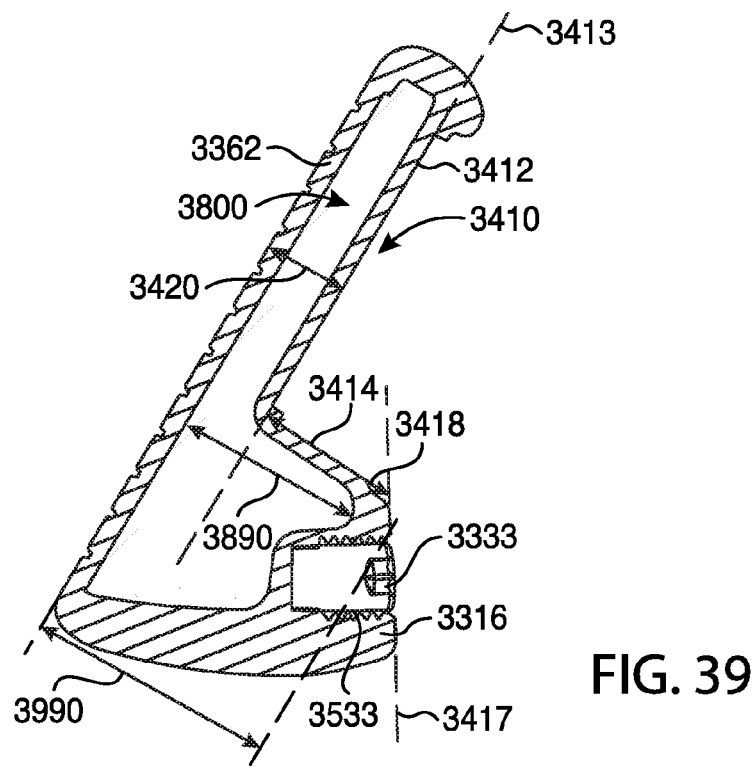
FIG. 39 depicts a cross-sectional view of the example golf club head of FIG. 33 along line 39-39 of FIG. 36.

Turning to FIG. 37, for example, the first and second sets of weight portions 3320 and 3330, respectively, may be located away from the back surface 3366 of the face portion 3362 (e.g., not directly coupled to each other). That is, the first and second sets of weight portions 3320 and 3330, respectively, and the back surface 3366 may be partially or entirely separated by an interior cavity 3800 of the body portion 3310. For example, each exterior weight port of the first and second sets of exterior weight ports 3320 and 3330 may include an opening (e.g., generally shown as 3820 and 3830) and a port wall (e.g., generally shown as 3825 and 3835). The port walls 3825 and 3835 may be integral portions of the back wall portion 3510 (e.g., a section of the back wall portion 3510). Each of the openings 3820 and 3830 may be configured to receive a weight portion such as weight portions 3321 and 3335, respectively. The opening 3820 may be located at one end of the weight port 3521, and the port wall 3825 may be located or proximate to at an opposite end of the weight port 3521. In a similar manner, the opening 3830 may be located at one end of the weight port 3535, and the port wall 3835 may be located at or proximate to an opposite end of the weight port 3535. The port walls 3825 and 3835 may be separated from the face portion 3362 (e.g., separated by the interior cavity 3800). Each port wall of the first set of weight ports 3520, such as the port wall 3825 may have a distance 3826 from the back surface 3366 of the face portion 3362 as shown in FIG. 37. Each port wall of the second set of weight ports 3530, such as the port wall 3835 may have a distance 3836 from the back surface 3366 of the face portion 3362. The distances 3826 and 3836 may be determined to optimize the location of the center of gravity of the golf club head 3300 when the first and second sets of weight ports 3520 and 3530, respectively, receive weight portions as described herein. According to one example, the distance 3836 may be greater than the distance 3826 so that the center of gravity of the golf club head 3300 is moved toward the back portion 3370 and/or lowered toward the sole portion 3390. According to one example, the distance 3836 may be greater than the distance 3826 by a factor ranging from about 1.5 to about 4. In other words, the distance 3836 may be about 1.5 times to about 4 times greater than the distance 3826. As a result, a width 3840 (shown in FIG. 38) of a portion of the interior cavity 3800 below the horizontal midplane 4120 may be greater than a width 3842 of the interior cavity 3800 above the horizontal midplane 4120. The apparatus, methods, and articles of manufacture described herein are not limited in this regard.

As discussed herein, the center of gravity (CG) of the golf club head 3300 may be relatively farther back from the face portion 3362 and relatively lower towards a ground plane (e.g., one shown as 4110 in FIG. 34) as compared to a golf club without a width 3840 of a portion of the interior cavity 3800 being greater than a width 3842 of the interior cavity 3800 as described herein, with all or a substantial portion of the second set of weight portions 3330 being closer to the sole portion 3390 than to the horizontal midplane 4120, and the first and second sets of weight portions 3320 and 3330, respectively, being away from the back surface 3366 than if the second set of weight portions 3330 were directly coupled to the back surface 3366. The locations of the first and second sets of weight ports 3520 and 3530 and the physical properties and materials of construction of the weight portions of the first and second sets of weight portions 3320 and 3330, respectively, may be determined to optimally affect the weight, weight distribution, center of gravity, moment of inertia characteristics, structural integrity and/or or other static and/or dynamic characteristics of the golf club head 3300. The apparatus, methods, and articles of manufacture described herein are not limited in this regard.

While the figures may depict weight ports with a particular cross-section shape, the apparatus, methods, and articles of manufacture described herein may include weight ports with other suitable cross-section shapes. The weight ports of the first and/or second sets of weight ports 3520 and 3530 may have cross-sectional shapes that are similar to the cross-sectional shapes of any of the weight ports described herein. Accordingly, the detailed description of the cross-sectional shapes of the weight ports 3520 and 3530 are not described in detail. The apparatus, methods, and articles of manufacture described herein are not limited in this regard.

The first and second sets of weight portions 3320 and 3330, respectively, may be similar in mass (e.g., all of the weight portions of the first and second sets 3320 and 3330, respectively, weigh about the same). Alternatively, the first and second sets of weight portions 3320 and 3330, respectively, may be different in mass individually or as an entire set. In particular, each of the weight portions of the first set 3320 (e.g., shown as 3321 and 3322) may have relatively less mass than any of the weight portions of the second set 3330 (e.g., shown as 3331, 3332, 3333, 3334 and 3335). For example, the second set of weight portions 3330 may account for more than 50% of the total mass from exterior weight portions of the golf club head 3300. As a result, the golf club head 3300 may be configured to have at least 50% of the total mass from exterior weight portions disposed below the horizontal midplane 4120. In one example, the total mass from exterior weight portions may be greater below the horizontal midplane 4120 that the total mass from exterior weight portions above the horizontal midplane 4120. The apparatus, methods, and articles of manufacture described herein are not limited in this regard.

In one example, the golf club head 3300 may have a mass in the range of about 220 grams to about 330 grams based on the type of golf club (e.g., a 4-iron versus a lob wedge). The body portion 3310 may have a mass in the range of about 200 grams to about 310 grams with the first and second sets of weight portions 3320 and 3330, respectively, having a mass of about 20 grams (e.g., a total mass from exterior weight portions). Each of the weight portions of the first set 3320 may have a mass of about one gram (1.0 g) whereas each of the weight portions of the second set 3330 may have a mass of about 2.4 grams. The sum of the mass of the first set of weight portions 3320 may be about 3 grams whereas the sum of the mass of the first set of weight portions 3330 may be about 16.8 grams. The total mass of the second set of weight portions 3330 may weigh more than five times as much as the total mass of the first set of weight portions 3320 (e.g., a total mass of the second set of weight portions 3330 of about 16.8 grams versus a total mass of the first set of weight portions 3320 of about 3 grams). The golf club head 3300 may have a total mass of 19.8 grams from the first and second sets of weight portions 3320 and 3330, respectively (e.g., sum of 3 grams from the first set of weight portions 3320 and 16.8 grams from the second set of weight portions 3330). Accordingly, the first set of weight portions 3320 may account for about 15% of the total mass from exterior weight portions of the golf club head 3300 whereas the second set of weight portions 3330 may be account for about 85% of the total mass from exterior weight portions of the golf club head 3300. The apparatus, methods, and articles of manufacture described herein are not limited in this regard.

By coupling the first and second sets of weight portions 3320 and 3330, respectively, to the body portion 3310 (e.g., securing the first and second sets of weight portions 3320 and 3330 in the weight ports on the back portion 3370), the location of the center of gravity (CG) and the moment of inertia (MOI) of the golf club head 3300 may be optimized. In particular, the first and second sets of weight portions 3320 and 3330, respectively, may lower the location of the CG towards the sole portion 3390 and further back away from the face portion 3362. Further, the MOI may be higher as measured about a vertical axis extending through the CG (e.g., perpendicular to the ground plane 4110). The MOI may also be higher as measured about a horizontal axis extending through the CG (e.g., extending towards the toe and heel portions 3340 and 3350, respectively, of the golf club head 3300). As a result, the club head 3300 may provide a relatively higher launch angle and a relatively lower spin rate than a golf club head without the first and second sets of weight portions 3320 and 3330, respectively. The apparatus, methods, and articles of manufacture described herein are not limited in this regard.

Alternatively, two or more weight portions in the same set may be different in mass. In one example, the weight portion 3321 of the first set 3320 may have a relatively lower mass than the weight portion 3322 of the first set 3320. In another example, the weight portion 3331 of the second set 3330 may have a relatively lower mass than the weight portion 3335 of the second set 3330. With relatively greater mass at the top-and-toe transition region and/or the sole-and-toe transition region, more weight may be distributed away from the center of gravity (CG) of the golf club head 3300 to increase the moment of inertia (MOI) about the vertical axis through the CG.

Although the figures may depict the weight portions as separate and individual parts, each set of the first and second sets of weight portions 3320 and 3330, respectively, may be a single piece of weight portion. In one example, all of the weight portions of the first set 3320 (e.g., shown as 3321 and 3322) may be combined into a single piece of weight portion (e.g., a first weight portion). In a similar manner, all of the weight portions of the second set 3330 (e.g., 3331, 3332, 3333, 3334 and 3335) may be combined into a single piece of weight portion as well (e.g., a second weight portion) similar to the example of FIG. 32. While the figures may depict a particular number of weight portions, the apparatus, methods, and articles of manufacture described herein may include more or less number of weight portions. The apparatus, methods, and articles of manufacture described herein are not limited in this regard.

The body portion 3310 may be a hollow body including the interior cavity 3800 extending between the front portion 3360 and the back portion 3370. Further, the interior cavity 3800 may extend between the top portion 3380 and the sole portion 3390. The interior cavity 3800 may be associated with a cavity height 3850 ($H_C$), and the body portion 3310 may be associated with a body height 3950 ($H_B$). While the cavity height 3850 and the body height 3950 may vary between the toe and heel portions 3340 and 3350, and the top and sole portions 3380 and 3390, the cavity height 3850 may be at least 50% of a body height 3950 ($H_C > 0.5*H_B$). For example, the cavity height 3850 may vary between 70%-85% of the body height 3950. With the cavity height 3850 of the interior cavity 3800 being greater than 50% of the body height 3950, the golf club head 3300 may produce relatively more consistent feel, sound, and/or result when the golf club head 3300 strikes a golf ball via the face portion 3362 than a golf club head with a cavity height of less than 50% of the body height. The apparatus, methods, and articles of manufacture described herein are not limited in this regard.

The interior cavity 3800 may be associated with a cavity width 3840 ($W_C$), and the body portion 3310 may be associated with a body width 3990 ($W_B$). The cavity width 3840 and the body width 3990 may vary between the top portion 3380 and the sole portion 3390 and between the toe portion 3340 and the heel portion 3350. The cavity width 3840 may be at least 50% of a body width 3990 ($W_C > 0.5*W_B$) at certain regions on the body portion 3310 between the top and sole portions 3380 and 3390 and between the toe and heel portions 3340 and 3350. According to another example, the cavity width 3840 may vary between about 40%-60% of a body width 3990 at certain regions between the top and sole portions 3380 and 3390. According to another example, the cavity width 3840 may vary between about 30%-70% of a body width 3990 at certain regions between the top and sole portions 3380 and 3390. According to another example, the cavity width 3840 may vary between about 20%-80% of a body width 3990 at certain regions between the top and sole portions 3380 and 3390. For example, the cavity width 3840 may vary between about 20%-80% of the body width 3990 at or below the horizontal midplane 4120. With the cavity width 3890 of the interior cavity 3800 that may vary between about 20% or more to about 80% or less of the body width 3990 at or below the horizontal midplane 4120, a substantial portion of the mass of the golf club head 3300 may be moved lower and farther back as compared to a golf club head with a cavity width of less than about 20% of the body width. Further, the golf club head 3300 may produce relatively more consistent feel, sound, and/or result when the golf club head 3300 strikes a golf ball via the face portion 3362 than a golf club head with a cavity width of less than about 20% of the body width. The apparatus, methods, and articles of manufacture described herein are not limited in this regard.

To provide an inner cavity 3800 having cavity a width 3840 that may vary between about 20-80% of a body width 3990 at or below the horizontal midplane 4120, to lower the CG of the golf club head 3300, and/or to move the CG of the golf club head 3300 farther back relative to the face portion 3362, the back portion 3370 may have a recessed portion 3410 (shown in FIGS. 35, 36 and 39) that may extend between a location near the horizontal midplane 4120 and a location at or near the top portion 3380. The recessed portion 3410 may be defined by an upper wall 3412 of the back portion 3370 and a ledge portion 3414. The upper wall 3412 of the back portion 3370 may extend from a location at or near the horizontal midplane 4120 to a location at or near the top portion 3380. The ledge portion 3414 may extend from the upper wall 3412 of the back portion 3370 to a lower wall 3416 of the back portion 3370. The lower wall 3416 of the back portion 3370 may extend from a location at or near the horizontal midplane 4120 to a location at or near the sole portion 3380. The ledge portion 3414 may extends from the upper wall 3412 in a direction away from the face portion 3362. Accordingly, the ledge portion 3414 facilitates a transition from the upper wall 3412 to the lower wall 3416 by which the width of the body portion 3310 is substantially increased at or near the horizontal midplane 4120 as compared to the width of the body portion 3310 above the horizontal midplane. The ledge portion 3414 may have a ledge portion width 3418 (shown in FIG. 39) that is greater than an upper body width 3420 of the body portion 3310. In one example, the ledge portion width 3418 may be defined as a width of a surface on the back portion 3370 that extends between a plane 3413 generally defining the upper wall 3412 of the back portion 3370 and a plane 3417 generally defining the lower wall 3416 of the back portion 3370. The upper body width 3420 may be defined as a width of the body portion 3310 at or above the horizontal midplane 4120. According to one example, the ledge portion width 3418 may be wider than the upper body width 3420 by a factor of between about 0.5 to about 1.0. According to another example, the ledge portion width 3418 may be wider than the upper body width 3420 by a factor of about 1.5. According to another example, the ledge portion width 3418 may be wider than the upper body width 3420 by a factor of about 3.0. Accordingly, a golf club according to the examples described herein may have a ledge portion width 3418 that is wider than the upper body width 3420 by a factor of greater than or equal to about 0.5 to less than or equal to about 3.0. Accordingly, the body width 3990 at, near or below the horizontal midplane 4120 may be substantially greater than the upper body width 3420, which may provide for a cavity width 3840 that may be around 20% to 80% of the body width 3990 at, near or below the horizontal midplane 4120. Further, the recessed portion 3410 allows the golf club head 3300 to generally have a greater mass below the horizontal midplane 4120 than above the horizontal plane 4120. In other words, the mass that is removed from the golf club head 3300 to define the recessed portion 3410 may be moved to aft or back portions of the body portion 3310 that are around and below the horizontal midplane 4120.

Figure 40:
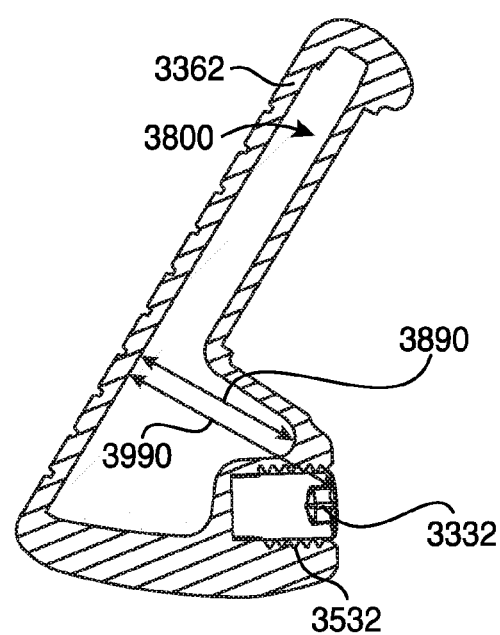
FIG. 40 depicts a cross-sectional view of the example golf club head of FIG. 33 along line 40-40 of FIG. 36.

To generally maintain a cavity width 3840 that may be around 20%-80% of the body width 3990, the cavity width 3840 may be greater near the sole portion 3390 or below the horizontal midplane 4120 than near the top portion 3380 or above the horizontal midplane 4120. According to one example, the cavity width 3840 may generally vary according to a variation in the body width 3990 at certain regions of the body portion 3310 between the top portion 3380 and the sole portion 3390 and between the toe portion 3340 and the heel portion 3350. For example, as shown in FIG. 40, the cavity width 3840 may generally vary according to the body width 3990 in certain regions of the body portion 3310 between the top portion 3380 and the sole portion 3390. The apparatus, methods, and articles of manufacture described herein are not limited in this regard.

In one example, the interior cavity 3800 may be unfilled (i.e., empty space). The body portion 3310 with the interior cavity 3800 may weight about 100 grams less than the body portion 3310 without the interior cavity 3800. Alternatively, the interior cavity 3800 may be partially or entirely filled with an elastic polymer or elastomer material (e.g., a viscoelastic urethane polymer material such as Sorbothane® material manufactured by Sorbothane, Inc., Kent, Ohio), a thermoplastic elastomer material (TPE), a thermoplastic polyurethane material (TPU), and/or other suitable types of materials to absorb shock, isolate vibration, and/or dampen noise. For example, at least 50% of the interior cavity 3800 may be filled with a TPE material to absorb shock, isolate vibration, and/or dampen noise when the golf club head 3300 strikes a golf ball via the face portion 3362.

In another example, the interior cavity 3800 may be partially or entirely filled with a polymer material such as an ethylene copolymer material to absorb shock, isolate vibration, and/or dampen noise when the golf club head 3300 strikes a golf ball via the face portion 3362. In particular, at least 50% of the interior cavity 3800 may be filled with a high density ethylene copolymer ionomer, a fatty acid modified ethylene copolymer ionomer, a highly amorphous ethylene copolymer ionomer, an ionomer of ethylene acid acrylate terpolymer, an ethylene copolymer comprising a magnesium ionomer, an injection moldable ethylene copolymer that may be used in conventional injection molding equipment to create various shapes, an ethylene copolymer that can be used in conventional extrusion equipment to create various shapes, and/or an ethylene copolymer having high compression and low resilience similar to thermoset polybutadiene rubbers. For example, the ethylene copolymer may include any of the ethylene copolymers associated with DuPont™ High-Performance Resin (HPF) family of materials (e.g., DuPont™ HPF AD1172, DuPont™ HPF AD1035, DuPont® HPF 1000 and DuPont™ HPF 2000), which are manufactured by E.I. du Pont de Nemours and Company of Wilmington, Del. The DuPont™ HPF family of ethylene copolymers are injection moldable and may be used with conventional injection molding equipment and molds, provide low compression, and provide high resilience. The apparatus, methods, and articles of manufacture described herein are not limited in this regard.

As described herein, the cavity width 3840 may vary between about 20%-80% of a body width 3990 at or below the horizontal midplane 4120. According to one example, at least 50% of the elastic polymer or elastomer material partially or filling the interior cavity 3800 may be located below the horizontal midplane 4120 of the golf club head 3300. Accordingly, the center of gravity of the golf club head 3300 may be further lowered and moved farther back as compared to a golf club head with a cavity width of less than about 20% of the body width and that is partially or fully filled with an elastic polymer or elastomer material. Further, the golf club head 3300 may produce relatively more consistent feel, sound, and/or result when the golf club head 3300 strikes a golf ball via the face portion 3362 as compared to a golf club head with a cavity width of less than about 20% of the body width that is partially or fully filled with an elastic polymer material.

The thickness of the face portion 3362 may vary between the top portion 3380 and the sole portion and between the toe portion 3340 and the heel portion as discussed in detail herein and shown in the examples of FIGS. 15 and 16. According, a detailed description of the variation in the thickness of the face portion 3362 is not provided. The apparatus, methods, and articles of manufacture described herein are not limited in this regard.

Different from other golf club head designs, the interior cavity 3800 of the body portion 3310 and the location of the first and second sets of weight portions 3320 and 3330, respectively, along the perimeter of the golf club head 3300 may result in a golf ball traveling away from the face portion 3362 at a relatively higher ball launch angle and a relatively lower spin rate. As a result, the golf ball may travel farther (i.e., greater total distance, which includes carry and roll distances).

The golf club head 3300 may be manufactured by any of the methods described herein and illustrated in FIG. 17. Accordingly, a detailed description of the method of manufacturing the golf club head 3300 is not provided.

Figure 41:
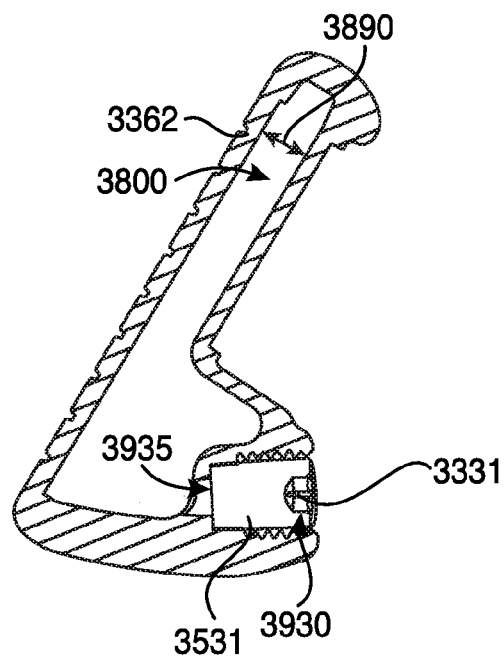
FIG. 41 depicts a cross-sectional view of the example golf club head of FIG. 33 along line 41-41 of FIG. 36.
Figure 42:
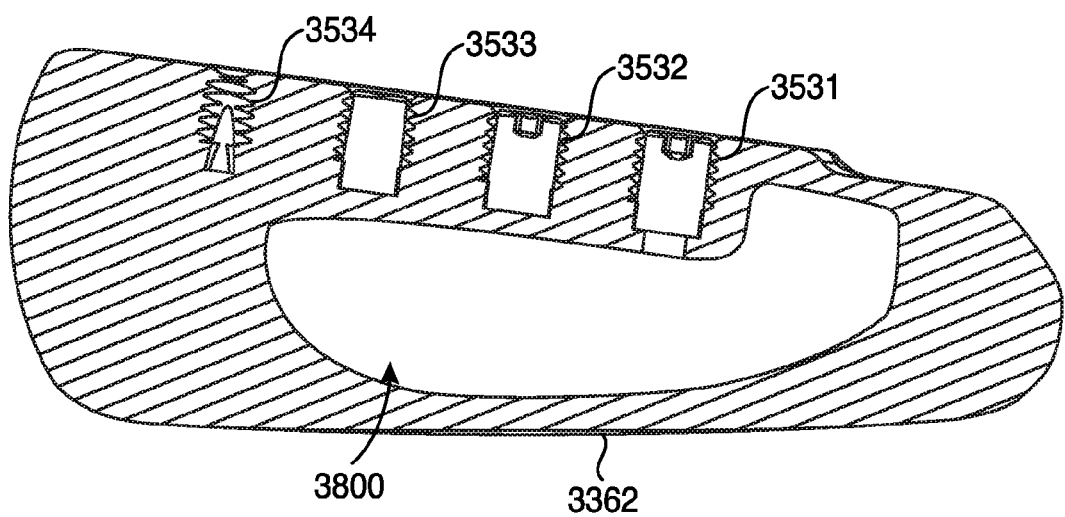
FIG. 42 depicts a cross-sectional view of the example golf club head of FIG. 33 along line 42-42 of FIG. 36.

As illustrated in FIGS. 37 and 41, for example, the golf club head 3300 may include one or more weight ports (e.g., one shown as weight ports 3521 and 3531) that may open to the to the cavity 3800. The weight port 3531 may include a first opening 3930 and a second opening 3935. The second opening 3935 may be used to access the interior cavity 3800.

In one example, the process 1700 (FIG. 17) may fill the interior cavity 3800 with an elastic polymer material by injecting the elastic polymer material into the interior cavity 3800 from the first opening 3930 via the second opening 3935. The first and second openings 3930 and 3935, respectively, may be same or different in size and/or shape. The weight port 3521 may include a first opening 4030 and a second opening 4035. The second opening 4035 may be used to access the interior cavity 3800. In one example, the process 1700 (FIG. 17) may fill the interior cavity 3800 with an elastic polymer material by injecting the elastic polymer material into the interior cavity 3800 from the weight port 3531. As the elastic polymer fills the interior cavity 3800, the air inside the interior cavity 3800 that is displaced by the elastic polymer material may exit the interior cavity from the weight port 3521 through the second opening 4035 and then the first opening 4030. After the cavity is partially or fully filled with the elastic polymer material, the weight ports 3531 and 3521 may be closed by inserting and securing weight portions therein as described in detail herein. Alternatively, the elastic polymer material may be injected into the interior cavity 3800 from the weight port 3521. Accordingly, the weight port 3531 may function as an exit port for the displaced air inside the interior cavity 3800. While the above example may describe and depict particular weight ports with second openings, any other weight ports of the golf club head 4200 may include a second opening (e.g., the weight port 3532). The apparatus, methods, and articles of manufacture described herein are not limited in this regard.

Figure 43:
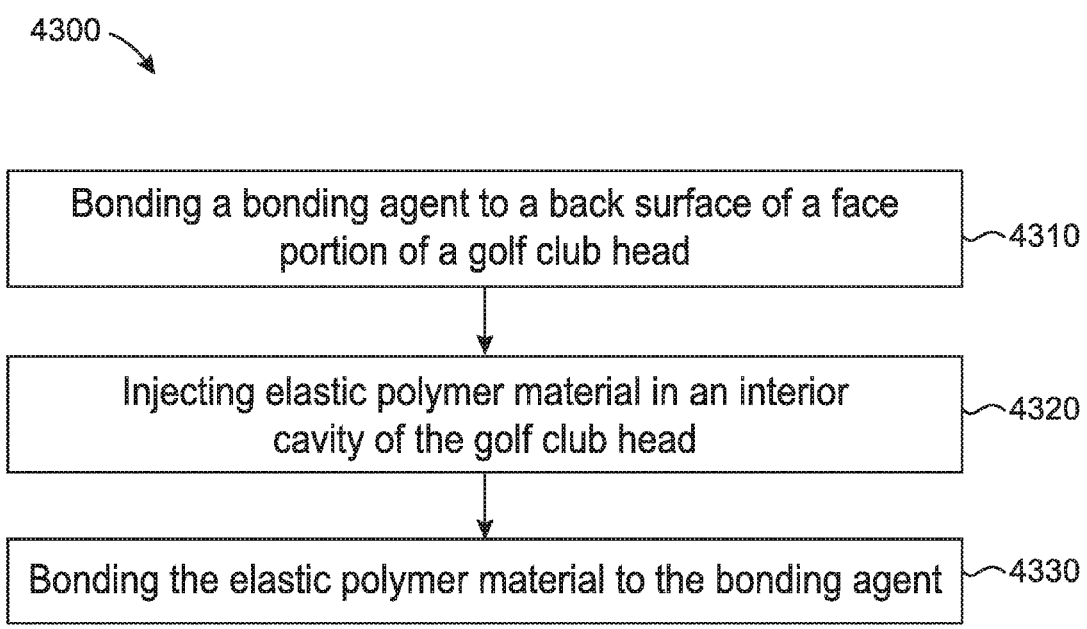
FIG. 43 depicts yet another manner in which an example golf club head described herein may be manufactured.

FIG. 43 depicts one manner by which the interior cavity 700 of the golf club head 100 or any of the golf club heads described herein may be partially or entirely filled with an elastic polymer material or an elastomer material (e.g., an elastic polymer material 2820 of FIG. 28 such as a TPE material). The process 4300 may begin with bonding a bonding agent to the back surface 166 of the face portion 162 of the golf club head 100 (block 4310). The bonding agent may have an initial bonding state, which may be a temporary bonding state, and a final bonding state, which may be a permanent bonding state. The initial bonding state and the final bonding states may be activated when the bonding agent is exposed to heat, radiation, and/or other chemical compounds. For example, as described in detail herein, the bonding agent may be an epoxy having an initial cure state and a final cure state that are activated by the epoxy being heated to different temperatures for a period of time, respectively, by conduction, convention and/or radiation. In another example, the bonding agent may be a bonding material that is activated to an initial bonding state and a final bonding state by being exposed to different doses and/or duration of ultraviolet radiation, respectively. In another example, the bonding agent may be a bonding material that is activated to an initial bonding state and a final bonding state by being exposed to different compounds or different amounts of the same compound, respectively. According to the process 4300, the bonding agent may be bonded to the back surface of the face portion by being activated to the initial bonding state. Elastic polymer material is then injected in the interior cavity 700 of the golf club head 100 (block 4320). The process 4300 then includes bonding the elastic polymer material to the bonding agent (block 4330). Bonding the elastic polymer material to the bonding agent includes activating the bonding agent to the final bonding state to permanently bond the elastic polymer material to the bonding agent and to permanently bond the bonding agent to the back surface 166 of the face portion 162. The example process 4300 is merely provided and described in conjunction with other figures as an example of one way to manufacture the golf club head 100. While a particular order of actions is illustrated in FIG. 43, these actions may be performed in other temporal sequences. Further, two or more actions depicted in FIG. 43 may be performed sequentially, concurrently, or simultaneously.

Figure 44:
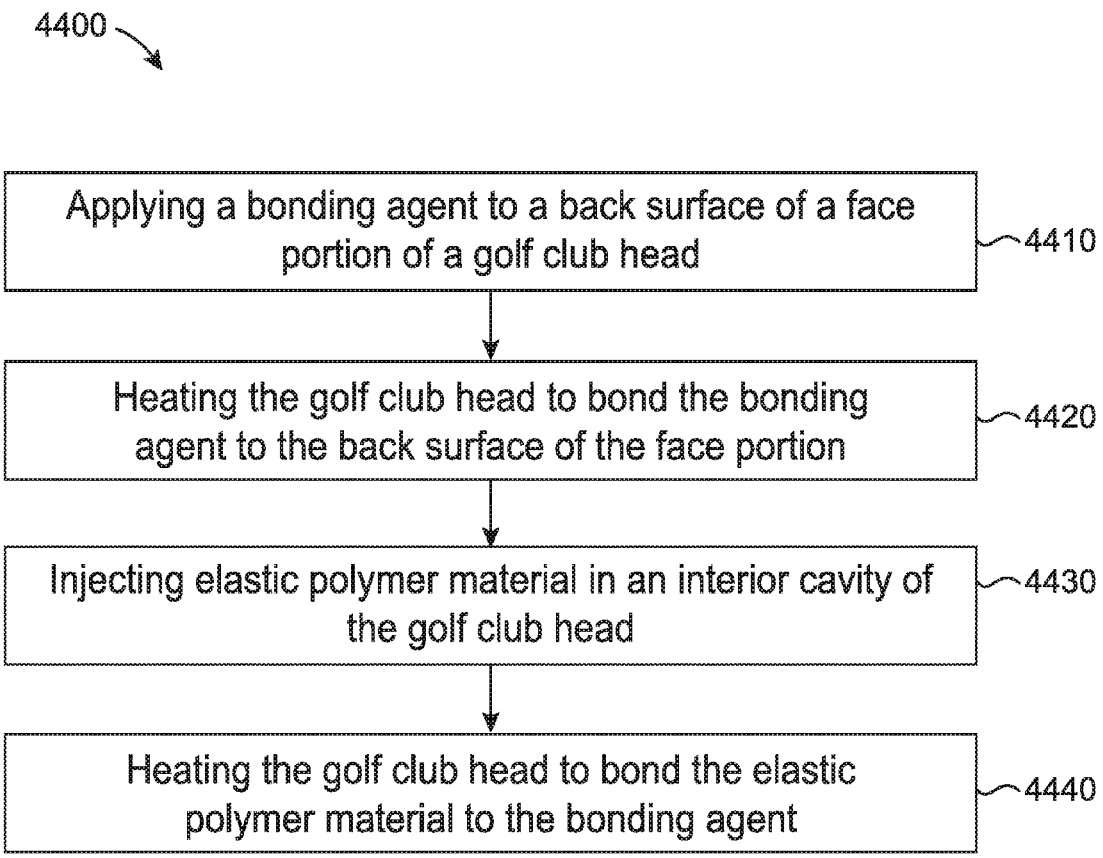
FIG. 44 depicts yet another manner in which an example golf club head described herein may be manufactured.

FIG. 44 depicts one manner by which the interior cavity 700 of the golf club head 100 or any of the golf club heads described herein may be partially or entirely filled with an elastic polymer material or an elastomer material (e.g., an elastic polymer material 2820 of FIG. 28 such as a TPE material). The process 4400 may begin with applying a bonding agent (e.g., a bonding portion 2810 of FIG. 28) to the back surface 166 of the face portion 162 of the golf club head 100 (block 4410). The bonding agent may be any type of adhesive and/or other suitable materials. In one example, the bonding agent may be an epoxy. Prior to applying the bonding agent, the golf club head 100 may be cleaned to remove any oils, other chemicals, debris or other unintended materials from the golf club head 100 (not shown). The bonding agent may be applied on the back surface 166 as described herein depending on the properties of the bonding agent. The bonding agent may be applied to the back surface 166 of the face portion 162 through one or more of the first set of weight ports 1420 and/or the second set of weight ports 1430. For example, the bonding agent may be in liquid form and injected on the back surface 166 through several or all of the first set of weight ports 1420 and the second set of weight ports 1430. An injection instrument (not shown) such as a nozzle or a needle may be inserted into each weight port until the tip or outlet of the injection instrument is near the back surface 166. The bonding agent may then be injected on the back surface 166 from the outlet of the injection instrument. Additionally, the injection instrument may be moved, rotated and/or swiveled while inside the interior cavity 700 so that the bonding agent may be injected onto an area of the back surface 166 surrounding the injection instrument. For example, the outlet of the injection instrument may be moved in a circular pattern while inside a weight port to inject the bonding agent in a corresponding circular pattern on the back surface 166. Each of the first set of weight ports 1420 and the second set of weight ports 1430 may be utilized to inject a bonding agent on the back surface 166. However, utilizing all of first weight ports 1420 and/or the second set of weight ports 1430 may not be necessary. For example, using every other adjacent weight port may be sufficient to inject a bonding agent on the entire back surface 166. In another example, weight ports 1421, 1422 1431, 1433 and 1436 may be used to inject the bonding agent on the back surface 166. The apparatus, methods, and articles of manufacture are not limited in this regard.

The process 4400 may also include spreading or overlaying the bonding agent on the back surface 166 (not shown) after injecting the bonding agent onto the back surface 166 so that a generally uniform coating of the bonding agent is provided on the back surface 166. According to one example, the bonding agent may be spread on the back surface 166 by injecting air into the interior cavity 700 through one or more of the first set of weight ports 1420 and/or the second set of weight ports 1430. The air may be injected into the interior cavity 700 and on the back surface 166 by inserting an air nozzle into one or more of the first set of weight ports 1420 and/or the second set of weight ports 1430. According to one example, the air nozzle may be moved, rotated and/or swiveled at a certain distance from the back surface 166 so as to uniformly blow air onto the bonding agent to spread the bonding agent on the back surface 166 for a uniform coating or a substantially uniform coating of the bonding agent on the back surface 166. In one example, the golf club head 100 may be pivoted back and forth in one or several directions so that the bonding agent is spread along a portion or substantially the entire area of the back surface 166 of the face portion 162. In one example, the golf club head 100 may be vibrated with the back surface 166 of the face portion 162 in a generally horizontal orientation so that the bonding agent may spread or overlay on the back surface 166 in a uniform coating manner or a substantially uniform coating manner. The apparatus, methods, and articles of manufacture are not limited in this regard.

The example process 4400 is merely provided and described in conjunction with other figures as an example of one way to manufacture the golf club head 100. While a particular order of actions is illustrated in FIG. 44, these actions may be performed in other temporal sequences. Further, two or more actions depicted in FIG. 44 may be performed sequentially, concurrently, or simultaneously. The process 4400 may include a single action (not shown) of injecting and uniformly or substantially uniformly coating the back surface 166 with the bonding agent. In one example, the bonding agent may be injected on the back surface 166 by being converted into fine particles or droplets (i.e., atomized) and sprayed on the back surface 166. Accordingly, the back surface 166 may be uniformly or substantially uniformly coated with the bonding agent in one action. A substantially uniform coating of the bonding agent on the back surface 166 may be defined as a coating having slight non-uniformities due to the injection process or the manufacturing process. However, such slight non-uniformities may not affect the bonding of the elastic polymer material or elastomer material to the back surface 166 with the bonding agent as described herein. For example, spraying the bonding agent on the back surface 166 may result in overlapping regions of the bonding agent having a slightly greater coating thickness than other regions of the bonding agent on the back surface 166. The apparatus, methods, and articles of manufacture are not limited in this regard.

Figure 45:
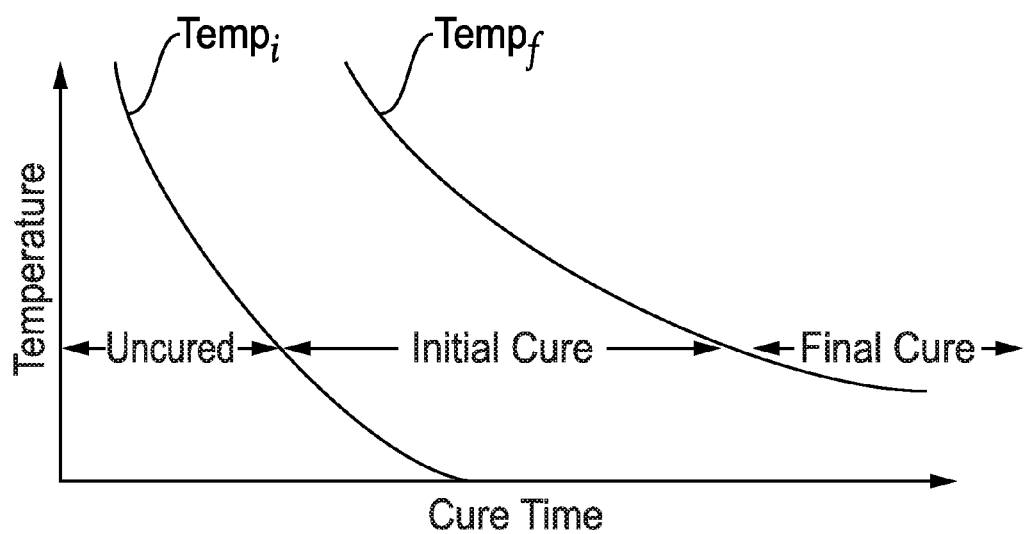
FIG. 45 depicts an example of curing a bonding agent.

In one example as shown in FIG. 45, the bonding agent may be an epoxy having different curing states based on the temperature and the amount of time to which the epoxy may be exposed. The bonding agent may have an uncured state, an initial cure state, and a final cure state. In one example, the uncured state may be a liquid state, the initial cure state may be gel or a semi-solid/semi-liquid state, and the final cure state may be a solid state. The bonding agent may transition from the uncured state to the initial cure state when the bonding agent is heated to a temperature between an initial cure state temperature ($Temp_i$) and a final cure state temperature ($Temp_f$) for a period of time. Accordingly, an initial cure state temperature range may be defined by temperatures that are greater than or equal to the initial cure state temperature $Temp_i$ and less than the final cure state temperature $Temp_f$. The bonding agent may transition from the initial cure state to the final cure state when the bonding agent may be heated to a temperature greater than or equal to the final cure state temperature $Temp_f$ for a period of time. Accordingly, a final cure state temperature range may be defined by temperatures that are greater than or equal to the final cure state temperature $Temp_f$. As shown in FIG. 45, the initial cure state temperature $Temp_i$ and the final cure state temperature $Temp_f$ may vary based on the amount of time that the bonding agent may be heated. In particular, a transition from the uncured state to the initial cure state and a transition from the initial cure state to the final cure state may be dictated by certain temperature and time profiles based on the properties of the bonding agent. At a temperature below the initial cure temperature $Temp_i$, the bonding agent may be in the uncured state (e.g., a liquid state). In the initial cure state, the bonding agent may form an initial bond with an object and become pliable to be manipulated (e.g., moved, spread, overlay, etc.) without obtaining full cross linking or forming a permanent bond. In other words, the bonding agent may form an initial bond with an object and be manipulated without forming a permanent bond. In the final cure state, the bond of the bonding agent (e.g., cross linking for a bonding agent that includes epoxy) may be complete or become permanently set.

The bonding agent may be applied to the back surface 166 of the face portion 162 when the bonding agent is in the uncured state, which may be a liquid state. Subsequently, the golf club head 100 and/or the bonding agent may be heated to a first temperature $Temp_1$ that is greater than or equal to the initial cure state temperature $Temp_i$ and less than the final cure state temperature $Temp_f$ to change the bonding agent from an uncured state to an initial cure state (i.e., an initial cure state temperature range) (block 4420). Accordingly, the bonding agent may form an initial bond with the back surface 166 of the face portion 162. After bonding the bonding agent to the back surface 166, the golf club head may be cooled for a period of time at ambient or room temperature (not shown). Accordingly, the bonding agent may be in an initial cured state and bonded to the back surface 166 of the face portion 162 so that the bonding agent may be bonded to the back surface 166 during the injection molding of an elastic polymer material in the interior cavity 700. Ambient or room temperature may be defined as a room temperature ranging between 5° C. (41° F.) to 40° C. (104° F.). The first temperature $Temp_1$ and duration by which the golf club head and/or the bonding agent heated to the first temperature $Temp_1$ may depend on the curing or bonding properties of the bonding agent. The apparatus, methods, and articles of manufacture are not limited in this regard.

After the bonding agent is bonded to the back surface 166 of the face portion 162, the golf club head 100 may be heated (i.e., pre-heating the golf club head 100) prior to receiving the elastic polymer material (not shown). The golf club head 100 may be heated so that when the elastic polymer material is injected in the golf club head 100, the elastic polymer material is not cooled by contact with the golf club head and remains in a flowing liquid form to fill the internal cavity 700. The temperature to which the golf club head is heated, which may be referred to herein as a third temperature, may be similar to the temperature of the elastic polymer material when being injected into the internal cavity 700. However, the temperature to which the golf club head is heated may be less than the final cure temperature $Temp_f$ of the bonding agent. Accordingly, the bonding agent may not transition from the initial cure state to the final cured state during the injection molding process. Further, the pre-heating temperature of the golf club head 100 may be determined so that excessive cooling of the golf club head 100 may not be necessary after injection molding the elastic polymer material in the internal cavity 700. Prior to being injected into the internal cavity 700, the elastic polymer material may also be heated to a liquid state (not shown). The temperature to which the elastic polymer material may be heated may depend on the type of elastic polymer material used to partially or fully fill the interior cavity 700. Further, the temperature to which the elastic polymer material is heated may be determined so that shrinkage of the elastic polymer material is reduced during the injection molding process. However, as described herein, the elastic polymer material may be heated to a temperature that is less than the final cure temperature $Temp_f$ of the bonding agent. The apparatus, methods, and articles of manufacture are not limited in this regard.

As described herein, the cavity 700 may be partially or fully filled with the elastic polymer material by injecting the elastic polymer material in the cavity 700 (block 4430). The injection speed of the elastic polymer material may be determined so that the interior cavity 700 may be slowly filled to provide a better fill while allowing air to escape the interior cavity 700 and allowing the injected elastic polymer material to rapidly cool. For example, the elastic polymer material may be a non-foaming and injection-moldable thermoplastic elastomer (TPE) material. The elastic polymer material may be injected into the interior cavity 700 from one or more of the weight ports described herein (e.g., one or more weight ports of the first and second sets of weight ports 1420 and 1430, respectively, shown in FIG. 14). One or more other weight ports may allow the air inside the interior cavity 700 displaced by the elastic polymer material to vent from the interior cavity 700. In one example, the golf club head 100 may be oriented horizontally as shown in FIG. 14 during the injection molding process. The elastic polymer material may be injected into the interior cavity 700 from weight ports 1431 and 1432. The weight ports 1421, 1422 and/or 1423 may serve as air ports for venting the displaced air from the interior cavity 700. Thus, regardless of the orientation of the golf club head 100 during the injection molding process, the elastic polymer material may be injected into the interior cavity 700 from one or more lower positioned weight ports while one or more upper positioned weight ports may serve as air vents.

According to one example, any one of the weight ports or any air vent on the golf club head 100 that may be used as air ports for venting the displaced air may be connected to a vacuum source (not shown) during the injection molding process. Accordingly, air inside the interior cavity 700 and displaced by the elastic polymer material may be removed from the interior cavity 700 by the vacuum source. Thus, a possibility of having trapped air pockets in the interior cavity 700 and/or a non-uniform filling of the interior cavity 700 with the elastic polymer material may be reduced. The apparatus, methods, and articles of manufacture described herein are not limited in this regard.

After the elastic polymer material is injected in the cavity 700, the golf club head 100 may be heated to a second temperature $Temp_2$ that is greater than or equal to the final cure temperature $Temp_f$ of the bonding agent to reactivate the bonding agent to bond the elastic polymer material to the bonding agent (i.e., a final cure state temperature range) (block 4440). The second temperature $Temp_2$ and the duration by which the golf club head 100 is heated to the second temperature $Temp_2$ may depend on the properties of the bonding agent as shown in FIG. 45 to form a permanent bond between the golf club head 100 and the bonding agent and between the elastic polymer material and the bonding agent. The golf club head 100 may be then cooled at ambient or room temperature (not shown). According to one example, the characteristic time (CT) of the golf club head may be measured (not shown) after manufacturing the golf club head as discussed herein. CT measurements may determine if the golf club head conforms to CT rules established by one or more golf governing bodies.

The heating and cooling processes described herein may be performed by conduction, convention, and/or radiation. For example, all of the heating and cooling processes may be performed by using heating or cooling systems that employ conveyor belts that move the golf club head 100 through a heating or cooling environment for a period of time as discussed herein. The apparatus, methods, and articles of manufacture described herein are not limited in this regard.

An elastic polymer material with a low modulus of elasticity, such as a foaming elastic polymer material, may provide vibration and noise dampening for the face portion 162 when the face portion 162 impacts a golf ball. An elastic polymer material with a higher modulus of elasticity, such as a non-foaming elastic polymer material, may provide structural support to the face portion 162 in addition to providing vibration and noise dampening. Accordingly, a thin face portion 162 may be provided when the interior cavity 700 is filled with a non-foaming elastic polymer material since the elastic polymer material may provide structural support to the thin face portion 162. In one example, the elastic polymer material that is injection molded in the interior cavity 700 may have a relatively high modulus of elasticity to provide structural support to the face portion 162 and yet elastically deflect to absorb the impact forces experienced by the face portion 162 when striking a golf ball. Thus, a non-foaming and injection moldable elastic polymer material with a relatively high modulus of elasticity may be used for partially or fully filling the interior cavity 700 to provide structural support and reinforcement for the face portion 162 in addition to providing vibration and noise dampening. That is, the non-foaming and injection moldable elastic polymer material may be a structural support portion for the face portion 162. The apparatus, methods, and articles of manufacture are not limited in this regard.

While the above examples may described an iron-type or a wedge-type golf club head, the apparatus, methods, and articles of manufacture described herein may be applicable to other types of golf club heads.

The terms "and" and "or" may have both conjunctive and disjunctive meanings. The terms "a" and "an" are defined as one or more unless this disclosure indicates otherwise. The term "coupled" and any variation thereof refer to directly or indirectly connecting two or more elements chemically, mechanically, and/or otherwise. The phrase "removably connected" is defined such that two elements that are "removably connected" may be separated from each other without breaking or destroying the utility of either element.

The term "substantially" when used to describe a characteristic, parameter, property, or value of an element may represent deviations or variations that do not diminish the characteristic, parameter, property, or value that the element may be intended to provide. Deviations or variations in a characteristic, parameter, property, or value of an element may be based on, for example, tolerances, measurement errors, measurement accuracy limitations and other factors. The term "proximate" is synonymous with terms such as "adjacent," "close," "immediate," "nearby", "neighboring", etc., and such terms may be used interchangeably as appearing in this disclosure.

The apparatus, methods, and articles of manufacture described herein may be implemented in a variety of embodiments, and the foregoing description of some of these embodiments does not necessarily represent a complete description of all possible embodiments. Instead, the description of the drawings, and the drawings themselves, disclose at least one embodiment, and may disclosure alternative embodiments.

As the rules of golf may change from time to time (e.g., new regulations may be adopted or old rules may be eliminated or modified by golf standard organizations and/or governing bodies such as the United States Golf Association (USGA), the Royal and Ancient Golf Club of St. Andrews (R&A), etc.), golf equipment related to the apparatus, methods, and articles of manufacture described herein may be conforming or non-conforming to the rules of golf at any particular time. Accordingly, golf equipment related to the apparatus, methods, and articles of manufacture described herein may be advertised, offered for sale, and/or sold as conforming or non-conforming golf equipment. The apparatus, methods, and articles of manufacture described herein are not limited in this regard.

Although certain example apparatus, methods, and articles of manufacture have been described herein, the scope of coverage of this disclosure is not limited thereto. On the contrary, this disclosure covers all apparatus, methods, and articles of articles of manufacture fairly falling within the scope of the appended claims either literally or under the doctrine of equivalents.

What is claimed is:

1. A golf club head comprising:
a face portion having a thickness of less than or equal to 1.9 millimeters (0.075 inch);
a body portion having a toe portion, a heel portion, a top portion, a sole portion, a front portion, and a back portion, the body portion being coupled to the face portion, a maximum distance between the top portion and the sole portion being greater than a maximum distance between the face portion and the back portion;
a first mass portion comprising a metal material;
a second mass portion located below a horizontal midplane of the body portion;
an interior cavity enclosed by the face portion and the body portion;
a first port connected to the interior cavity, the first port configured to receive the first mass portion, the mass first portion being spaced apart from the face portion;
a second port located below the horizontal midplane of the body portion, the second port having a length and a width, the length at least partially extending between the toe and heel portions, the length being greater than the width; and
a polymer material injected into the interior cavity from the first port,
wherein a portion of the second mass portion is located closer to the face portion than a portion of the interior cavity located between the second mass portion and the top portion.

2. A golf club head as defined in claim 1 further comprising a bonding portion configured to attach the polymer material to a back surface of the face portion.

3. A golf club head as defined in claim 1 further comprising at least another mass portion located at a different location than the first port and located at a different location than the second port.

4. A golf club head as defined in claim 1, wherein the first mass portion comprises a screw.

5. A golf club head as defined in claim 1, wherein the width of the second port is uniform or substantially uniform along the length of the second port.

6. A golf club head as defined in claim 1, wherein the polymer material comprises at least one of a thermoplastic elastomer material or a thermoplastic polyurethane material.

7. A golf club head as defined in claim 1, wherein the face portion comprises a first thickness and a second thickness less than the first thickness.

8. A golf club head comprising:
a face portion made of a first material associated with a first density;
a body portion made from a second material associated with a second density, the body portion having a toe portion, a heel portion, a top portion, a sole portion, a front portion, and a back portion, the body portion being coupled to the face portion, a maximum distance between the top portion and the sole portion being greater than a maximum distance between the face portion and the back portion;
an interior cavity extending between the top and sole portions and between the face and back portions;
a first mass portion comprising a metal material;
a second mass portion made from a third material associated with a third density, the third material being different from the second material;
a first port connected to the interior cavity and configured to receive the first mass portion;
a second port having a length and a width, the length at least partly extending between the toe and heel portions, the length being greater than the width; and
a polymer material injected into the interior cavity from the first port,
wherein the second mass portion is located below a horizontal midplane of the body portion, and wherein a portion of the second mass portion is located closer to the face portion than a portion of the interior cavity located between the second mass portion and the top portion.

9. A golf club head as defined in claim 8, wherein the second port is located closer to the sole portion than the first port.

10. A golf club head as defined in claim 8, wherein the first mass portion is located farther from the heel portion than the second mass portion.

11. A golf club head as defined in claim 8, wherein the second mass portion is located closer to the toe portion than the heel portion.

12. A golf club head as defined in claim 8, wherein the third density comprises a density greater than the second density.

13. A golf club head as defined in claim 8, wherein the third density comprises a density less than the second density.

14. A golf club head comprising:
a face portion having a thickness of less than or equal to 1.9 millimeters (0.075 inch);
a body portion coupled to the face portion, the body portion having a toe portion, a heel portion, a top portion, a sole portion, a front portion, and a back portion, a maximum distance between the top portion and the sole portion being greater than a maximum distance between the face portion and the back portion;
an interior cavity enclosed by the face portion and the body portion;
a first mass portion;
a second mass portion having at least one dimension greater than the first mass portion;
at least one port connected to the interior cavity and configured to receive the first mass portion, the first mass portion being spaced apart from the face portion; and
a polymer material injected into the interior cavity from the at least one port,
wherein the first mass portion is located closer to the face portion than the second mass portion.

15. A golf club head as defined in claim 14, wherein the first mass portion is located farther from the heel portion than the second mass portion.

16. A golf club head as defined in claim 14, wherein the second mass portion is located closer to the toe portion than the heel portion.

17. A golf club head as defined in claim 14, wherein the second mass portion is located below a horizontal midplane of the body portion, and wherein a portion of the second mass portion is located closer to the face portion than a portion of the interior cavity located between the second mass portion and the top portion.

18. A golf club head as defined in claim 14 further comprising a bonding agent applied to a back surface of the face portion and bonding the polymer material to the back surface of the face portion.

19. A golf club head as defined in claim 14, wherein the face portion includes a first thickness and a second thickness less than the first thickness.

* * * * *